(12) United States Patent
Watanabe

(10) Patent No.: US 12,299,794 B2
(45) Date of Patent: May 13, 2025

(54) COMPUTER PROGRAMS, METHODS, AND SERVER DEVICES

(71) Applicant: GREE, Inc., Tokyo (JP)

(72) Inventor: Masashi Watanabe, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/936,762

(22) Filed: Sep. 29, 2022

(65) Prior Publication Data

US 2023/0018262 A1  Jan. 19, 2023

Related U.S. Application Data

(63) Continuation of application No. PCT/JP2021/042600, filed on Nov. 19, 2021.

(30) Foreign Application Priority Data

Nov. 19, 2020 (JP) .................................. 2020-192452
Dec. 21, 2020 (JP) .................................. 2020-211293
Jan. 29, 2021 (JP) .................................. 2021-013627

(51) Int. Cl.
*G06T 13/00* (2011.01)
*G06T 7/70* (2017.01)
(Continued)

(52) U.S. Cl.
CPC ................ *G06T 13/40* (2013.01); *G06T 7/70* (2017.01); *G06T 17/00* (2013.01); *G06T 19/003* (2013.01);
(Continued)

(58) Field of Classification Search
CPC ......... G06T 13/40; G06T 13/00; G06T 13/80; G06T 13/20; G06T 17/00; G06T 19/003; G06T 19/20; A63F 13/10; H04L 51/04
(Continued)

(56) References Cited

U.S. PATENT DOCUMENTS 10,341,537 B2  7/2019  Sarkar
2008/0214253 A1  9/2008  Gillo et al.
(Continued)

FOREIGN PATENT DOCUMENTS

JP  2002-183762 A  6/2002
JP  2003-093734 A  4/2003
(Continued)

OTHER PUBLICATIONS

Notice of Reasons for Refusal, issued by Japanese Patent Office in corresponding with a Japanese Application No. 2022-133071, mailed Jul. 4, 2023 (3 pages with 3 pages translation).
(Continued)

*Primary Examiner* — Gordon G Liu
(74) *Attorney, Agent, or Firm* — Finnegan, Henderson, Farabow Garrett & Dunner LLP

(57) ABSTRACT

A computer program, a method, and a server device, all of which enable a further reduction in the possibility of increasing of the load to perform display control, as compared to conventional technologies, are provided. The computer program, method, and server device involve: acquiring first data pertaining to an avatar existing in a virtual space and being operated using a terminal of a first user; receiving, via a communication line, second data pertaining to avatars belonging to one or more users other than the first user, existing in the virtual space, and being operated using terminals of the respective users, the first data containing the position of the avatar of the first user, the second data containing the position of the avatars of the one or more users and/or the total number of avatars located in a first region within the virtual space among the avatars of the one or more users; judging whether or not the position of the avatar of the first user or the second data fulfills a prescribed condition; determining, if the prescribed condition is ful-
(Continued)

filled, control data for controlling a display screen of the terminal of the first user; and controlling the display screen according to the control data.

23 Claims, 15 Drawing Sheets

(51) Int. Cl.
　　*G06T 13/40*　　(2011.01)
　　*G06T 17/00*　　(2006.01)
　　*G06T 19/00*　　(2011.01)
　　*G06T 19/20*　　(2011.01)
　　*G06V 10/25*　　(2022.01)
　　*H04L 51/04*　　(2022.01)
(52) U.S. Cl.
　　CPC .............. *G06T 19/20* (2013.01); *G06V 10/25* (2022.01); *H04L 51/04* (2013.01)
(58) Field of Classification Search
　　USPC ........................................................ 345/473
　　See application file for complete search history.

(56) References Cited

U.S. PATENT DOCUMENTS

| | | | |
|---|---|---|---|
| 2011/0055320 | A1 | 3/2011 | Gillo et al. |
| 2011/0276879 | A1 | 11/2011 | Ando et al. |
| 2013/0009984 | A1* | 1/2013 | Kawakami ............. H04N 7/157 345/619 |
| 2013/0344966 | A1 | 12/2013 | Mustafa |
| 2014/0282112 | A1 | 9/2014 | Begosa et al. |
| 2018/0069983 | A1 | 3/2018 | Cho et al. |
| 2018/0302499 | A1 | 10/2018 | Kada |
| 2019/0052806 | A1 | 2/2019 | Wada |
| 2019/0104235 | A1* | 4/2019 | Sarkar .................... H04N 21/47 |
| 2019/0206129 | A1 | 7/2019 | Khalid |
| 2019/0333261 | A1* | 10/2019 | Nakashima ............ G06F 3/011 |
| 2021/0240279 | A1* | 8/2021 | Harviainen ............ G06F 3/017 |

FOREIGN PATENT DOCUMENTS

| | | |
|---|---|---|
| JP | 2005-100053 A | 4/2005 |
| JP | 2008-217142 A | 9/2008 |
| JP | 2009205370 | 9/2009 |
| JP | 2009223656 | 10/2009 |
| JP | 2010-015333 A | 1/2010 |
| JP | 2010520537 A | 6/2010 |
| JP | 2010-529547 | 8/2010 |
| JP | 2011-050724 A | 3/2011 |
| JP | 2011154419 A | 8/2011 |
| JP | 2011-204180 A | 10/2011 |
| JP | 2011-229716 | 11/2011 |
| JP | 2013-20389 A | 1/2013 |
| JP | 2013-020389 A | 1/2013 |
| JP | 2014-529792 | 11/2014 |
| JP | 2016-034087 A | 3/2016 |
| JP | 2016-140519 A | 8/2016 |
| JP | 2016-152619 A | 8/2016 |
| JP | 2018-097847 A | 6/2018 |
| JP | 2018-128966 A | 8/2018 |
| JP | 2019-033430 | 2/2019 |
| JP | 2019-192174 A | 10/2019 |
| JP | 2020-120336 A | 8/2020 |
| WO | WO 2019/234879 | 12/2019 |

OTHER PUBLICATIONS

Notice of Reasons for Refusal, issued by Japanese Patent Office in corresponding with a Japanese Application No. 2020-192452, mailed Jan. 18, 2022 (4 pages with 5 pages translation).
Notice of Reasons for Refusal, issued by Japanese Patent Office in corresponding with a Japanese Application No. 2020-211293, mailed Jan. 18, 2022 (4 pages with 4 pages translation).
Notice of Reasons for Refusal, issued by Japanese Patent Office in corresponding with a Japanese Application No. 2020-211293, mailed May 10, 2022 (3 pages with 3 pages translation).
Notice of Reasons for Refusal, issued by Japanese Patent Office in corresponding with a Japanese Application No. 2021-013627, mailed Jan. 18, 2022 (3 pages with 4 pages translation).
Decision of Refusal, issued by Japanese Patent Office in Japanese Application No. 2022-133071, mailed Nov. 28, 2023 (5 pages with 3 pages translation).
Decision of Refusal, issued by Japanese Patent Office in corresponding with a Japanese Application No. 2022-099477, mailed Sep. 12, 2023 (2 pages with 3 pages translation).
PCT International Search Report for PCT Application No. PCT/JP2021/042600, mailed on Jan. 25, 2022 (3 pages, plus 3 pages of translation).
PCT Written Opinion for PCT Application No. PCT/JP2021/042600, mailed on Jan. 25, 2022 (6 pages).
Notice of Reasons for Refusal, issued by Japanese Patent Office in corresponding with a Japanese Application No. 2022-099477, mailed Apr. 18, 2023 (4 pages with 5 pages translation).
Non-Final Office Action corresponding with U.S. Appl. No. 17/855,050, mailed May 14, 2024 (26 pages).
Non-Final Office Action corresponding with U.S. Appl. No. 17/855,050, mailed Sep. 9, 2024 (14 pages).
Advisory Action corresponding with U.S. Appl. No. 17/855,050, mailed Jul. 26, 2024 (5 pages).
Notice of Reasons for Refusal, issued by Japanese Patent Office in corresponding with a Japanese Application No. 2022-134216, mailed Jun. 13, 2023 (3 pages with 3 pages translation).
Notice of Reasons for Refusal, issued by Japanese Patent Office in corresponding with a Japanese Application No. 2023-207989, mailed Oct. 22, 2024 (4 pages with 6 pages translation).
Notice of Reasons for Refusal, issued by Japanese Patent Office in corresponding with a Japanese Application No. 2024-026892, mailed Dec. 24, 2024 (7 pages with 8 pages translation).
Notice of Reasons for Refusal, issued by Japanese Patent Office in corresponding with a Japanese Application No. 2024-067015, mailed Jan. 28, 2025 (7 pages with 9 pages the machine translation).
Nakao et al., "W@nderland: Image-based Virtual Space Constructable by Participants through the WWW," Journal from Information Processing Society of Japan, vol. 43, No. 9, Sep. 2022. (11 pages).
Notice of Reasons for Refusal, issued by Japanese Patent Office in corresponding with a Japanese Application No. 2023-207989, mailed Feb. 25, 2025 (5 pages with 7 pages the machine translation).

\* cited by examiner

FIG. 10

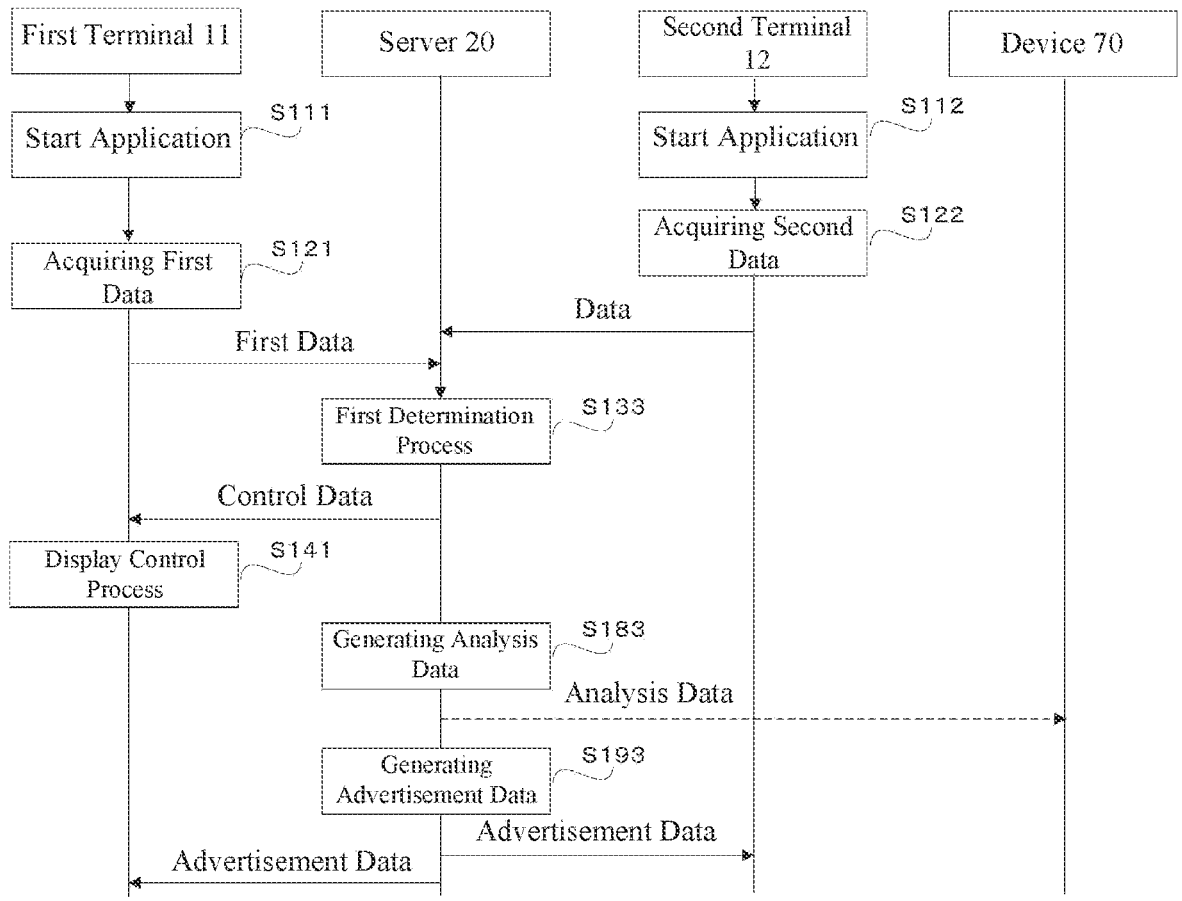

FIG. 11

|  | Age | Gender | Current Position | Virtual Object | Chat History | Content Viewing History |
|---|---|---|---|---|---|---|
| First User | 21 years old | Male | Position A01 | Purchases virtual object A12 at time A11 at price A13 | At time A21, message "Hello" is sent to the third user's terminal at location A22 | At time A31, the viewer stands up at position A32 and begins viewing |
| Second User | 31 years old | Female | Position B01 | Open virtual object B12 at time B11 | None | At time B31, at position B32, the viewer has watched for 2 hours at seat B33 |
| Third User | 41 years old | Male | Position C01 | Obtain virtual object C12 at time C11 | At time C21, message "Hello" is received from the first user's terminal at location C22 | Finish viewing at time 31 at position 32 and leave seat C33. |

FIG. 12

|  | Before Change | | After Change | | Time | Number of People |
|---|---|---|---|---|---|---|
|  | Number of People | Target Time | Number of People | Target Time |  |  |
| Example 1 | 1 | Time 1 | 10 | Time 1 - 3 | Time 1 | 1 |
| Example 2 | 3 | Time 1 + 2 | 10 | Time 1 - 3 | Time 2 | 2 |
| Example 3 | 10 | Time 1 - 3 | 10 | Time 1 - 3 | Time 3 | 7 |
| Example 4 | 100 | Time 1 - 4 | 10 | Time 1 - 3 | Time 4 | 90 |
| Example 5 | 500 | Time 1 - 5 | 10 | Time 1 - 3 | Time 5 | 400 |

|  | Before Change | | After Change | |
|---|---|---|---|---|
|  | Number of People | Target Time | Number of People | Target Time |
| Example 1 | 3 | Time 1 | 10 | Time 1 + 2 |
| Example 2 | 10 | Time 1 + 2 | 10 | Time 1 + 2 |
| Example 3 | 100 | Time 1 - 4 | 20 | Time 1 - 3 |

| Time | Number of People |
|---|---|
| Time 1 | 3 |
| Time 2 | 7 |
| Time 3 | 10 |
| Time 4 | 80 |

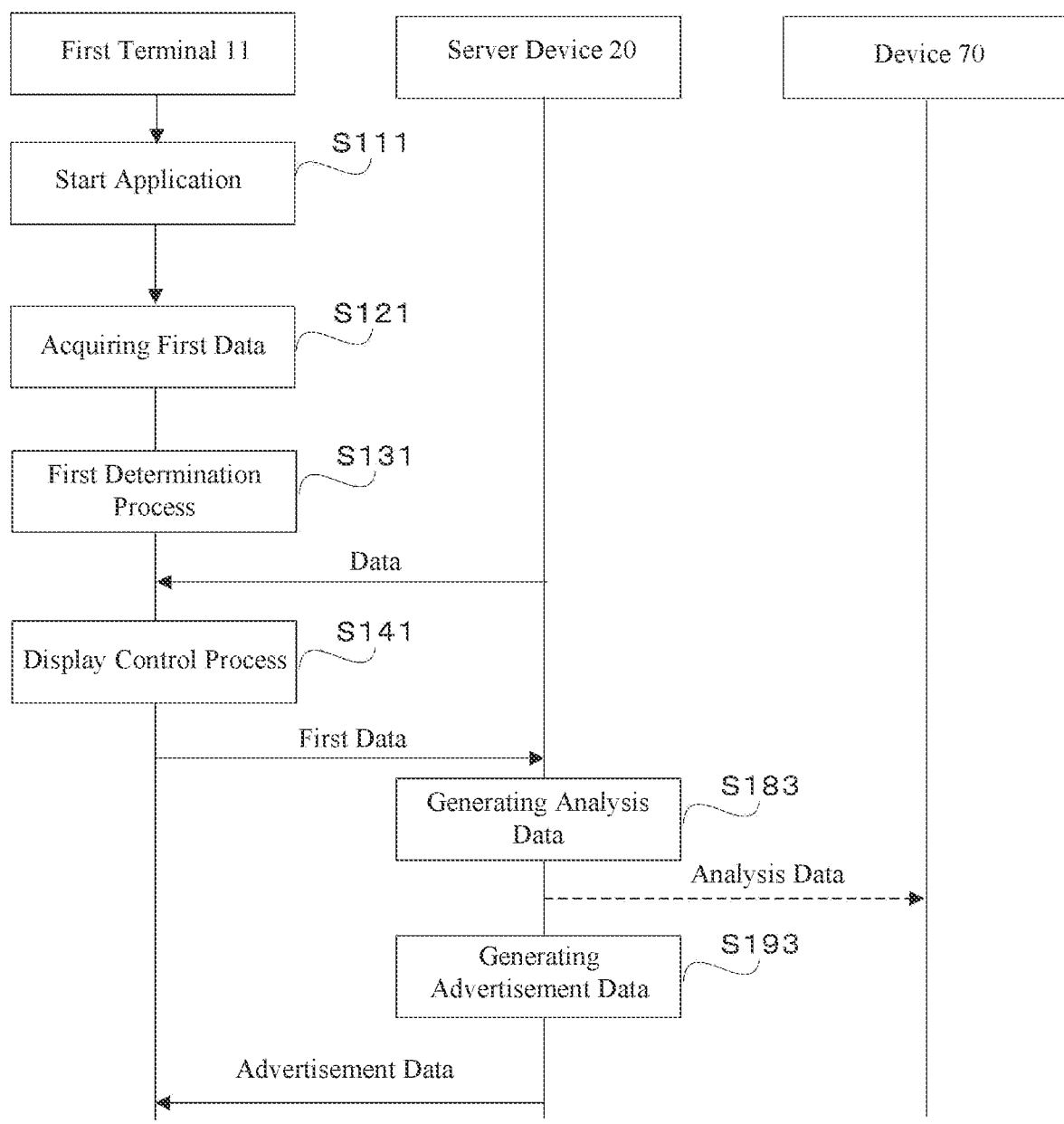

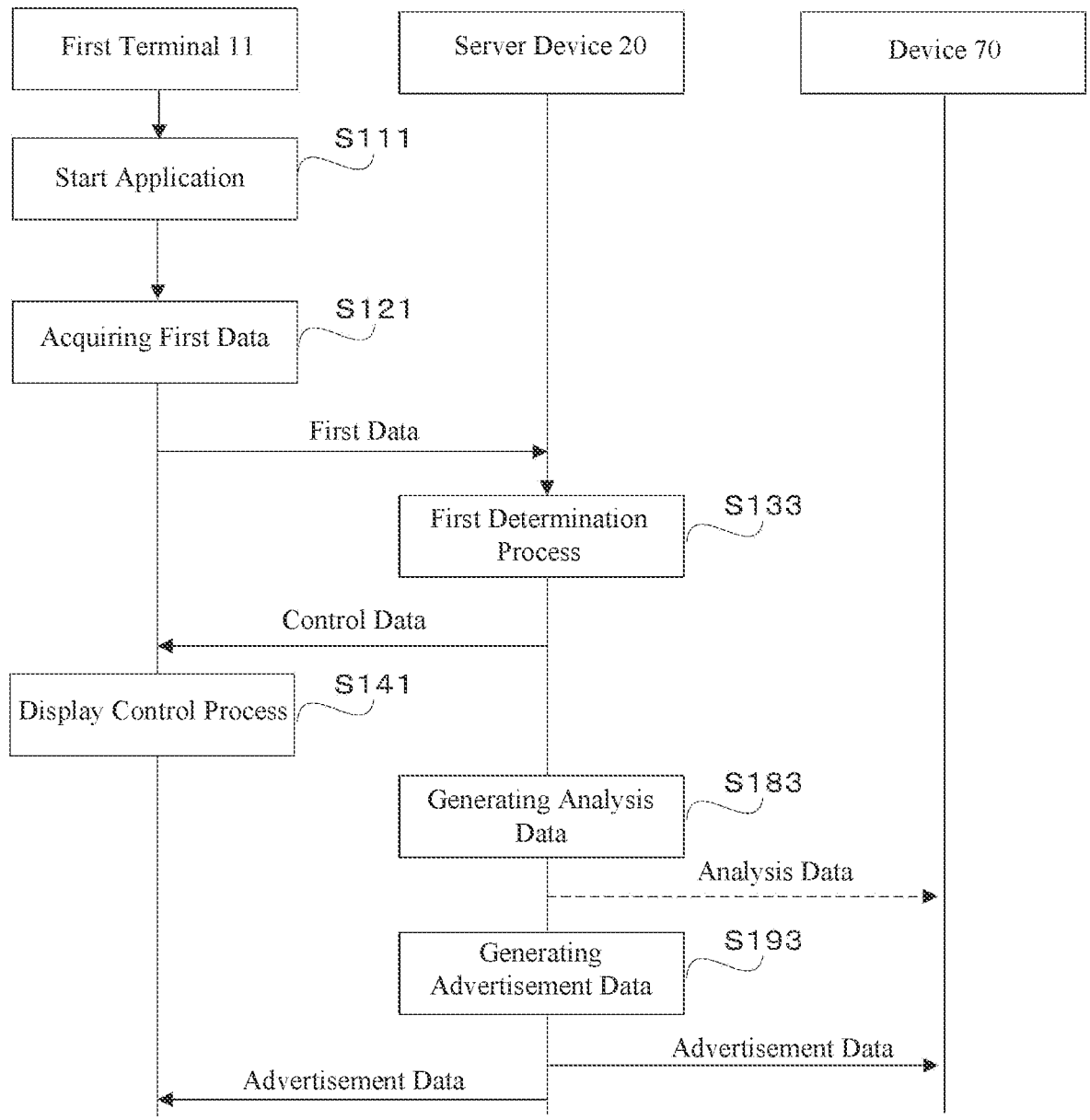

COMPUTER PROGRAMS, METHODS, AND SERVER DEVICES

CROSS-REFERENCE TO RELATED APPLICATIONS

This application is a continuation of International Application No. PCT/JP2021/042600, filed Nov. 19, 2021, which claims priority to Japanese Patent Application No. 2020-192452 filed on Nov. 19, 2020; Japanese Patent Application No. 2020-211293 filed on Dec. 21, 2020; and Japanese Patent Application No. 2021-013627 filed on Jan. 29, 2021, the contents of which are incorporated herein by reference in their entireties.

SUMMARY

This disclosure provides computer programs, methods, and server devices that reduce the possibility of a greater display control load than before.

A computer program or a non-transitory computer readable medium in one aspect is a computer program executed by at least one processor, for obtaining, via a communication line, first data relating to an avatar in a virtual space to be operated using a terminal of a first user, and receiving, via the communication line, second data relating to an avatar in the virtual space to be operated using a terminal of each of the at least one user other than the first user; and the first data includes the location of the first user's avatar, and the second data includes the location of the at least one user's avatar and the total number of avatars of the at least one user that are located in a first region in the virtual space. The second data includes at least one of the followings: the position of the avatar of the first user, the total number of avatars located in the first region of the virtual space, the position of the avatar of the first user or the second data satisfies the predetermined condition, and if the predetermined condition is satisfied, it determines control data to control the display screen of the first user's terminal, and controls the display screen based on the control data.

The computer program in one aspect is a computer program executed by at least one processor, which receives, via a communication line, first data concerning an avatar in a virtual space operated using a terminal of a first user, and second data concerning an avatar in a virtual space operated using a terminal of each of at least one user other than the first user, the at least one user other than the first user, and second data relating to the avatar in the virtual space operated using the terminal of the respective user of the at least one user, the first data including a location of the avatar of the first user, and the second data including a location of the avatar of the first user. avatar, the second data including a location of the avatar, and the second data includes at least one of the position of the at least one user's avatar and the total number of avatars of the at least one user that are located in the first region of the virtual space, wherein the position of the first user's avatar or the determining whether or not the second data satisfies a predetermined condition, determines control data to control the display screen of the first user's terminal when the predetermined condition is determined to be satisfied, and transmits the control data to the first user's terminal via the communication line, and transmits the control data to the first user's terminal via the communication line.

The method in one aspect includes: obtaining, via a communication line, first data relating to an avatar in a virtual space operated using a terminal of a first user; receiving, via a communication line, second data relating to an avatar in a virtual space operated using a terminal of at least one user other than the first user, each of the users the first data includes the location of the first user's avatar, and the second data includes the location of the at least one user's avatar. the location of the at least one user's avatar, and the second data includes the location of the at least one user's avatar in the virtual space. The second data includes at least one of the position of the at least one user's avatar and the total number of avatars of the at least one user's avatars that are located in the first region of the virtual space, and determining whether the position of the first user's avatar or the second data satisfies the predetermined condition. If the predetermined conditions are determined to be met, a process for determining control data for controlling the display screen of the first user's terminal, and a process for controlling the display screen based on the control data.

The method in another aspect includes the process of receiving, via a communication line, first data relating to an avatar in a virtual space to be operated using a terminal of a first user, and at least one user other than the first user, each of the at least one user, using a terminal of a user of each of the at least one user, and The first data includes the location of the first user's avatar, and the second data includes the location of the at least one user's avatar, and the second data includes the location of the at least one user's avatar, and the at least one user's avatar, and the second data includes the at least one user's avatar, at least one of the location of the avatar of the at least one user and the total number of avatars of the at least one user that are located in the first region of the virtual space, wherein the location of the avatar of the first user, or the determining whether or not the second data satisfies the predetermined conditions, determining control data to control the display screen of the first user's terminal when the predetermined conditions are determined to be satisfied, and transmitting the control data to the first user's terminal via the communication line.

The server device in one aspect receives, via a communication line, first data relating to an avatar in the virtual space operated using a terminal of the first user, and second data relating to an avatar in the virtual space operated using a terminal of each of at least one user other than the first user. The first data includes the location of the first user's avatar, and the second data includes the location of the at least one user's avatar and the at least one user's avatar. at least one of the location of the avatar of the at least one user; and the total number of avatars of the at least one user that are located in the first region of the virtual space, wherein the location of the avatar of the first user or the second data satisfies the predetermined conditions, and if it is determined that the predetermined conditions are satisfied, control data to control the display screen of the first user's terminal and transmits the control data to the first user's terminal via the communication line.

These descriptions introduce the various selected concepts in a simplified form. Additional objects and advantages will be set forth in part in the description which follows, and in part will be obvious from the description, or may be learned by practice of the disclosure. The objects and advantages will be realized and attained by means of the elements and combinations particularly pointed out in the appended claims. All trademarks used herein are the property of their respective owners. It is to be understood that both the foregoing general description and the following detailed description are exemplary and explanatory only and are not restrictive of the invention, as claimed. The accompanying drawings, which are incorporated in and constitute a part of this specification, illustrate several embodiments and together with the description, serve to explain the principles of the invention.

BRIEF DESCRIPTION OF DRAWINGS

FIG. 10 is an example of a flowchart showing a process executed in the present embodiment;

FIG. 11 shows an example of data transmitted from the terminal 10;

FIG. 12 shows an example of the number of avatars displayed on the display 140 of the terminal 10;

FIG. 26 is an example of a flowchart showing a process executed in the present embodiment; and FIG. 27 is an example of a flowchart showing a process executed in the present embodiment.

DETAILED DESCRIPTION

Figure 1:
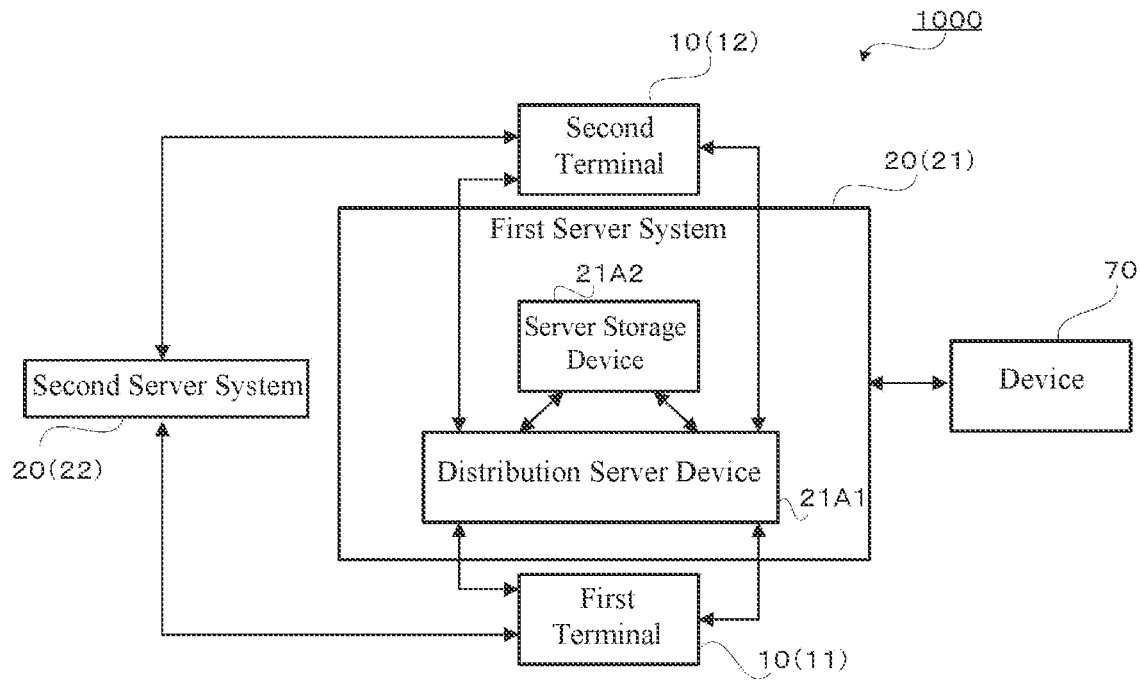
FIG. 1 is a block diagram showing an example of the configuration of a system 1000 in one embodiment.

Reference will now be made in detail to the present embodiments, examples of which are illustrated in the accompanying drawings. Wherever possible, the same reference numbers will be used throughout the drawings to refer to the same or like parts. This specification is described in the sense of various representative embodiments, which are not intended to be limited in any way. As used in this application, singular forms such as "one," "the," "above," "the," "this," and "that" may include the plural unless clearly indicated otherwise. Also, the term "including" can mean "to be provided with" or "to have" or "provided with" can mean "having" or "equipped with". In addition, the terms "combined," "combined," "bound," "knotted," "knotted," "be connected," or "connected" can encompass mechanical, electrical, magnetic, and optical methods of joining, connecting, or tying objects to each other, along with other methods, such as combined, bound, knotted, connected, and connected, as well as mechanical, electrical, magnetic, and optical methods of joining, connecting, or tying objects to each other, such as combined, bound, knotted, connected, and connected. It does not preclude the presence of intermediate elements between the objects so joined, to be joined, tied, connected or to be connected.

The various systems, methods and devices described herein should not be construed as being limited in any way. In fact, the present disclosure is directed to any novel features and aspects of each of the various embodiments disclosed, combinations of these various embodiments with each other, and combinations of portions of these various embodiments with each other. The various systems, methods and devices described herein are not limited to any particular aspect, particular feature, or combination of such particular aspect and particular feature, and the objects and methods described herein are not limited to any particular effect, particular feature, or combination of such particular aspect and particular feature, and the objects and methods described herein are not limited to such particular feature, particular effect, or combination of such particular feature or that the problem is solved. Furthermore, various features or aspects of the various embodiments described herein, or portions of such features or aspects, may be used in combination with each other.

Although the operations of some of the various methods disclosed herein are described in a particular order for convenience, it should be understood that description in this manner encompasses rearrangement of the order of the above operations, unless a particular order is required by the specific text below. The description in this manner should be understood to encompass rearranging the order of the above actions, unless a specific order is required by the specific text below. For example, a plurality of actions described in sequence may be reordered or performed simultaneously in some cases. Further, for the purpose of simplicity, the accompanying drawings do not show the various ways in which the various matters and methods described herein may be used in conjunction with other matters and methods. In addition, the specification may use terms such as "generate," "cause to occur," "display," "receive," "evaluate," and "deliver. These terms are high-level descriptions of the actual various actions to be performed. The actual various actions corresponding to these terms may vary depending on the particular implementation and can be readily recognized by those skilled in the art having the benefit of the disclosure herein.

Theories of operation, scientific principles, or other theoretical descriptions presented herein in connection with the devices or methods of the disclosure are provided for better understanding and are not intended to limit the technical scope. The devices and methods in the appended claims are not limited to devices and methods that operate by the methods described by such theory of operation.

Any of the various methods disclosed herein may be implemented using a plurality of instructions executable by a computer and stored in a non-transitory computer such as one or more media (e.g., one or more optical medium disks, a plurality of volatile memory components, or a plurality of non-volatile memory components) that can be read by a computer, and may be executed by a computer. Here, the plurality of volatile memory components include, for example, a DRAM or an SRAM The plurality of non-volatile memory components include, for example, a hard drive and a solid state drive (SSD). Further, the computer includes, for example, any computer available in the market, including smart phones and other mobile devices having hardware for performing calculation. Any of a plurality of instructions executable by such a computer for implementing the techniques disclosed herein may be stored in one or more computer-readable media (e.g., a non-transitory computer-readable storage medium) together with any data generated during implementation of various embodiments disclosed herein. A plurality of instructions executable by such a computer may be, for example, a part of an individual software application or may be a part of a software application that is accessed or downloaded via another software application such as a web browser or a remote calculation application. Such software may be executed, for example, in a single local computer (as an agent to be executed in any suitable computer available in the market), or in a client server network such as the Internet, a wide area network, a local area network, or a cloud computing network (such as the Internet, the wide area network, the local area network, or the other such network) by using one or more network computers.

For clarity, only a particular selected various aspects of various implementations based on software are described. Other detailed matters well known in the art are omitted. For example, the techniques disclosed herein are not limited to specific computer languages or programs. For example, the techniques disclosed herein may be executed by software described in C, C++, Java, or any other suitable programming language. Similarly, the techniques disclosed herein are not limited to specific computers or specific types of hardware. While specific detailed items of a suitable computer and hardware are well known and do not need to be described in detail, the following descriptions are provided for exemplary purposes.

Server device and its components may include, be encompassed by or be a component of control circuitry and/or processing circuitry. Further, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Furthermore, any of various embodiments based on such software (including a plurality of instructions executable by a computer for causing a computer to execute any of various methods disclosed herein) may be uploaded, downloaded, or accessed by a remote method. Such suitable communication means includes, for example, the Internet, a World Wide Web, an Intranet, a software application, a cable (including an optical fiber cable), magnetic communication, electromagnetic communication (including RF communication, microwave communication, infrared communication), electronic communication, or other such communication means.

Various embodiments of the invention are described below with reference to the accompanying drawings. In the drawings, common components are marked with the same reference codes. It should also be noted that components represented in one drawing may be omitted in another drawing for convenience of explanation. It should also be noted that the accompanying drawings are not necessarily drawn to exact scale.

First Embodiment

1. Configuration of System 1000

FIG. 1 is a block diagram showing an exemplary configuration of a system 1000 in one embodiment. As shown in FIG. 1, the system 1000 includes, for example, a plurality of terminals 10 and one or more server devices 20 connected via a communication line (communication network). The terminals 10 include a first terminal 11 and a second terminal 12. The server devices 20 include, for example, a first server system 21 and a second server system 22 including, for example, a first server system 21 and a second server system 22.

Communication lines may be, without limitation, a cellular phone network, a wireless network (e.g., Bluetooth, Wi-Fi (such as IEEE 802.1a/b/n), WiMax, cellular, satellite, laser, infrared, RF connections), a fixed telephone network, Internet, Intranet, Local Area Network (LAN), Wide Area Network (WAN), and/or an Ethernet network.

1-1. Terminal 10

The terminal 10 is connected to one or more server devices 20, for example, via a communication line. The terminal 10 may be, for example, a smartphone, a tablet device, and/or a personal computer. The terminal 10 is configured to, for example, install a predetermined application and execute the predetermined application. The terminal 10 may also be configured to receive a web page (e.g., an HTML document, and in some examples, an HTML document encoded with executable code, such as JavaScript or PHP code) from the server device 20 (a second server system 22).

Hereinafter, the user operating the terminal 10 shall simply be referred to as the user, the user operating the first terminal 11 shall be referred to as the first user, and the user operating the second terminal 12 shall be referred to as the second user. FIG. 1 also shows an example of a plurality of terminals 10, for example, a first terminal 11 and a second terminal 12 are provided as the plurality of terminals 10, but not limited to this. The plurality of terminals 10 may include, for example, three or more terminals. In the following description, the first terminal 11 and the second terminal 12 may be referred to collectively as the terminal 10.

1-2. Server System 20

A first server system 21 includes a distribution server device 21A1 and a server storage device 21A2. For example, the distribution server device 21A1 receives, from the terminal 10, data required for an application executed in the terminal 10. In addition, for example, the distribution server device 21A1 transmits, to the terminal 10, data to be used for an application executed in the terminal 10 in response to the request. The server storage device 21A2 stores, for example, data to be transmitted from the distribution server device 21A1 to the terminal 10. The server storage device 21A2 stores, for example, the data received from the terminal 10 by the distribution server device 21A1. The first server system 21 transmits, for example, data used in an application executed by the terminal 10 to the terminal 10. The first server system 21 transmits, for example, the data received from the terminal 10 to the device 70 storage device 21A2.

Although an example in which the terminal 10 executes the application has been described, the present invention is not limited thereto. For example, processing equivalent to execution of the application may be executed by using a web browser installed in the terminal 10. In this way, when a web browser installed in the terminal 10 is used, for example, the server device 20 may include a web server (not shown). When the server device 20 includes a web server (not shown), the web server transmits data related to the HTML document such as the HTML 5, and the terminal 10 displays data related to the HTML document by using the web browser, and transmits the user instruction data to the terminal 10 (the web browser), and the server device 20 performs display control. The server device 20 generates display data by performing the display control, and transmits the display data to the terminal 10 (the web browser). The display control may be performed using a script such as JavaScript (registered trademark) in the web browser.

In FIG. 1, the first server system 21 is described as having a delivery server device 21A1 and server storage device 21A2, but it is not limited to this. For example, the first server system 21 may include other configurations in addition to the delivery server device 21A1 and server storage device 21A2. 21A2 may also include other configurations in addition to the delivery server device 21A1 and server storage device 21A2. In this case, the other configuration may have at least one of the functions of the delivery server device 21A1 and the server storage device 21A2 may have at least one of the functions of the delivery server device 21A1 and the server storage device 21A2.

The second server system 22 is a server that transmits data related to the content to the terminal 10. Assume, for example, that a user operates the terminal 10 to execute an application. In this case, if the second server system 22 receives a request for content-related data from the terminal 10 while the application is being executed, the second server system 22 sends the data to the terminal 10. The data related to the content transmitted from the second server system 22 to the terminal 10 is, for example, data related to video.

1-3. Equipment 70

A device 70 (third terminal) is, for example, a terminal operated by the operator or the management group that operates the virtual venue. The device 70 transmits predetermined data to the first server system 20 and receives predetermined data transmitted from the first server system 20. A specific configuration of the device 70 is described below.

2.2 Hardware Configuration of Each Device

Next, an example of the hardware configuration of each of the terminal 10 and the server device 20 is described.

2-1. Hardware Configuration of Terminal 10

Figure 2:
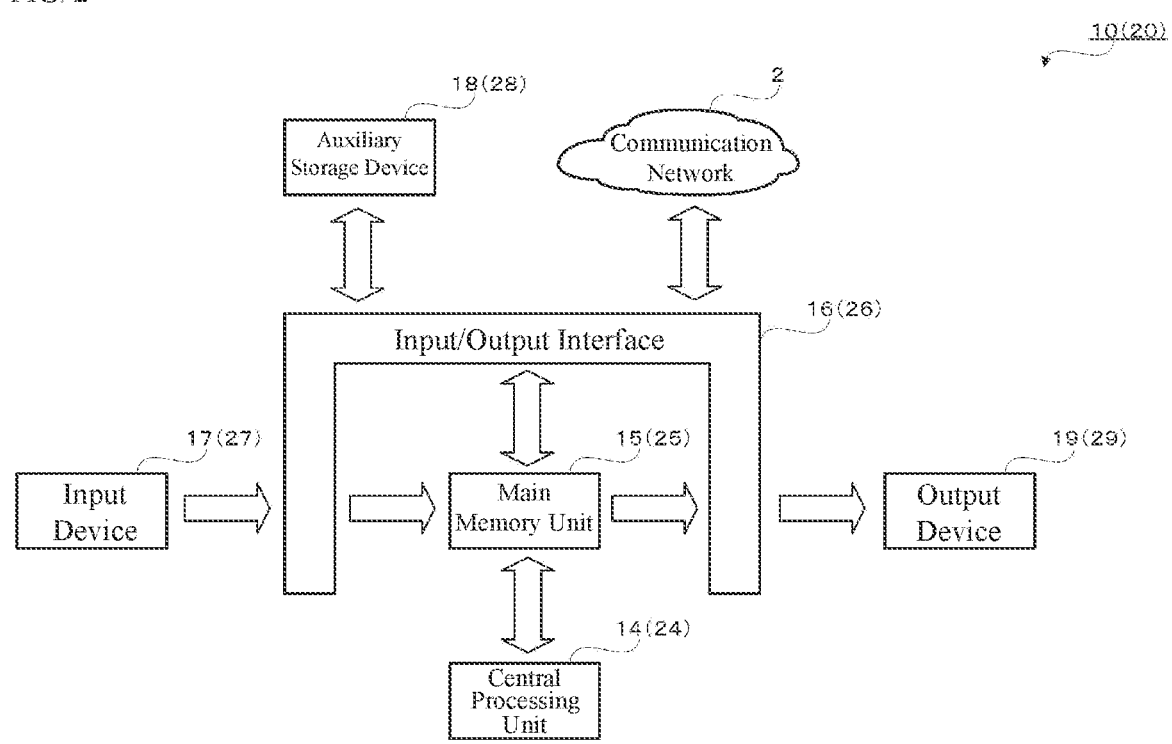
FIG. 2 is a block diagram showing an example of the configuration of a terminal 10 and a server device 20 shown in FIG. 1.

An example of the hardware configuration of each terminal 10 is described with reference to FIG. 2. FIG. 2 is a block diagram showing an example of the hardware configuration of the terminal 10 (server device 20) shown in FIG. 1. In FIG. 2, the reference numerals in parentheses are described in relation to the server device 20, as described below.

As shown in FIG. 2, each terminal 10 has, for example, a central processing unit 14, a main memory device 15, an input/output interface device 16, input device 17, auxiliary storage device 18, and output device 19. The configurations shown in FIG. 2 are connected to each other by data and/or control buses.

The central processing unit 14 is referred to as the "CPU" and performs operations on the instructions and data stored in the main memory device 15. The central processing unit 14 is referred to as the "CPU" and performs operations on instructions and data stored in the main memory device 15 and stores the results of these operations in the main memory device 15. In addition, the central processing unit 14, via the input/output interface device 16, can control the input device 17, auxiliary storage device 18 and output device 19, etc., can be controlled. The terminal 10 can include one or more such central processing units 14.

The main memory device 15 is referred to as a "memory", and stores instructions and data received from the input device 17, the auxiliary storage device 18, and the communication line 30 (server device 20 or the like) via the input/output interface device 16, and the calculation result of the central processing unit 14. The main memory device 15 includes a volatile memory (for example, a register, a cache, a random access memory (RAM)), a nonvolatile memory (for example, read-only memory (ROM), an EEPROM, a flash memory), and a storage (e.g., a hard disk drive (HDD). A computer readable medium such as a solid state drive (SSD), a magnetic tape, and an optical medium can be included without being limited thereto. As will be readily understood, the term "computer-readable recording medium" may include media for data storage, such as a memory and a storage, rather than a transmission medium such as a modulated data signal, i.e., a temporary signal.

The input device 17 is a device that takes in data from the outside and can include, without limitation, a touch panel, buttons, keyboard, mouse and/or sensors. Sensors can include, without limitation, one or more cameras, etc. and/or one or more microphones, etc., as described below.

The auxiliary storage device 18 is a storage device with a larger capacity than the main memory device 15. It can store instructions and data (computer programs) that constitute specific applications (video distribution applications, video viewing applications, etc.) and web browser applications, etc., described above. Furthermore, the auxiliary storage device 18, controlled by the central processing unit 14, can store these instructions and data (computer programs) in the input/output interface device 16 to the main memory device 15. The auxiliary storage device 18 can include, without limitation, a magnetic disk device and/or an optical disk device.

The output device 19 can include, without limitation, a display device, touch panel and/or printer device.

In such a hardware configuration, the central processing unit 14 sequentially loads instructions and data (computer programs) constituting the specific application stored in the auxiliary storage device 18 into the main memory device 15. The central processing unit 14 controls the output device 19 via the input/output interface device 16 by calculating the loaded instruction and data, or can transmit and receive various data between another device (for example, the server device 20 and the other terminal 10) via the input/output interface device 16 and the communication line 2.

2-2. Hardware Configuration of Server Device 20

The following is an example of the hardware configuration of each server device 20, also referring to FIG. 2. The hardware configuration of each server device 20 (delivery server device 21A1 and server storage device 21A2) includes, for example, the hardware configuration of each terminal 10 described above. The hardware configuration of each server device 20 (delivery server device 21A1 and server storage device 21A2), for example, can be the same as the hardware configuration of each of the terminals 10 described above. Therefore, the reference numerals for the components of each server device 20 are shown in parentheses in FIG. 2.

As shown in FIG. 2, each server device 20 mainly consists of a central processing unit 24, a main memory unit 25, an input/output interface device 26, an input device 27, an auxiliary storage device 28, and an output device 29. These devices are connected to each other by data and/or control buses.

The central processing unit 24, the main memory unit 25, the input/output interface device 26, the input device 27, the auxiliary storage device 28, and the output unit 29 can each be identical to the central processing unit 14, the main memory device 15, the input/output interface device 16, the input device 17, the auxiliary storage device 18, and the output unit 19 included in each terminal 10 described above.

In such a hardware configuration, the central processing unit 24 sequentially loads the instructions and data (computer program) including a particular application stored in the auxiliary storage device 28. The central processing unit 24 loads the instructions and data (computer program) including a particular application stored in auxiliary storage device 28 sequentially into main memory 25. By computing the loaded instructions and data, the central processing unit 24 controls the output device 29 via the input/output interface device 26 or with other devices (e.g., each terminal 10) via the input/output interface device 26 and the communication line 2 by computing the loaded instructions and data. Various data can be transmitted and received via the input/output interface device 26 and communication line 2.

The server unit 20 may include one or more microprocessors and/or graphics processing units (GPUs) instead of or together with the central processing unit 24.

3. Functions of Each Device

Figure 3:
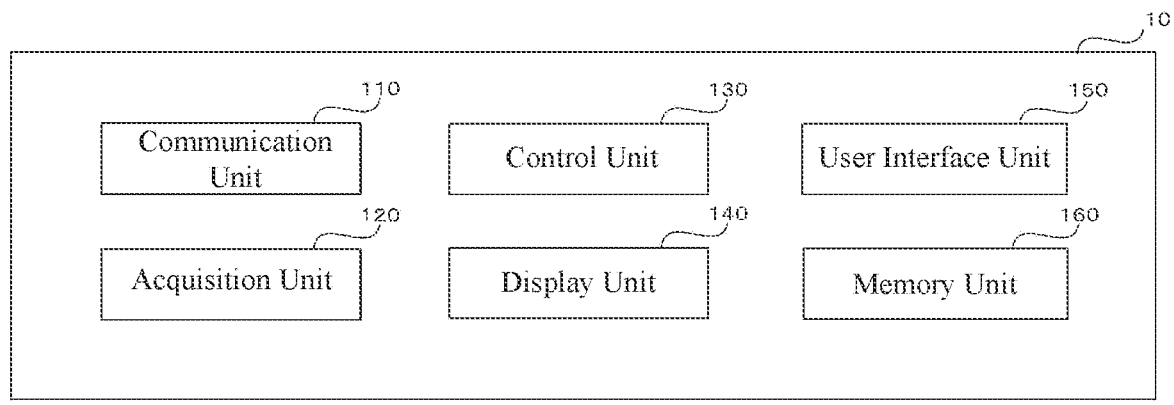
FIG. 3 is a block diagram showing an example of the functions of the terminal 10 shown in FIG. 1.
Figure 4:
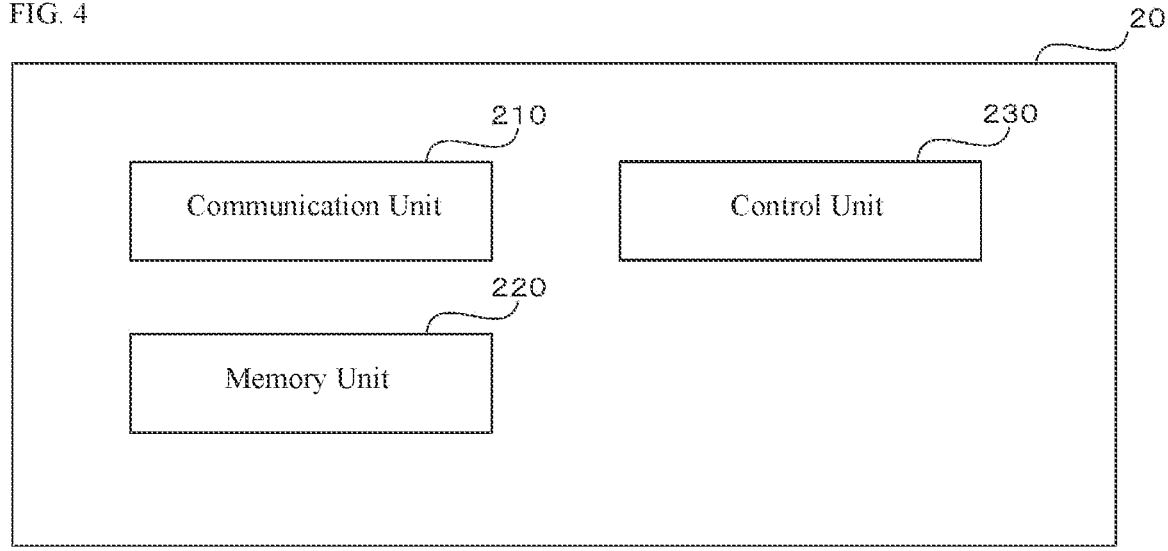
FIG. 4 is a block diagram showing an example of the functions of the server device 20 shown in FIG. 1.

Next, an example of the functions of each of the terminal 10 and server device 20 is described using FIGS. 3 and 4, respectively.

3-1. Functions of Terminal 10

FIG. 3 is a block diagram showing an example of the functions of terminal 10 shown in FIG. 1. As shown in FIG. 3, terminal 10 includes, for example, communication unit 110, acquisition unit 120, control unit 130, display unit 140, user interface unit 150, and a memory unit 160.

(1) Communication Section 110

A communication section 110 is used, for example, to transmit various data to server device 20. A communication section 210 is used, for example, to receive various data from the server device 20. The data received in communication section 210 is sent to control section 130, for example.

(2) Acquisition Section 120

The acquisition unit 120 acquires, for example, operation data related to an operation from a user. The acquisition unit 120 acquires, for example, data detected by various sensors. The data acquired by the acquisition unit 120 is sent to, for example, the control unit 130. The acquisition unit 120 performs processing in S121, S122 in FIG. 9, S121 in FIG. 10, and S122 in FIG. 10, which will be described later, for example. For example, the operation data may include one or more of the following data:

Data indicating how the distributor swiped the touchpad display.

Data indicating which part of the touchpad display was touched by the distributor Data indicating which object was tapped or clicked by the distributor Data indicating how the distributor dragged the touchpad display The data acquired by the acquisition unit 120 may be data related to non-operation (data indicating that no operation was performed), for example, data indicating that the terminal 10 was not operated for a specific time (specific period) and/or data indicating that the user did not enter a certain location in the virtual space 300.

(3) Control Section 130

A control unit 130, for example, performs various controls based on data received at the communication unit 110. The control unit 130 also performs various controls based on the data acquired in the acquisition unit 120. The control unit 130 performs, for example, S131 of FIG. 9, S141 of FIG. 9, and S141 of FIG. 10, which are described below.

(4) Display Section 140

A display section 140 displays, for example, display contents based on control data output from control section 130. The display 140, for example, displays a screen for selecting a predetermined application. The display 140, for example, displays a screen related to the virtual space in the case of selecting a predetermined application and executing the predetermined application.

(5) User Interface Section 150

The user interface section 150 is used for inputting various data used to execute applications via user operations.

(6) Memory Unit 160

The memory unit 160 can store various data used to execute applications. The memory unit 160 stores data used to control the display 140. For example, memory unit 160 stores module data used to generate the first user's avatar and the second user's avatar. Note that memory unit 160 stores the module data used to generate the first user's avatar and the second user's avatar. The storage unit 160 is not limited to storing module data used to generate the first user's avatar and the second user's avatar, but may also store module data used to generate other avatars.

Note that the module data is, for example, data relating to parts for generating an avatar. Here, the part for generating the avatar includes, for example, data of each part of the avatar (eyes, nose, mouth, eyebrow, skin color, hairstyle, hair color, clothing, body, and the like). Further, the module data includes data related to an ID assigned corresponding to each part for generating an avatar. In the case where the parts of the avatar are bodies, the data related to the parts for generating the avatar may include data subdivided into the body shape such as slimming type, slightly slimming type, standard, slightly obesity, obesity, and the like.

In the case where the display 140 displays avatars 80 other than avatar 80A (avatars of others), the server device 20 may be configured to transmit ID data used to generate avatars 80 other than avatar 80A to the first terminal 11, and the first terminal 11 may construct avatars 80 other than avatar 80A based on the ID data.

When the display 140 displays avatars other than avatar 80A (avatars of others), the display 140 may display avatars other than avatar 80A colored black, or may display avatars other than avatar 80A with parts and/or colors determined based on the gender of the user corresponding to avatar 80A (e.g., male or female) with two choices, male or female.

3-2. Functions of Server Device 20

FIG. 4 is a block diagram showing an example of the functions of the server device 20 shown in FIG. 1. As shown in FIG. 4, server device 20 includes, for example, a communication section 210, a memory 220, and a control section 230.

(1) Communication Section 210

The communication section 210 is used, for example, to transmit various data to terminal 10. For example, it is used to transmit various data to terminal 10. The communication section 210 is also used, for example, to receive various data from the terminal 10. The data received in the communication section 210 is sent to the control section 230.

(2) Memory 220

The memory 220 stores various data used to execute applications. For example, the memory 220 stores first data transmitted from the terminal 11 and data transmitted from the second terminal 12. At least any of the first data transmitted from the first terminal 11 and the data transmitted from the second terminal 12 may include, for example, data regarding "action history". The details of the first data transmitted from the first terminal 11, the data transmitted from the second terminal 12, and the "action history" data are described below.

(3) Control Section 230

Figure 9:
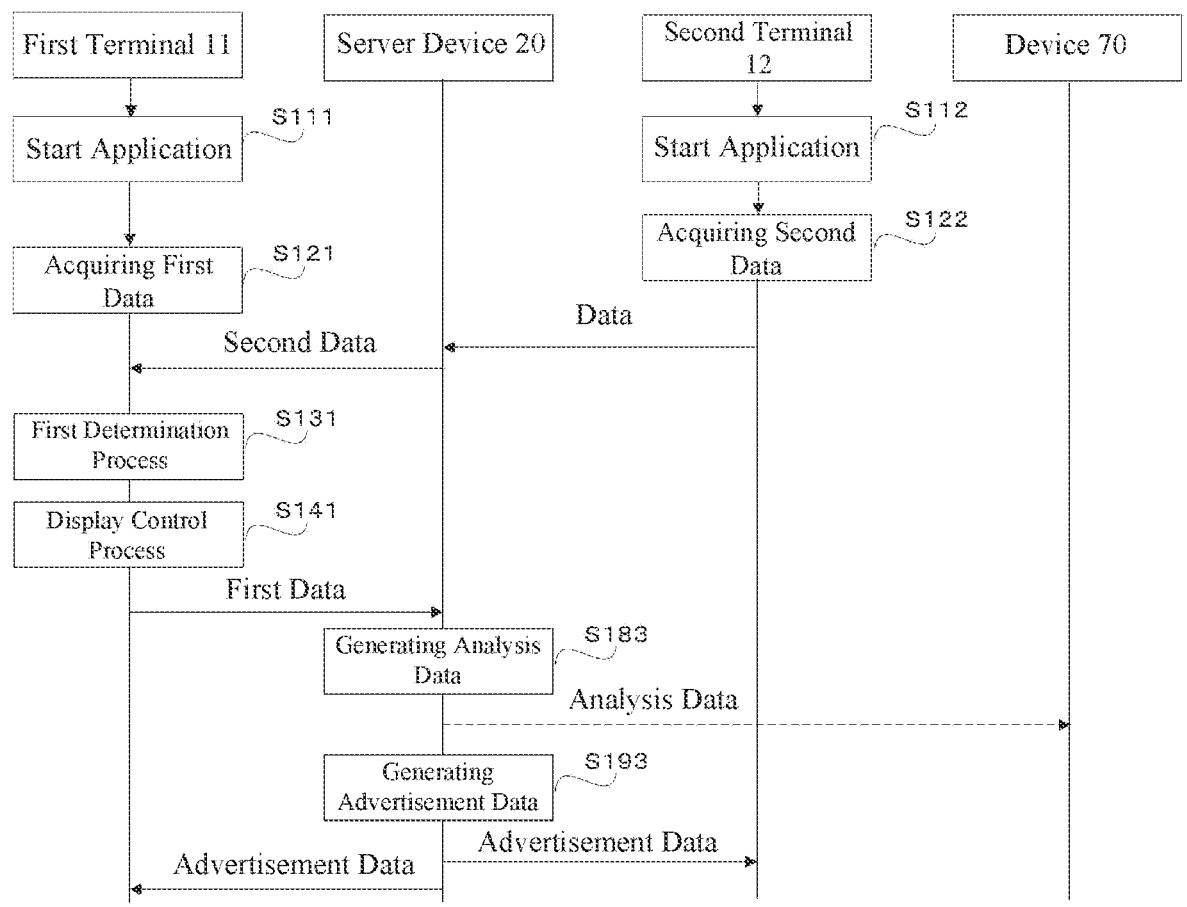
FIG. 9 is an example of a flowchart showing a process executed in the present embodiment.

The control section 230 performs various controls based on the data received in the communication unit 210, for example, S183 in FIG. 9, S193 in FIG. 9, S133 in FIG. 10, S183 in FIG. 10, and S193 in FIG. 10 are processed.

Figure 5:
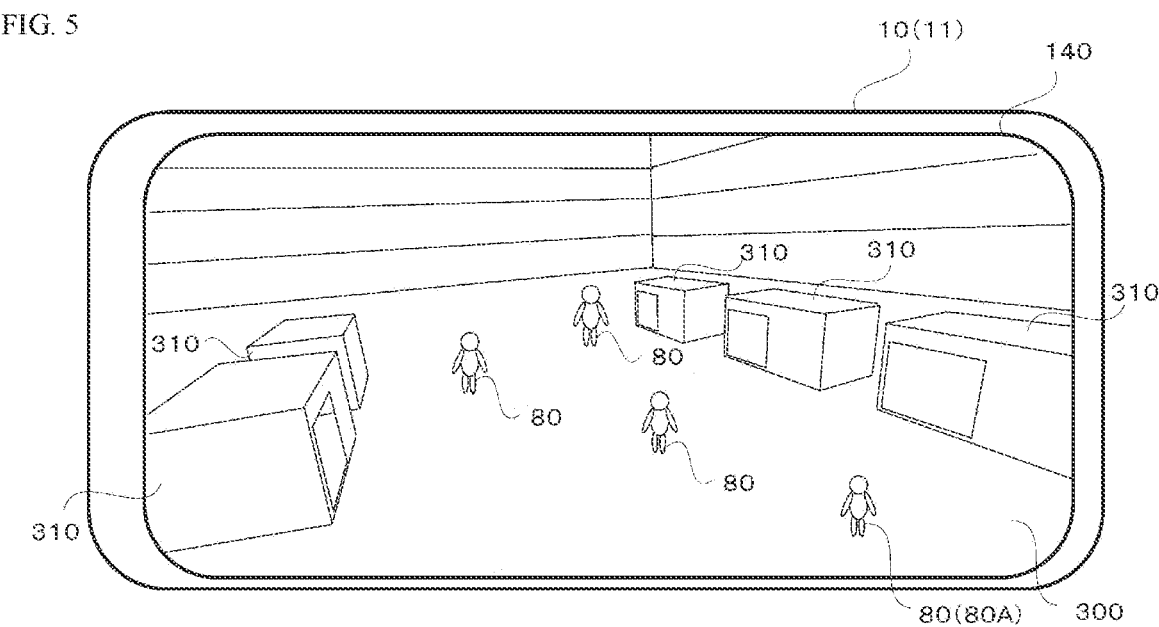
FIG. 5 shows an example of a display shown on a display 140 of the terminal 10.

FIG. 5 shows an example of the display shown on the display of the first terminal 11 by operating the first terminal 11 and launching an application. As shown in FIG. 5, a virtual space 300 is displayed on the display 140. The virtual space 300 is, for example, a three-dimensional space. Within the virtual space 300, avatar 80 and virtual venue 310 are shown. In addition to the avatar 80 and the virtual venue 310, a live venue (to be described later) is also displayed in the virtual space 300.

The avatar 80 is configured to perform at least one of walking, running, and leaping (jumping), for example, by user operation. The avatar 80 is configured to be able to perform at least one of walking, running, and leaping (jumping), for example. The avatar 80 can, for example, examine a virtual object, push a virtual object, pull a virtual object, lift a virtual object, be seated on a virtual object, pass a virtual object, or purchase a virtual object, by user operation. Here, virtual objects are, for example, avatars, doors, foodstuffs, admission tickets, chairs, exhibits, etc. When the user operates the avatar 80 using the terminal 10, data related to the operation is transmitted to the server device 20.

The "examine a virtual object" operation described above causes a description of the virtual object to be displayed on the display 140. The text describing the virtual object may be, for example, at least one of the followings: the name of the virtual object, the use of the virtual object, and the price of the virtual object. The description of the virtual object may be, for example, at least one of the followings: text, image, and video.

The above-mentioned operations of "pushing a virtual object," "pulling a virtual object," and "lifting a virtual object" can change the position of the relevant virtual object in the virtual space 300.

The above-mentioned operation "to be seated at a virtual object" causes the avatar 80 to be seated at the virtual object. The avatar 80 may be configured to be seated at a specific location other than the virtual object. It is also assumed that the avatar 80 is seated at the relevant virtual object, or that the avatar 80 is seated at a specific location other than the relevant virtual object. In this case, the display 140 may be a different display screen than the display screen before the avatar 80 is seated (e.g., display screen without UI controls or chat screen), or it may hide the user interface that existed before the avatar 80 was seated. In the case where the display 140 displays a different display screen than the display screen before the avatar 80 was seated the display unit 140 may display a full screen display of the screen or other screen to be displayed.

The "purchase a virtual object" operation described above allows, for example, the virtual object can be purchased. If the virtual object is wearable, the avatar 80 can change its appearance by wearing the purchased virtual object.

Among the avatars displayed on the display 140, the avatars 80 other than the avatar 80 to be manipulated. The avatars may be avatars operated by the user, or may be pre-determined for operation within the virtual space 300. If the avatar 80 has a pre-determined behavior in the virtual space 300, the avatar 80 is an NPC (Non Player Character), which means that the avatar 80 acts as an NPC (Non Player Character).

The appearance of the avatar 80 shown in FIG. 5 is all the same, but the present invention is not limited thereto. The appearance of the avatar 80 may be determined based on data relating to a user who operates the avatar 80. For example, when the user who operates the avatar 80 is a male, the appearance of the avatar 80 may be a male. For example, when the user who operates the avatar 80 is a woman, the appearance of the avatar 80 may be a woman.

The behavior of the avatar in the virtual space may also change in conjunction with the user's actions. For example, when the user makes a nodding motion, the avatar in the virtual space may do the same. Here, the motion data may be obtained using, for example, a motion capture system. As will be readily understood by those skilled in the art having the benefit of this disclosure, some examples of suitable motion capture systems that may be used with the device and methods disclosed in this application are optical motion capture systems with or without passive or active markers, optical motion capture systems, and inertial and magnetic non-optical systems. Motion data can be acquired using an image capture device (such as a CCD (charge coupled device) or CMOS (complementary metal oxide semiconductor) image sensor) coupled to a computer that converts motion data to video or other image data.

Figure 6:
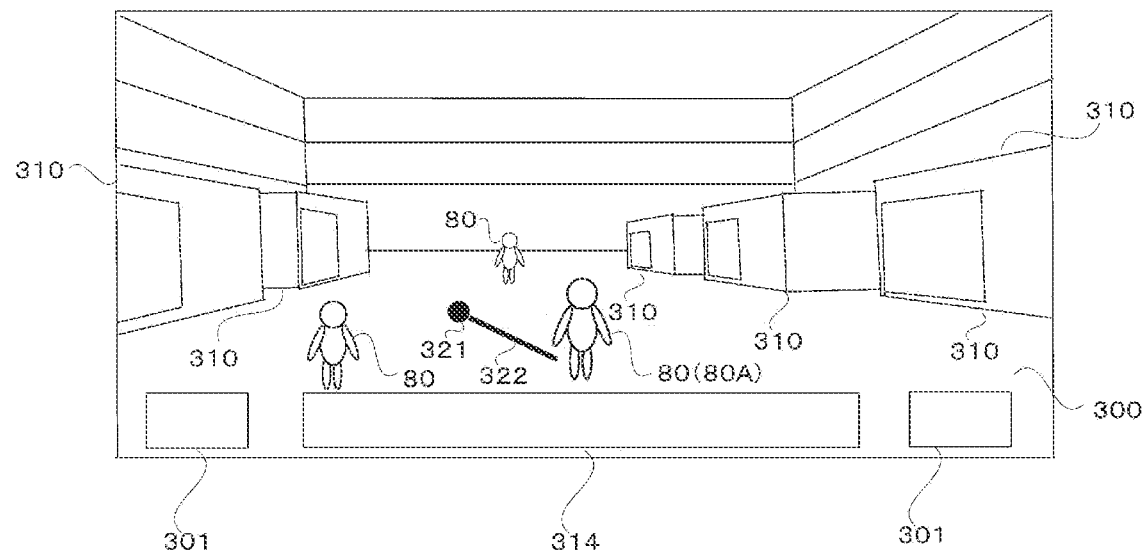
FIG. 6 shows an example of a display shown on the display 140 of the terminal 10.

When operating avatar 80A shown in FIG. 5, for example, display 140 displays a screen as shown in FIG. 6.

Figure 7:
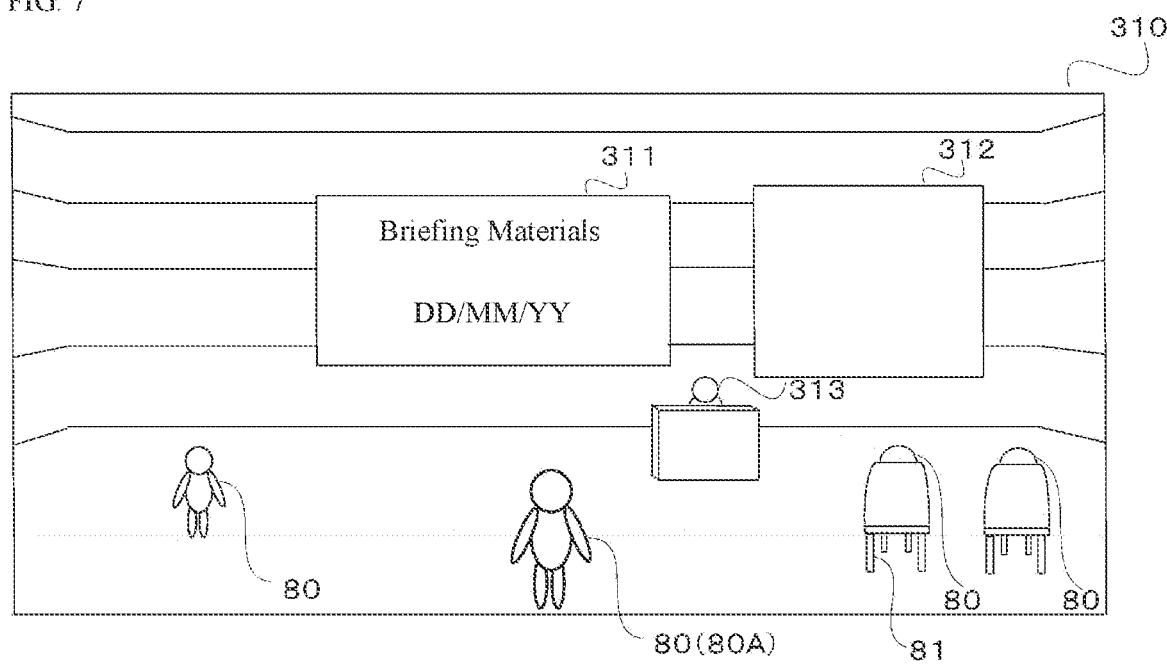
FIG. 7 shows an example of a display shown on the display 140 of the terminal 10.

FIG. 6 shows an example display on the display 140 of the terminal 10. Specifically, FIG. 6 shows an example of what is displayed on the display 140 of the first terminal 11 when the first user operates the avatar 80A using the first terminal 11. As shown in FIG. 6, for example, avatar 80, avatar 80A, and virtual venue 310 are displayed on the display 140. Here, the display 140 shows the back of the avatar 80A, and the line of sight of the first user operating the first terminal 11 and the line of sight of the avatar 80A corresponding to the first user are in the same direction. The display 140 shows, for example, the region in the virtual space including the avatar 80A based on the virtual viewpoint located in the front direction of the paper in FIG. 6. The display 140 shows the region of the virtual space that includes the direction of travel of avatar 80A. By manipulating the avatar 80A using the terminal 10, the region of the virtual space displayed on the display 140 can be changed. For example, by changing the direction of travel of avatar 80A by 180 degrees using terminal 10, the region behind avatar 80A in FIG. 6 can be displayed. In this way, by manipulating avatar 80A using terminal 10, regions not shown in FIG. 6 can be displayed on display unit 140. When the user operating the first terminal 11 operates avatar 80A and avatar 80A shown in FIG. 6 is positioned inside virtual venue 310, a display screen will appear, for example, as shown in FIG. 7.

In FIG. 6, when the avatar 80A is operated by the first user, the first terminal 11 acquires, for example, data regarding the position of the avatar 80A in the virtual space 300 of the avatar 80A. Also, for example, the data concerning the position in the virtual space 30 of the avatar 80A acquired by the first terminal 11 is transmitted to the server device 20. Note that the timing at which the first terminal 11 acquires the data relating to the position of the avatar 80A in the virtual space 300 may be arbitrary. In addition, for example, the timing at which the data concerning the position in the virtual space 300 of the avatar 80A acquired by the first terminal 11 is transmitted to the server device 20 may also be arbitrary.

It may also be possible to touch any region of the display 140 of the first terminal 11. The first terminal 11 may be equipped with an acceleration sensor (not shown), and when the first terminal 11 is operated, it may be configured to be able to change the display region and/or direction displayed by the display 140 based on the acceleration sensor. The display region and/or direction displayed by the display unit 140 may be configured to change based on the acceleration sensor. Here, the "arbitrary region" described above includes, for example, region 301 and/or region 314 in FIG. 6. The region 301 and/or region 314 is an operation user interface for performing a predetermined display control by performing a touch operation. The "touch operation" is an operation user interface to control a predetermined display by performing touch operations. The "touch operation" refers to at least one of the following operations: tap, double-tap, swipe, flick, pinch-in, and pinch-out, for example. As shown in FIG. 6, two regions 301 may be provided, and one or more than three regions 301 may be provided. When two or more regions 301 are provided, one region 301 corresponds to the region used for walking the avatar 80A, for example, and the other region 301 corresponds to the region used for jumping the avatar 80A, for example. In this way, the avatar 80A can be made to walk or jump by touching region 301. Here, the touch operation to make the avatar 80A walk or jump corresponds to, for example, tapping or double-tapping region 301 of the avatar 80A. The region where the touch operation to make the avatar 80A walk or jump may be a region other than region 301. The regions 301 and/or 314 may be displayed in the same or different positions not only in the case of the display in FIG. 6, but also in other drawings (e.g., FIG. 7 and/or FIG. 8) described below.

For example, as shown in FIG. 6, when the user taps or double-taps point 321, display 140 displays line 322 connecting avatar 80A and point 321. The avatar 80A walks along line 322 to point 321. The avatar 80A walks along line 322 to point 321. The point 321 and line segment 322 may be any color. In addition, the touch operation to make avatar 80A walk is to change the direction of travel by flicking any region of the avatar 80A, and then tap or double-tap any point on the virtual straight line in the changed direction of travel.

The first terminal 11 is also configured to allow the first user to chat with a user corresponding to at least one of the avatars 80. Here, the region 314 is a region for displaying a message to be input by the user corresponding to the avatar 80. The user chatting with the first user is an individual user or an exhibitor. In the case where multiple messages are displayed in the region 314, if it is not possible to display all the messages in the region 314, it is possible to display all the messages in the region 314. The touch operation in the case where all messages cannot be displayed in the region 314 is, for example, a swipe.

FIG. 7 is a diagram illustrating an example of a display screen in the virtual venue 310 displayed on the display unit 140 of the terminal 10. In FIG. 7, the user operating the first terminal 11 operates the avatar 80A, and the avatar 80A shown in FIG. 6 is located inside the virtual venue 310, so that the scene is switched, thereby switching the display screen The URL when the avatar 80A is displayed outside the virtual venue 310 (for example, the display screen in the case where the avatar 80A exists in FIG. 6) is different from the URL when the avatar 80A is displayed inside the virtual venue 310 (for example, the display screen in the case where the avatar 80A exists in FIG. 7) using the web browser of the first terminal 11. Therefore, when the web browser of the first terminal 11 is used, the URL of the avatar 80A shown in FIG. 6 is different from the URL when the avatar 80A is located inside the virtual venue 310 (e.g., FIG. 7). Therefore, when using the web browser of the first terminal 11, if avatar 80A shown in FIG. 6 is located inside the virtual venue 310, the URL will be changed. As shown in FIG. 7, the avatar 80, the avatar 80A, the chair 81, the display region 311, the display region 312, the avatar 313, and the region 314 are shown. Here, the virtual venue 310 is, for example, a booth at an exhibition or event site. At least one chair 81 is provided. The avatar 80 and the avatar 80A shall be located in the first region within the virtual venue 310.

A chair 81 is a virtual object on which the avatar 80 can be seated, for example. For example, when the user manipulates the avatar 80A to approach a specific chair among a plurality of chairs 81 and performs a predetermined operation, the avatar 80 is seated in the chair 81. Also, for example, by the user operating the avatar 80A and approaching a specific chair among the plurality of chairs 81 and performing a predetermined operation, the first display screen of the terminal 11 displays a message asking whether or not the user wants to sit in the particular chair. In the case where a message is displayed on the display screen of the first terminal 11 asking whether or not to sit in a particular chair, if the user operates the terminal 10 and perform an operating to indicate his or her intent to sit in the chair in response to the message, the avatar 80 is seated in the chair 81. As a result, the display 140 displays the first-person viewpoint instead of the third-person viewpoint. In other words, instead of a display that includes avatar 80A, display 140 displays a display that does not include avatar 80A is not included in the display.

In the display region 311, for example, materials for various explanations are displayed and/or a video is displayed. The display region 312 displays the name of the organization operating the virtual venue 310, the theme of the briefing, etc. The avatar 313 is, for example an avatar that imitates a staff member facilitating the virtual venue 310. The avatar 313 may be an avatar operated by the user or an avatar whose behavior in the virtual space 300 is predetermined. The avatar 313 may be an avatar operated by the user or an avatar whose behavior in the virtual space 300 is predetermined. When the avatar 80 operates with predetermined behavior in the virtual space 300, it means that the avatar operates as an NPC as described above.

A region 314 displays at least one of the following messages: a message sent from the first terminal 11, and a message sent from a terminal other than terminal 1. Here, the message displayed in region 314 may be a message addressed to the first terminal, and the message displayed in the region 314 may be a message exchanged between terminals other than the first terminal. Thus, the region 314 may be used to display messages that are viewed by at least one avatar 80 that can be viewed and/or chatted with by a user corresponding to at least one avatar 80, serves as a region that can be viewed and/or chatted with by a user corresponding to the at least one avatar 80 present in the virtual space 300.

The condition for the region 314 to appear on the display 140 is not limited to when the avatar 80 is located within the virtual venue 310. For example, when the avatar 80 is located within a predetermined region in virtual space 300, a display region corresponding to the predetermined region may be displayed on the display 140. In other words, the display region to be shown on the display 140 may be determined according to the position where the avatar 80 is located. This allows the user to exchange messages with users corresponding to other avatars 80 that exist in the same region as the region where his/her avatar 80 exists. Thus, the user can easily communicate with other users who share interests, concerns, and/or attributes.

The terminal from which the message displayed in region 314 is sent is, for example, the terminal used by the user operating the avatar in the virtual venue 310. However, the avatar corresponding to the terminal from which the message originates that is displayed in the region 314 may or may not be displayed in the virtual venue 310.

<0081> In addition, a commodity that can be purchased may be displayed in the region 314. The product is, for example, a product related to an operator or an operation organization that operates the virtual hall 310. In the region 314, a content related to the commodity and a content prompting purchase of the commodity may be displayed together with the commodity. Here, the content urging the purchase of the commodity is a display such as "put in a shopping basket" or the like, and is configured to be selectable.

In addition, when the user operates the terminal 10 to proceed with the purchase of at least one product displayed in region 314, for example, a browser installed in the terminal 10 is activated and a page requesting input of the contents used to purchase the product is displayed on the display 140.

At a predetermined time in the virtual venue 310, for example, a predetermined explanation begins. Here, the time used in the virtual space may be a time that is synchronized to be the same as the real time, or it may be a time used in the virtual space 300 separately from the real time. The condition for the start of a given explanation in the virtual venue 310 need not be a condition related to time. For example, the condition for a predetermined explanation to begin in the virtual venue 310 may be, for example, when the number of avatars present in the virtual venue 310 exceeds a predetermined number, or when the number of avatars present in the virtual venue 310 exceeds a predetermined number.

The system may be configured so that multiple avatars can be seated in one seat at the same time in duplicate. For example, with avatar 80 seated in the leftmost chair 81 in FIG. 7, if a user uses the terminal 10 to Avatar 80A is seated in the leftmost chair 81 of FIG. 7 by manipulating avatar 80A In this way, for example, all avatars viewing the content displayed in the display region 311 can be seated in the virtual venue 310, even when the total number of avatars located in the virtual venue 310 exceeds the total number of chairs 81.

The predetermined description to be started at a predetermined time is performed by displaying a predetermined content in the display region 311 and/or outputting a voice. The description is, for example, a moving image. The moving image may be, for example, any of a predetermined explanation moving image, an event moving image such as a concert, a moving image such as a movie, and a moving image reflecting the motion and/or performance of the real-time Vtuber. When the description is a moving image, the terminal 10 requests the second server system 22 to request data relating to the moving image Then, the second server system 22 transmits the data relating to the moving image to the terminal 10 in response to the request. Thus, the terminal 10 can receive the data relating to the moving image from the second server system 22 and view the moving image.

Figure 8:
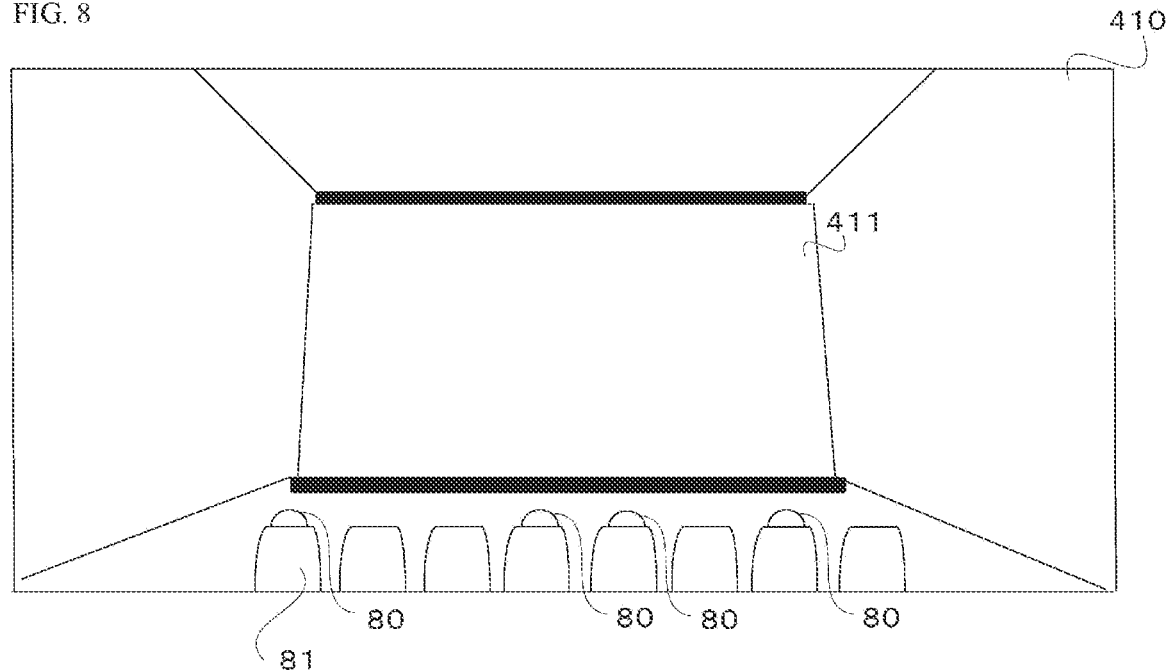
FIG. 8 shows an example of a display shown on the display 140 of the terminal 10.

FIG. 8 shows an example display on the display 140 of the terminal 10. FIG. 8 shows a live venue 410. The live venue 410 is an example of a venue established within the virtual space 300. As shown in FIG. 8, a plurality of chairs 81 are provided inside the live venue 410. The chairs 81 are virtual objects on which avatars 80 can be seated, for example. For example, when the user operates avatar 80A to approach a specific chair among the plurality of chairs 81 and performs a predetermined operation, the avatar 80 is seated in the chair 81. Also, for example, by the user operating the avatar 80A and approaching a specific chair among the plurality of chairs 81 and performing a predetermined operation, the display screen of the first terminal 11 displays a message asking whether or not the user wants to sit in the particular chair. In the case where a message is displayed on the display screen of the first terminal 11 asking the user whether or not to sit in a particular chair, if the user responds to the message using the terminal 10, when the user performs the specified operation indicating the intention to sit in the particular chair, the avatar 80 is seated in the chair 81.

At the predetermined time, the video is played in the display region 411. The time used in the virtual space may be a time that is synchronized to be the same as the real time. The time used in the virtual space may be a time used in the virtual space 300 that is different from the real time. The condition under which the video is played in the display region 411 may not be a condition related to the time. For example, the condition for the video to be played in the display region 411 may be, for example, that the number of avatars present in the live venue 410 exceeds a predetermined number or when a particular avatar is located in the live venue 410.

The system may be configured so that multiple avatars can be seated in one seat at the same time in duplicate. For example, with the avatar 80 seated in the leftmost chair 81 in FIG. 8, if a user uses the terminal 10 to the avatar 80A to the leftmost chair 81 in FIG. 8 by manipulating the avatar 80A may be configured to allow the user to seat the avatar 80A in the leftmost chair 81 of FIG. 8. In this way, for example, even when the total number of avatars located in the live venue 410 exceeds the total number of chairs 81, the display region 411, all avatars viewing the content displayed in the live venue 410 can be seated within the live venue 410.

In FIG. 8, avatar 80A is not shown in the live venue 410, but it is not limited to this. The avatar 80A may be displayed on the display 140 within the live venue 410, and the avatar 80A may be configured to operate within the display 140 in response to the operation of the first terminal 11 used by the first user.

4. Operation of System 1000

The operation of the system 1000 is described with reference to FIGS. 9 and 10. FIGS. 9 and 10 show a flowchart of an example of the operation performed using the system 1000.

First, referring to FIG. 9, S111-S193 will be explained in turn.

In S111, the first user operates the first terminal 11 to start the application, the second user operates the second terminal 12 to start the application.

At S121, the first terminal 11 acquires the first data. Also, at S122, the second terminal 12 acquires the second data. After processing S122, the second terminal 12 sends data regarding the location of the avatar operated by the second user to the server device 20. Thereafter, the server device 20 transmits the second data including the data regarding the location of the avatar operated using the second terminal 12 to the first terminal 11.

In FIG. 9, the example where the terminal 10 is the first terminal 11 and the second terminal 12 is explained. However, in addition to the first terminal 11 and the second terminal 12, at least one other terminal 10 may also be used. In this case, data regarding the location of the avatar operating using each of the at least one other terminal is transmitted to the server device 20. The server device 20 then determines the second data based on the data received from the terminals other than the first terminal and transmits the second data to the first terminal 11.

The first data includes, for example, data relating to an avatar in the virtual space that is operated using the first user's terminal. The first data also includes user operation data and operation history data, for example, data regarding the location of the first user's avatar. The first data includes, for example, data related to the action history in the virtual space of the avatar in the virtual space operated using the first user's terminal.

The second data also includes, for example, data relating to an avatar in the virtual space that is operated using a terminal of each of the at least one user other than the first user. The second data also includes at least one of, for example, a position of an avatar of at least one user other than the first user, and a total number of avatars of at least one user other than the first user that are located in the first region in the virtual space. The second data includes at least one of, for example, the location of the avatar of at least one user other than the first user and the total number of avatars of at least one user other than the first user that are located in the first region of the virtual space.

At S131, the first terminal 11 performs the first determination process. Here, the first determination process is a process for determining whether or not the location of the first user's avatar or the second data satisfies the predetermined conditions. In S131, if the first terminal 11 determines that the predetermined conditions are met, the first terminal 11 determines the control data to control the display 140 of the first terminal 11, and the process of S141 is executed. On the other hand, if it is determined in S131 that the first terminal 11 does not meet the predetermined conditions, the process of S131 is repeated.

When the total number of the avatars 80 located in the first region among the avatars 80 other than the avatar 80A is equal to or greater than the first value when the avatar 80A of the first user is located in the first region, when the total number of the avatars 80 located in the first region among the avatars 80 other than the avatar 80A is equal to or less than the second value, at least one of the avatar 80 other than the avatar 80A and the avatar 80 located within the first distance from the one avatar 80 located in the first region is equal to or less than the fourth value. The above-described first value is larger than the above-described second value, and the third value described above is larger than the fourth value described above. The first region is, for example, a region inside the virtual venue 310 or a region inside the live venue 410.

The server device 20 may send data regarding at least any of the number of simultaneous connections, users, and event attributes to the first terminal 11. The first terminal 11 receives the data and, considering the performance of the illustration. The total number of avatars 80 to be displayed by the display unit 140 may be determined. In this way, even if the first terminal 11 does not have a high level of performance, the first terminal 11 may still be able to display the avatars 80 within the range of performance that the first terminal 11 has. The first terminal 11 also determines the total number of avatars 80 as described above, considering at least one of the following: the number of mesh vertices of the 3D model that can be illustrated, the number of materials, and the number of textures.

The control data determined in S131 is data for controlling the display screen of the first terminal 11. The control data includes data on the total number of avatars of at least one user to be displayed on a display screen determined on the basis of the position of the avatar included in the second data on the display screen determined based on the position of the avatar included in the second data and the total number of the avatars included in the second data.

In S141, the first terminal 11 performs a process to control the display 140 of the first terminal 11 based on the control data.

In S183, the server device 20 determines analysis data based on at least one of the first data and the second data. Then, the server device 20 transmits the determined analysis data to the device 70. For example, each time the server device 20 receives at least one of the first data and the second data, the server device 20 determines the analysis data and transmits the determined analysis data to the device 70.

At S193, the server device 20 determines the advertisement data based on at least one of the first data and the second data. The advertising data is the data determined based on the first data and is the data for the first user who operates the first terminal 11, and the data determined based on the second data and is the data for the second user who operates the second terminal 12. At S193, the server device 20 transmits the determined advertisement data for the first user to the first terminal 11, and transmits the determined advertising data for the second user to the second terminal 12.

Next, referring to FIG. 10, S111-S193 will be explained in turn.

In S111, the first user starts the application by operating the first terminal 11. In S112, the second user starts the application by operating the second terminal 112.

At S121, the first terminal 11 acquires the first data. Also, in S122, the second terminal 12 obtains the second data. After S121, the server device 20 obtains the first data from the first terminal 11. After S122, the server device 20 obtains the first data from the second terminal 12. The server device 20 acquires the first data from the first terminal 11 and acquires the data acquired at the second terminal 12 from the second terminal 12. After the server device 20 obtains the first data from the first terminal 11 and the data obtained at the second terminal 12 from the second terminal 12, the processing in S133 is performed. The server device 20 also sends a message to the first terminal 11 requesting the generation of an avatar for at least one user.

In FIG. 9, the example where the terminal 10 is the first terminal 11 and the second terminal 12 is explained. However, in addition to the first terminal 11 and the second terminal 12, at least one other terminal 10 may also be used. In this case, data regarding the location of the avatar operating using each of the at least one other terminal is transmitted to the server device 20. The server device 20 then determines the second data based on the data received from the terminals other than the first terminal.

In S133, the server device 20 performs the first determination process. The first determination process in S133 in FIG. 10 is the same as the first determination process in S131 in FIG. 9. In S133, when the server device 20 determines that the predetermined condition is satisfied, the server device 20 determines the control data, transmits the control data to the first terminal 11, and executes the processing in step S141. On the other hand, when it is determined in S133 that the predetermined condition is not satisfied, the process of S133 is repeated.

The control data determined in S133 is data for controlling the display screen of the first terminal 11. The control data includes data on the total number of avatars of at least one user to be displayed on a display screen determined on the basis of the position of the avatar included in the second data on the display screen determined based on the position of the avatar included in the second data and the total number of the avatars included in the second data.

At S141, the first terminal 11, based on the control data The display 140 of the first terminal 11 is controlled.

In S183, the server device 20 determines analysis data based on at least one of the first data and the second data. Then, the server device 20 transmits the determined analysis data to the device 70. For example, each time the server device 20 receives at least one of the first data and the second data, the server device 20 determines the analysis data and transmits the determined analysis data to the device 70.

In S193, the server device 20 determines the advertisement data based on at least one of the first data and the second data. The advertisement data includes data to be determined on the basis of the first data and for a first user who operates the first terminal 11 and data for a second user who is data determined based on the second data and operates the second terminal 12. In S193, the server device 20 transmits the determined advertisement data for the first user to the first terminal 11, and transmits the determined advertisement data for the second user to the second terminal 12.

Also, with respect to S193 of FIGS. 9 and S193 of FIG. 10, when there is a history in which the avatar 80 enters the virtual venue 310 or the live venue 410 for performing an event held by a predetermined operation organization, and a history of viewing a moving image reproduced in the virtual venue 310 or the live venue 410 is present, the advertisement data transmitted to the first terminal 11 may include, for example, data related to an event in which a predetermined operation organization holds in the future. The data includes at least one of text data, image data, and moving image data.

In S193 of FIGS. 9 and S193 of FIG. 10, the above-described advertisement data may be, for example, data including a URL for accessing a database that stores third data relating to an advertisement determined based on the first data. The above-described advertisement data may be, for example, data including a URL for accessing a database for storing fourth data related to an advertisement determined on the basis of the data acquired in the second terminal 12. The above-described advertisement data may be already downloaded into an application (application) by batch processing or the like, for example. In this case, the server device 20 may transmit data related to the ID corresponding to the data to be transmitted to the first terminal 11, and the first terminal 11 may display the advertisement data based on the ID. In addition, the server device 20 may transmit data related to the ID corresponding to the data to be transmitted to the second terminal 12, and the second terminal 12 may display the advertisement data based on the ID.

FIG. 11 shows an example of data transmitted from the terminal 10. In FIG. 11, when each of the first user, the second user, and the third user performs an avatar operation using the own terminal 10, the server device 20 is described with respect to various data received from each terminal 10. The various types of data include, for example, "age", "gender", "current position", "virtual object", "chat history", "content viewing history", "part ID", and "simple avatar". Here, the "part ID" is, for example, data for specifying an avatar. The "simple avatar" is, for example, data related to an ID of a pattern corresponding to gender including men and women.

The first data described above may include, for example, at least any of the contents regarding the first user in FIG. 11. The second data described above can also include content related to the second user in FIG. 11, and/or content related to the second data described above can include at least any of the contents regarding the third user in FIG. 11.

Here, with respect to the "age" mentioned above, FIG. 11 shows an example where the age of the first user is 21, the age of the second user is 31, and the age of the third user is 41.

With respect to the "gender" described above, FIG. 11 shows an example where the gender of the first user's avatar is male, the gender of the second user's avatar is female, and the gender of the third user's avatar is male.

With respect to the "current position" described above, FIG. 11 shows an example where the avatar operated by the first user is at position A01, the avatar operated by the second user is at position B01, and the avatar operated by the third user is at position C01.

In addition, regarding the "virtual object" described above, an example in which the avatar operated by the first user purchases the virtual object A12 at the price A13 at time A11, the avatar operated by the second user opens the virtual object B12 at time B11, and the avatar operated by the third user acquires the virtual object C12 at time C11. Note that the virtual object A2 is, for example, an admission ticket for entering a live venue. The virtual object B22 is, for example, a door.

Regarding the "chat history" described above, FIG. 11 shows an example where the first user's terminal sends the message "Hello" to the third user's terminal at position A22 at time A21, the second user has no chat history with any other user, and the third user's terminal receives the message "Hello" from the first user's terminal at position C22 at time C21.

In the above-described "content viewing history", in FIG. 11, the avatar of the first user stands at the position A32 at time A31 to start viewing the content, and the avatar of the second user views the content in the seat B33 at time B31 at the position B32 for two hours, and the avatar of the third user views the content at the time C31 at the position C32 and leaves the seat C33.

Although an example of the age of the user has been described with respect to the "age" described above, the present invention is not limited thereto. For example, the "age" described above may indicate an age group to which the user belongs. For example, when the age of 21 years or more and 30 years or less is defined as the category 1, the age of the first user may indicate that the age belongs to the category 1. For example, when 31 years or more and 40 or less are defined as categories 2, the age of the second user may indicate that the second user belongs to the category 2. For example, when the age of 41 years or more and 50 years or less is defined as the category 3, the age of the third user may indicate that the age belongs to the category 3. In this way, for example, when the analysis data is determined in S183 of FIG. 9 or S183 of FIG. 10 and the analysis data is transmitted to the device 70, data related to the age can be used for marketing or the like without transmitting the specific personal information of the user to the device 70.

With respect to the "current position" described above, the example of indicating the avatar's position at a specific time is described, but is not limited to this. For example, it may include data indicating the avatar's locus of movement within the virtual space 300 within a predetermined period of time.

Also, with respect to the "chat history" described above, the example of the first user sending the message "Hello" to the third user's terminal at position A22 at time A21 is described. Although the example of sending the message "Hello" to the third user's terminal is described, the content of the message is not limited to this. The data transmitted from one user's terminal to another user's terminal may include at least one of the following: text, pictograms, voice messages, images, and video.

The first data and the second data illustrated in FIG. 11 are not limited to the examples described above, and may include data related to the "action history". The data related to the "action history" includes at least one of, for example, a time at which the avatar 80 enters the virtual venue 310, a time when the avatar 80 enters the live venue 410, a time when the avatar 80 leaves the virtual venue 410, a time when the avatar 80 stays in the virtual venue 310, a time when the avatar 80 stays in the live venue 410, a time when the avatar 80 starts viewing the object displayed in the display region 311 in the virtual venue 310, a time when the avatar 80 starts viewing the video in the live venue 410, a time (period) while the avatar 80 views the object displayed in the display region 311 in the virtual venue 310, a time (period) when the avatar 80 views the video in the live venue 410, a time when the avatar 80 finishes the object displayed in the display region 311 in the virtual venue 310, a time when the avatar 80 finishes viewing the video in the live venue 410, a time when the avatar 80 is seated on the chair 81, and a time when the avatar 80 leaves the chair 81, a history of the position data of the chair 81, a history of the received data including the message received from the terminal 10 operated by the user operating the one terminal 10, a history of the reception data including the message received from the terminal 10 operated by the user operating the one terminal 10, and a history related to the transmission data including the message transmitted to the terminal 10 operated by the user operating the other terminal 10 by the user operating the one terminal 10.

Also, the server device 20 may select which of the contents described in FIG. 11 to send to the device 70. For example, if the data sent to device 70 includes the contents of the chat history described in FIG. 11, the server device 20 may send data that excludes the chat history from the contents described in FIG. 11.

Further, the server device 20 may transmit data obtained by changing at least a part of the content described in FIG. 11 to the device 70. For example, instead of transmitting data indicating that the avatar of the first user is located at the position A01 to the device 70, the server device 20 may transmit data indicating that the avatar of the first user is located in the vicinity of the position A01 to the device 70.

When receiving data including a message from one of the device 70 and the second terminal 12 to the other of the device 70 and the second terminal 12, the data including the message may not be transmitted to the other terminal 10. In this way, the data exchanged between the second terminal 12 and the device 70 is not transmitted other than the terminal 10 other than the second terminal 12. Therefore, when the data transmitted and received between the second terminal 12 and the device 70 include data related to the personal information of the user operating the second terminal 12, it is possible to reduce the possibility that the personal information is known to the user who operates the terminal 10 other than the second terminal 12.

Thus, the display unit 140 may not perform display reflecting the total number and position of the avatar 80 in real time. However, even when the display unit 140 does not perform display reflecting the total number and position of the avatar 80 in real time, the first user who operates the first terminal 11 can confirm the display reflecting the total number and position of the avatar 80, and can communicate using the whole chat in real time with other users. Therefore, even when the display unit 140 reflects the total number and position of the avatar 80 and does not reflect the total number and position of the avatar 80 in real time, it is possible to reduce the possibility that the user feels uncomfortable.

When the display 140 displays region 314 and users chat with each other, the user IDs and avatars 80 in the chat may or may not be tied to each other.

As described above, according to the present disclosure, the first data relating to the avatar in the virtual space operated by using the terminal of the first user is stored, the second data relating to the avatar in the virtual space operated by using the terminal of each user of at least one user other than the first user is received via the communication line, control data for controlling the display screen of the terminal of the first user is determined when it is determined that the position of the avatar of the first user or the second data satisfies a predetermined condition, and the display screen is controlled based on the control data. The second data includes at least one of the coordinates of the avatar of the at least one user and the total number of avatars located in the first region in the virtual space among the avatars of the at least one user. Therefore, for example, the total number of avatars displayed on the display unit 140 of the terminal 10 can be changed. Therefore, even when the performance of the terminal 10 (for example, a smart phone)

is low, even when the application is executed using the terminal 10, the display unit of the terminal 10 can suppress the load and the delay of the display control while causing a sense of presence by causing a plurality of avatars to appear in the virtual space. In this way, the display unit 140 of the first terminal 11 performs display by changing the total number and/or position of the actual avatar 80. On the other hand, the exhibitor, the operator, and/or the management company relating to the virtual space 300 can acquire data relating to the total number and/or position of the actual avatar instead of data relating to the total number and/or position of the changed avatar displayed by the display unit 140. Therefore, accurate data relating to the total number and/or position of the avatar can be used for marketing.

5. Modified Example

The memory unit 160 of the terminal 10 may store the data acquired at the terminal 10 when the data is received at the terminal 10. Specifically, for example, the memory unit 160 of the terminal 10 may store the second data. The terminal 10 may then determine the control data using the previously received second data stored in the memory unit 160.

In addition, the memory 220 of the server device 20 may store the data acquired at the terminal 10. Specifically, for example, the memory 220 of the server device 20 may store the second data. The server device 20 may then determine the control data using the previously received second data stored in the memory 220.

FIG. 12 shows an example of the number of avatars displayed on the display unit 140 of the first terminal 11. In FIG. 12, the number of avatars 80A excluding the avatar 80A in the number of avatars present in a predetermined region in the virtual space 300 is shown.

Here, the number of avatars present in a predetermined region at time 1 is one, the number of avatars operating the second terminal at time 2 is two, the number of avatars operating the second terminal at time 3 is seven, the number of avatars at time 4 is ninety, and the number of avatars is four hundred at time 5. Note that the number of avatars at each time of time 1 to time 5 is not limited to the above examples.

In addition, the time 1 at the time 1 to the time 5 is the past time close to the current time, and the time 5 at the time 1 to the time 5 is the past time apart from the current time. For example, the time 1 is, for example, the time before five minutes from the current time, the time 2 is, for example, the time before the current time 1, the time 3 is, for example, the time before the current time 12, the time 4 is, for example, the time before the current time 1, and the time 5 is, for example, the time from the current time to 3 days. It should be noted that the respective times of time 1 to time 5 are not limited to the above-described examples.

Here, when the total number of avatars present in the predetermined region is equal to or greater than the first value, or when the total number of avatars included in the virtual venue 310 is equal to or less than the second value, the total number of avatars displayed on the display unit 140 is changed to a predetermined value. Here, the first value is, for example, 11, and the second value is, for example, 9. The first value is larger than the second value. The predetermined value is, for example, 10. The specific value of the first value and the second value is not limited thereto.

For example, as in Example 1 of FIG. 12, it is assumed that the number of avatars 1 at the time 1 is displayed on the display unit 140 of the first terminal 11. In this case, the total number of avatars displayed on the display unit 140 of the first terminal 11 is equal to or less than the second value. Therefore, the total number of avatars displayed on the display unit 140 of the terminal 10 is changed from one to ten. That is, the total number of avatars displayed on the display unit 140 is changed from the number of avatars at time 1 to the total number of avatars at time 1 to time 3.

Also, for example, as in Example 2 of FIG. 12, it is assumed that the total number of avatars 3 at the time 1 and the time 2 is displayed on the display unit 140 of the first terminal 11. In this case, the total number of avatars displayed on the display unit 140 of the first terminal 11 is equal to or less than the second value. Therefore, the total number of avatars displayed on the display unit 140 of the first terminal 11 is changed from three to ten. That is, the total number of avatars displayed on the display unit 140 is changed from the sum of the numbers of avatars in each of the time 1 and the time 2 to the sum of the number of avatars in each of the times 1 to 3.

Also, for example, as in Example 3 of FIG. 12, it is assumed that the total number of avatars (10 bodies) at time 1 to time 3 is displayed on the display unit 140 of the first terminal 11. In this case, the total number of avatars displayed on the display unit 140 of the first terminal 11 is less than the first value and is larger than the second value. Therefore, the total number of avatars displayed on the display unit 140 of the first terminal 11 is not changed.

Also, for example, as in Example 4 of FIG. 12, it is assumed that the total number of avatars (100 bodies) at time 1 to time 4 is displayed on the display unit 140 of the first terminal 11. In this case, the total number of avatars displayed on the display unit 140 of the first terminal 11 is equal to or greater than the first value. Therefore, the total number of avatars displayed on the display unit 140 of the terminal 10 is changed from 100 to 10. That is, the total number of avatars displayed on the display unit 140 is changed from the sum of the number of avatars at each time 1 to time 4 to the sum of the number of avatars at each time 1 to time 3.

Moreover, for example, as in Example 5 of FIG. 12, it is assumed that the total number of avatars (500 bodies) at time 1 to time 5 is displayed on the display unit 140 of the first terminal 11. The total number of avatars displayed on the display unit 140 of the first terminal 11 is equal to or greater than the first value. Therefore, the total number of avatars displayed on the display unit 140 of the first terminal 11 is changed from 500 to 10. That is, the total number of avatars displayed on the display unit 140 is changed from the sum of the number of avatars at each time 1 to time 5 to the sum of the number of avatars at each time 1 to time 3.

In FIG. 12, the total number of avatars displayed on the display 1 In FIG. 12, the total number of avatars displayed on the display 140 is changed when the total number of avatars is equal to or greater than the first value or when the total number of avatars is equal to or less than the second value. For example, the total number of avatars after the change may be different depending on the total number of avatars. This specific example is explained below with reference to FIG. 13.

Figures 13, 14:
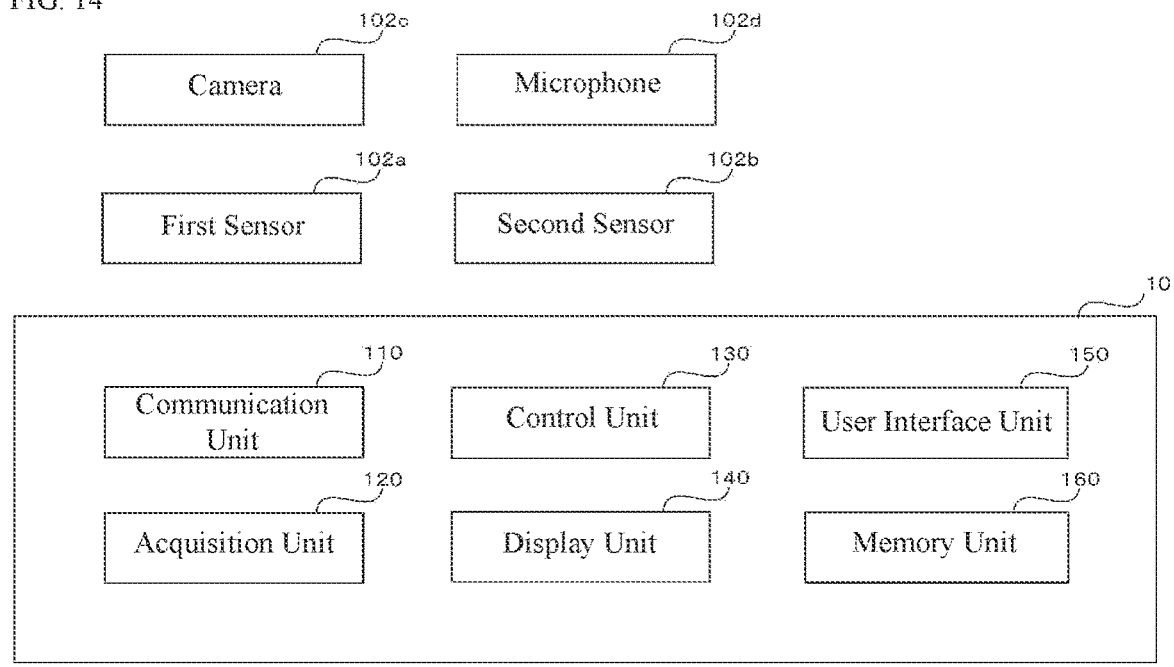
FIG. 13 shows an example of the number of avatars displayed on the display unit 140 of the terminal 10.
FIG. 14 is a block diagram showing an example of the terminal 10 and the functions of a configuration connected to the terminal 10 shown in FIG. 1.

FIG. 13 shows an example of the number of avatars displayed on the display unit 140 of the first terminal 11. In FIG. 13, the number of avatars 80A excluding the avatar 80A in the number of avatars present in the predetermined region is shown.

Here, the number of avatars present in a predetermined region at time 1 is three, the number of avatars operating the second terminal at time 2 is seven, the number of avatars operating the second terminal at time 3 is ten, and the number of avatars is eighty at time 4. Note that the number of avatars at each time of time 1 to time 4 is not limited to the above example.

The time 1 at the time 1 to the time 4 is the past time close to the current time, and the time 5 at the time 1 to the time 5 is the past time apart from the current time. The time 1 is, for example, the time before five minutes from the current time, the time 2 is, for example, the time before the current time 1, the time 3 is, for example, the time before 12 hours from the current time, and the time 4 is, for example, the time from the current time to one day. It should be noted that the respective times of time 1 to time 4 are not limited to the above-described examples.

Here, when the total number of avatars present in the predetermined region is larger than the first value, the number of avatars displayed on the display unit 140 is defined as a first value, and when the total number of avatars included in the virtual venue 310 is less than the second value, the number of avatars displayed on the display unit 140 is defined as a second value. Here, the first value is, for example, 20, and the second value is, for example, 10. The first value is larger than the second value. The specific value of the first value and the second value is not limited thereto.

For example, as in Example 1 of FIG. 13, it is assumed that the number of avatars 3 at the time 1 is displayed on the display unit 140 of the first terminal 11. In this case, the total number of avatars displayed on the display unit 140 of the first terminal 11 is less than the second value. Therefore, the total number of avatars displayed on the display unit 140 of the terminal 10 is changed from three to ten. That is, the total number of avatars displayed on the display unit 140 is changed from the number of avatars at time 1 to the sum of the number of avatars in each of the time 1 and the time 2.

For example, as in Example 2 of FIG. 13, it is assumed that the number of avatars 10 at the time 1 and the time 2 is displayed on the display unit 140 of the first terminal 11. In this case, the total number of avatars displayed on the display unit 140 of the first terminal 11 is equal to or less than the first value and equal to or greater than the second value. Therefore, the total number of avatars displayed on the display unit 140 of the first terminal 11 is not changed.

For example, as in Example 3 of FIG. 13, it is assumed that the number of avatars (100 bodies) at time 1 to time 4 is displayed on the display unit 140 of the first terminal 11. In this case, the total number of avatars displayed on the display unit 140 of the first terminal 11 is larger than the first value. Therefore, the total number of avatars displayed on the display unit 140 of the terminal 10 is changed from 100 to 20. That is, the total number of avatars displayed on the display unit 140 is changed from the sum of the number of avatars at each time 1 to time 4 to the sum of the number of avatars at each time 1 to time 3.

Thus, as described above, in FIG. 13, when the total number of avatars actually present in the virtual space 300 is small and the total number of avatars actually present in the virtual space 300 is less than a predetermined lower limit, the display unit 140 of the first terminal 11 displays the number of avatars that is larger than the total number of the actual avatars as much as possible, and displays the avatar number as small as possible In FIG. 13, when the total number of avatars actually present in the virtual space 300 is large, and the total number of avatars actually present in the virtual space 300 is equal to or greater than a predetermined upper limit, the display unit 140 of the first terminal 11 displays the total number of avatars that are smaller than the actual total number of avatars as much as possible. Therefore, even when the display unit 140 of the first terminal 11 does not perform display in which the total number of avatars of the venue is accurately reflected, the first user can grasp the degree of build-up in the virtual space 300 by checking the total number of the avatars in the virtual space 300 via the display unit 140.

Further, as described above, an example in which the total number of the avatars to be displayed is less than a predetermined threshold and the total number of avatars to be displayed is changed is described as an example in which the total number of avatars to be displayed is increased based on the threshold, but the present invention is not limited thereto. As described above, when the total number of avatars to be displayed is less than a predetermined threshold and the total number of avatars to be displayed is changed, the total number of avatars to be displayed may be increased by adding a predetermined number.

The manner in which avatars are displayed may be changed according to the total number of actual avatars. For example, if the total number of actual avatars is above a predetermined threshold, the display unit 140 may simplify and display parts of each of the actual avatars. In this way, even when the performance of terminal 10 is low, the display 140 of the terminal 10 may still display to reflect the total number of the actual avatars. For example, if the total number of actual avatars is less than a predetermined threshold, the display 140 may display the parts of each of the actual avatars without simplifying them. Here, the display that simplifies the parts of the avatar is, for example, a single-color (black) humanoid avatar or an identification display according to the gender of the user corresponding to the avatar. For example, if the gender of the user corresponding to the avatar is male, the avatar's parts shall be the first parts, and if the gender of the user corresponding to the avatar is female, the avatar's parts shall be the second part which is different from the first parts.

When the first terminal 11 receives the position data at the predetermined time t of the avatar 80 (the avatar of another person) other than the avatar 80A, the display unit 140 of the first terminal 11 does not immediately display the position data after receiving the position data. For example, the display unit 140 of the first terminal 11 may perform display reflecting the position data of the avatar 80 other than the avatar 80A after a lapse of an arbitrary time calculated from the time t. Here, the "arbitrary time" is, for example, 1 minute, 10 minutes, 1 hour, and the like.

In addition, when increasing or decreasing the number of avatars included in the virtual space, the number of avatars included in the virtual space is not limited to a predetermined number as described above. For example, in a case where the number of avatars included in the virtual space is increased or decreased, a size of a predetermined space in the virtual space may be considered. Here, considering the size in the predetermined space in the virtual space means, for example, considering the density in the predetermined space in the virtual space. The density in the predetermined space in the virtual space means, for example, the number of predetermined avatars displayed per unit volume in the predetermined space in the virtual space. For example, when two regions as shown in FIG. 7 are provided in the virtual space, it is assumed that one is a first space, and the other is a second space. Further, it is assumed that the first space has a first size and 50 bodies of avatars are present in the first space, and the second space has a second size smaller than the first size and the number of avatars included in the first space and the second space is excessive when there are 50 avatars in the second space. In this case, the number of avatars included in the first space may be reduced from 50 to 20, and the number of avatars included in the second space may be reduced from 50 to 10. Therefore, when the user operates the avatar using the terminal 10, it is possible to prevent the total number of avatars displayed on the display unit 140 from becoming excessive, thereby improving the visibility.

Further, in FIG. 9, an example in which the server device 20 performs the processes of S183 and S193 has been described after S141, but the present invention is not limited thereto. For example, the server device 20 may receive the first data from the first terminal 11 before step S131. Thus, the server device 20 may perform the processing of S183 before step S131 and transmit the analysis data to the device 70. For example, the server device 20 may perform the processing of S193 before step S131 and transmit the advertisement data to the device 70. In this way, the server device 20 can reduce the time between the timing at which the first data is received and the timing at which the analysis data determined on the basis of the received first data is transmitted to the device 70.

Also, as shown in FIG. 14, in addition to the terminal 10 shown in FIG. 3, the first sensor 102a, a second sensor 102b, a camera 102c, and microphone 102d may be provided. FIG. 14 is a block diagram showing an example of the terminal 10 shown in FIG. 3 and the configuration connected to the terminal 10. Here, the terminal 10, the first sensor 102a, the second sensor 102b, camera 102c, and microphone 102d, each of which is connected, for example, wired or wirelessly.

The first sensor 102a is, for example, wired or wirelessly connected to the camera 102c. The camera 102c may include, for example, an RGB camera that captures an image of a visible light beam, and a near-infrared camera that captures an image of a near-infrared ray. For example, the camera 102c can use, for example, a camera included in a True Depth (True Depth) camera of, for example, an iPhone X (registered trademark). The second sensor 102b is, for example, connected to the microphone 102d in a wired or wireless manner Note that the first sensor 102a and the camera 102c may be provided as one configuration. Further, the second sensor 102b and the microphone 102d may be provided as one configuration.

In this way, the terminal 10 can send the images captured by the camera 102c to the server device 20 may be transmitted to the server device. Also, terminal 11 may send the voice data input to microphone 102d to the server device 20. The second terminal 12 may transmit the voice data input to the microphone 102d to the server device 20. The terminal 11 may also transmit video data to the server device 20 using the camera 102c and the microphone 102d.

Figure 15:
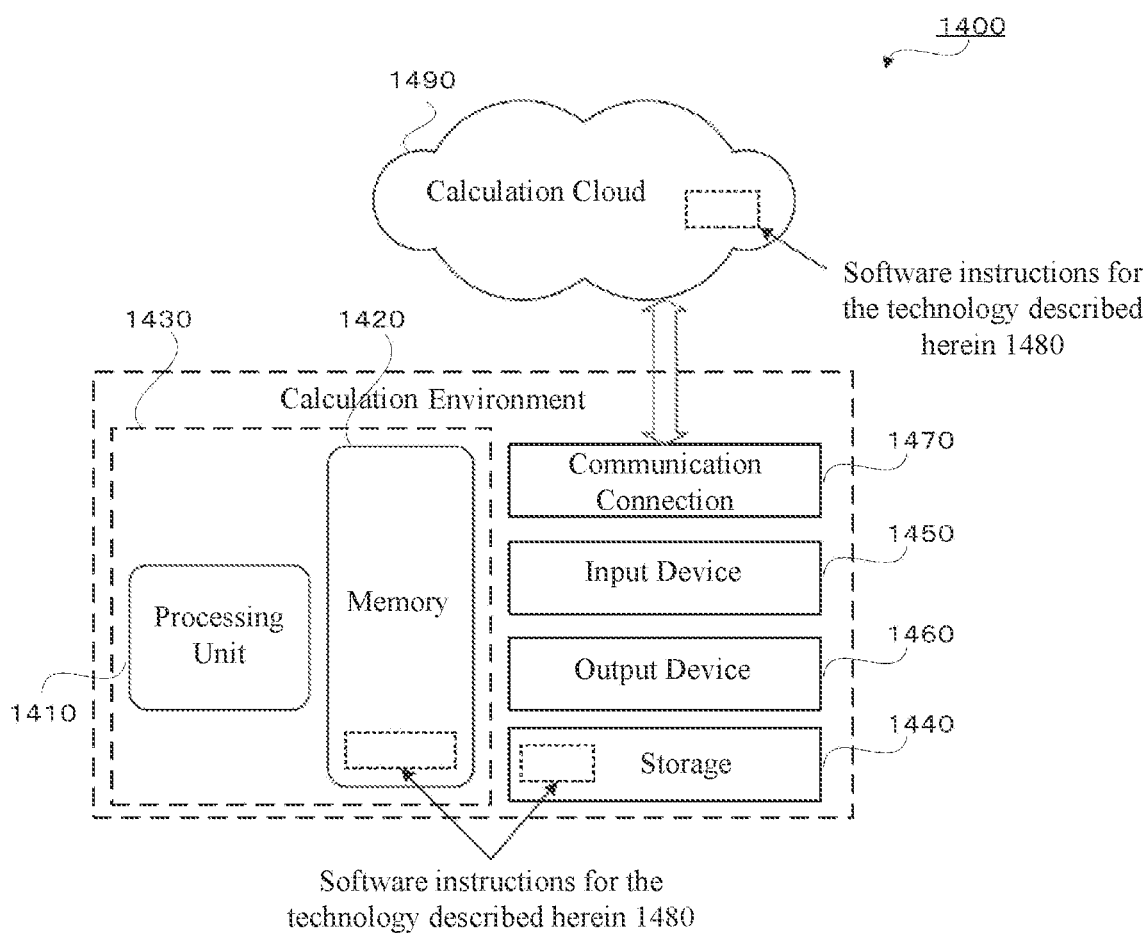
FIG. 15 is a block diagram showing a calculation environment 1400 in one embodiment.

FIG. 15 illustrates a generalized example of embodiments, techniques, and suitable calculation environments 1400 on which techniques are implemented, including rendering video in a calculation environment by transmitting and using tokens. For example, as described herein, the calculation environment 1400 may be implemented by any of a terminal device (or a distributor, a viewer), or a distribution server system.

The calculation environment 1400 is not intended to imply any limitations with respect to the scope of use or functionality of the technology, as the technology may be implemented in a variety of general purpose or dedicated calculation environments. For example, the technology disclosed herein may be implemented in a variety of portable devices, a variety of multiprocessor systems, a variety of microprocessor based or programmable home appliances, various network PCs, various minicomputers, various mainframe computers, and the like. The techniques disclosed herein may be implemented in a distributed calculation environment where tasks are performed by remote processing devices linked through a communication network. In a distributed calculation environment, program modules may be located on both local and remote memory storage devices.

Referring to FIG. 15, the calculation environment 1400 includes at least one central processing unit 1410 and memory 1420. In FIG. 15, this most basic configuration 1430 is included within the dashed lines. The central processing unit 1410 executes instructions executable by a computer, and the central processing unit 1410 may be region or virtual processor. In a multiprocessing system, multiple processing units execute instructions that can be executed by a computer to increase processing power, so multiple processors can run simultaneously. The memory 1420 can be volatile memory (e.g., registers, cache, RAM) and nonvolatile memory (e.g., ROM, EEPROM, flash memory, etc.). EEPROM, flash memory, etc.) or some combination of the two. The memory 1420 may implement, for example, the techniques described herein, software 1480, various images, and video. The calculation environment may have a variety of additional features. For example, the calculation environment 1400 may include a storage 1440, a one or more input devices 1450, one or more output devices 1460, and one or more communication connections 1470. Interconnection mechanisms (not shown), such as buses, controllers, or networks, interconnect the various components of the calculation environment 1400. Typically, operating system software (not shown) provides an operating environment for other software running in the calculation environment 1400 and coordinates the various activities of the various components of the calculation environment 1400.

The storage 1440 may be detachable, or may not be detachable, or may include any other medium that is used to store magnetic disks, magnetic tapes or cassettes, CD-ROM, CD-RW, DVD, or information, and that can be accessed within the calculation environment 1400. The storage 1440 stores instructions for software 1480, plug-in data, and messages that may be used to implement the techniques described herein.

One or more input devices 1450 may be a keyboard, keypad, mouse, touch screen display, pen, or touch input device, such as a trackball, voice input device, scanning device, or another device that provides input to the calculation environment 1400. In the case of audio, one or more input devices 1450 may be a sound card or similar device that accepts audio input in analog or digital form, a or a CD-ROM reader that provides various audio samples to the calculation environment 1400. The one or more output devices 1460 may be a display, printer, speaker, CD-ROM reader. One or more output devices 1460 may be a display, printer, speaker, CD writer, or another device that provides output from the calculation environment 1400.

One or more communication connections 1470 allow communication with another computing entity via a communication medium (e.g., a connection network). The communication medium transmits data such as instructions executable by a computer, compressed graphics data, video, or other data included in the modulated data signal The one or more communication connections 1470 are not limited to wired connections (e.g., megabits or gigabit Ethernet, Infinibands, or fiber channels via electrical or optical fiber connections), and wireless techniques (e.g., Bluetooth, Wi-Fi (IEEE 802.11a)/b/n), WiMax, cellular, satellite, laser, infrared, via RF connection), and various agents, various bridges, and destination agents disclosed herein. Other appropriate communication connections for providing a network connection are included. In a virtual host environment, one or more communication connections may be virtualized network connections provided by a virtual host.

Various embodiments of the various methods disclosed herein may be executed in a calculation cloud 1490 using a plurality of instructions executable by a computer implementing all or some of the techniques disclosed herein. For example, various agents can perform various vulnerability scanning functions in the calculation environment, while agent platforms (e.g., bridge) and consumer services for destination agent data can run on various servers located inside the calculation cloud 1490.

A computer readable medium is any available medium that may be accessed within the calculation environment 1400. By way of example, without limitation, with respect to the calculation environment 1400, the computer readable medium may include memory 1420 and/or storage 1440. As will be readily understood, the term computer readable medium includes memory 1420 and storage 1440 and other media for data storage, and does not include transmission media such as various modulated data signals.

The various embodiments described above can be used in combination with each other as long as no contradiction or inconvenience arises. In view of the many possible embodiments to which the principles of the invention disclosed herein may be applied, it is to be understood that the various embodiments illustrated are only various preferred examples and should not be considered as limiting the technical scope of the invention claimed in the claims to these various preferred examples. In fact, the technical scope of the claimed invention is defined by the appended claims. Therefore, the grant of a patent is requested for everything that falls within the technical scope of the invention described in the claims, as the inventions of the inventors.

The computer program or medium of the first aspect is characterized in that a computer program executed by at least one processor, acquiring first data relating to an avatar in a virtual space operated by using a terminal of a first user, receiving second data related to an avatar in a virtual space operated by using a terminal of each user of at least one user other than the first user via a communication line, the first data includes a position of the avatar of the first user, and the second data includes a position of the avatar of the at least one user, at least one of a total number of avatars located in a first region in the virtual space among the avatars of the at least one user, determining whether or not the position of the avatar of the first user or the second data satisfies a predetermined condition, determining control data for controlling a display screen of the terminal of the first user when it is determined that the predetermined condition is satisfied, and causing the at least one processor to function to control the display screen based on the control data.

The medium of the second aspect is characterized in that a computer program executed by at least one processor, receiving first data relating to an avatar in a virtual space operated by using a terminal of the first user and second data related to an avatar in a virtual space operated by using a terminal of each user of at least one user other than the first user via a communication line, and the first data includes a position of the avatar of the first user. The second data includes at least one of a position of the avatar of the at least one user and a total number of avatars located in a first region in the virtual space among the avatars of the at least one user, determining whether or not the position of the avatar of the first user or the second data satisfies a predetermined condition, determining control data for controlling a display screen of the terminal of the first user when it is determined that the predetermined condition is satisfied, and causing the at least one processor to function to transmit the control data to the terminal of the first user via the communication line.

The medium of the third aspect characterized in the above-mentioned first or second aspect in that the control data includes at least one of the position of the avatar of the at least one user displayed on the display screen determined on the basis of the position of the avatar included in the second data and the total number of avatars of the at least one user displayed on the display screen determined on the basis of the total number of the avatars included in the second data.

The medium of the fourth aspect characterized in any of the above-mentioned first to third aspects in that in a case where the avatar of the first user is located in the first region, when the total number of avatars located in the first region of the avatars of the at least one user is equal to or greater than a first value, the computer program according to the fourth aspect when the total number of avatars located in the first region of the avatars of the at least one user is equal to or less than a second value. When the number of avatars located within a first distance from one avatar located in the first region among the avatars of the at least one user is equal to or more than a third value and a case where the number of avatars located within the first distance from one avatar located in the first region among the avatars of the at least one user is equal to or less than a fourth value, the first value is greater than the second value, and the third value is larger than the fourth value.

The computer program according to the fifth aspect characterized in any of the above-mentioned first to fourth aspects in that the second data includes data concerning the gender of at least one user's avatar.

The computer program according to the sixth aspect characterized in any of the above-mentioned first to fifth aspects in that at least one virtual venue, which is a space in which a moving image is distributed, is provided in the virtual space in any of the first to fifth aspects, and the first region is a region in the virtual venue of any one of the at least one virtual venue.

The computer program according to the seventh aspect characterized in the above-mentioned the 6th aspects in that in the case where the second data includes data concerning the position of the avatar of at least one user, the position of the avatar of at least one user indicates a position in the virtual venue, and the position of the avatar of at least one user, included in the control data, is a position in the virtual venue.

The computer program according to the eighth aspect characterized in any of the above-mentioned first aspect or the third to seventh aspects which depend from the first aspect in that storing module data used for generating the first user's avatar and the second user's avatar.

The computer program according to the ninth aspect characterized in the above-mentioned second aspect or the third to seventh aspects which depend from the second aspect in that the transmitting to the first user's terminal data requesting the first user's terminal to generate an avatar of at least one of the at least one user.

The computer program according to the tenth aspect characterized in any of the above-mentioned first to ninth aspects in that at least one of the first data and the second data includes at least one of data concerning the avatar's action history in the virtual space, and data of the user operating the avatar.

The computer program according to the eleventh aspect characterized in the above-mentioned tenth aspect which depends on the sixth aspect in that data relating to a viewing history for viewing the moving image of the avatar; data related to a viewing time of the moving image of the avatar; data related to an entry history of the avatar in the virtual venue; data related to an exit history from the virtual venue of the avatar; and data related to an action history for a virtual object existing in the virtual space from the avatar. At least one of data relating to a position of a terminal to which the message is transmitted, data related to a purchase history of the virtual object, and data related to a position of the virtual object when the virtual object is seated and the avatar is seated on the virtual object is included in the terminal of the first user and the terminal of the at least one user from among the terminal of the first user and the terminal of the at least one user.

The computer program according to the twelfth aspect characterized in any of the above-mentioned first to eleventh aspects in that at least one of the first data and the second data is transmitted to a third terminal other than the first user's terminal and at least one user's terminal.

The computer program according to the thirteenth aspect characterized in the above-mentioned the twelfth aspects in that determining whether or not at least one of the first data and the second data is received, and if at least one of the first data and the second data is received, at least one of the first data and the second data received is sent to the third terminal.

The computer program according to the fourteenth aspect characterized in the above-mentioned twelfth or thirteenth aspect in that the cycle of receiving the first data is shorter than the cycle in which the control data is determined.

The computer program according to the fifteenth aspect characterized in any of the above-mentioned the twelfth to fourteenth aspects in that the third terminal is a terminal operated by the operator or operating body that operates the virtual venue.

The computer program according to the sixteenth aspect characterized in any of the above-mentioned the first to fifteenth aspects in that third data concerning the advertisement determined based on the first data is transmitted to the first user's terminal and/or fourth data concerning the advertisement determined based on the second data is transmitted to the at least one user's terminal.

The computer program according to the seventeenth aspect characterized in any of the above-mentioned first to fifteenth aspects in that data including a URL for accessing a database for storing third data related to an advertisement determined on the basis of the first data is transmitted to the terminal of the first user and/or data including a URL for accessing a database for storing fourth data related to an advertisement determined based on the second data is transmitted to the terminal of the at least one user.

The computer program according to the eighteenth aspect characterized in any of the above-mentioned first, third to eighth aspects depending on the first aspect, or the tenth to seventeenth aspects depending on the first aspect in that in a case where the avatar of the first user and the avatar of the at least one user are present in the virtual space at a predetermined time and the data including the first message transmitted from the terminal of the user corresponding to any one of the avatars of the at least one user is received, the computer program according to the eighteenth aspect displays the virtual space in the first display region in the display screen of the terminal of the first user and displays the first message in the first display region.

The computer program according to the nineteenth aspect characterized in any of the above-mentioned second, third to seventh aspects depending on the second aspect, or the ninth to seventeen aspects depending on the second aspect in that when the avatar of the first user and the avatar of the at least one user are present in the virtual space at a predetermined time and the data including the first message transmitted from the terminal of the user corresponding to any one of the avatars of the at least one user is received, displays the virtual space in a first display region in a display screen of the terminal of the first user and transmits data for displaying the first message in the first display region.

The computer program according to the twentieth aspect characterized in the above-mentioned the 19th aspect in that in a case of receiving data including a third message from one of the third terminal and the at least one user's terminal to the other of the third terminal and the at least one user's terminal, the computer program according to the twenty-second aspect does not transmit data including the third message to the terminal of the first user.

The computer program according to the twenty-first aspect characterized in any of the above-mentioned fourth or fifth to twentieth aspects depending on the fourth aspect in that the second data includes data relating to the total number of avatars of the at least one user's avatar located in the first region, and the predetermined condition is that the total number of avatars of the at least one user's avatar located in the first region is equal to or greater than the first value. The predetermined condition is satisfied if the total number of avatars of the at least one user's avatars located in the first region is equal to or greater than the first value, and if the total number of avatars of the at least one user's avatars located in the first region is equal to or less than the second value, then the predetermined condition is satisfied. The second data at each of the plurality of times is stored, and if it is determined that the predetermined condition is met at the first time, the second data from the second time to the first time among the plurality of times is stored, determining the cumulative total of the total number in the period from the second time to the first time, and determining the control data based on the determination.

The computer program according to the second aspect characterized in the above-mentioned the twenty-first aspect in that if the total number of avatars of the at least one user located in the first region among the avatars of the at least one user is greater than or equal to the first value If the total number of avatars located in the first region among the avatars of at least one user is equal to or greater than the first value, the second time is determined so that the period subject to determination of the cumulative total is shortened. If the total number of avatars located in the first region among the avatars of at least one user is less than or equal to the second value, the second time is determined so that the period subject to determining the cumulative total is longer.

The computer program according to the twenty-third aspect characterized in the above-mentioned first to twenty-second aspects in that the virtual space is a three-dimensional space.

The computer program according to the twenty-fourth aspect characterized in the above-mentioned first to twenty-third aspects in that the behavior of at least one user's avatar in the virtual space is determined in advance.

The computer program according to the twenty-fifth aspect characterized in the above-mentioned first to twenty-fourth aspects in that the communication line includes the Internet.

The computer program according to the twenty-sixth aspect characterized in the above-mentioned first to twenty-fifth aspects in that the at least one processor includes a central processing unit (CPU), a microprocessor, and/or a graphics processing unit (GPU).

The computer program according to the twenty-seventh aspect characterized in the above-mentioned first to twenty-sixth aspects in that the at least one processor is mounted on a server device, smartphone, tablet, cellular phone, or personal computer.

The method according to the twenty-eighth aspect is characterized in that the process of obtaining first data relating to an avatar in a virtual space operated using a terminal of a first user, and receiving, via a communication line, a receiving, via a communication line, second data relating to an avatar in the virtual space operated using a terminal of each of at least one user other than the first user, the first data including a location of the first user's avatar, the second data including at least one of: the location of the at least one user's avatar; and the total number of avatars of the at least one user that are located in the first region of the virtual space; and determining whether or not the position of the first user's avatar or the second data satisfies the predetermined condition, and if the predetermined condition is determined to be satisfied, controlling the display screen of the first user's terminal determining the control data to control the display screen of the first user's terminal, and controlling the display screen based on the control data.

The method according to the twenty-ninth aspect is characterized in that the process of receiving, via a communication line, first data relating to an avatar in a virtual space operated using a terminal of a first user, and second data relating to an avatar in a virtual space operated using a terminal of each of at least one user other than the first user The first data includes a location of the avatar of the first user, and the second data includes a location of the avatar of the at least one user and a location of the avatar of the at least one user the second data includes at least one of: a location of the at least one user's avatar; and a total number of avatars of the at least one user that are located in a first region in the virtual space, the determining whether or not the position of the first user's avatar or the second data satisfies the predetermined conditions, and if it is determined that the predetermined conditions are met, controlling the display screen of the first user's terminal determining control data to control the display screen of the first user's terminal, and transmitting the control data to the first user's terminal via the communication line.

The method according to the thirtieth aspect is characterized in the above-mentioned twenty-eighth or twenty-ninth aspect in that the communication line includes the Internet.

The method according to the thirty-first aspect is characterized in any of the above-mentioned twenty-eighth to thirtieth aspects in that, the at least one processor includes a central processing unit (CPU), microprocessor, and/or graphics processing unit (GPU).

The server device according to the thirty-second aspect is characterized in that receives, via a communication line, first data concerning an avatar in a virtual space operated using a terminal of a first user, and second data related to an avatar in a virtual space operated by using a terminal of each user of at least one user other than the first user, the first data including a position of the avatar of the first user, and the second data including a position of the avatar of the at least one user and a total number of avatars located in the first region in the virtual space among the avatars of the at least one user; determining whether or not the position of the avatar of the first user or the second data satisfies a predetermined condition; determining control data for controlling a display screen of the terminal of the first user when it is determined that the predetermined condition is satisfied; and transmitting the control data to the terminal of the first user via the communication line.

The server device according to the thirty-third aspect is characterized in the above-mentioned thirty-second aspect in that the communication line includes the Internet.

The server device according to the thirty-fourth aspect is characterized in the thirty-second or thirty-third aspect in that the at least one processor includes a central processing unit (CPU), microprocessor, and/or graphics processing unit (GPU).

As described above, the technology of the present disclosure can provide a computer program, a method, and a server device that do not impair comfort more than before.

Second Embodiment

Conventionally, when a user views a content executed in a virtual space displayed on a terminal using a terminal, it is known that an icon corresponding to another user who views the content is displayed in the virtual space (Japanese Patent Application Laid-Open No. 2016-34087). However, in the technology disclosed in Japanese Unexamined Patent Application Publication No. 2016-34087, when a terminal used by a user displays a virtual space, the icon of the user is not displayed in the virtual space. Japanese Unexamined Patent Application Publication No. 2016-34087 is incorporated herein by reference. Therefore, the present disclosure provides a computer program, a method, and a server device that make a user operation comfortable without performing a complicated operation more than before.

1. Configuration of System 1000

FIG. 1 is a block diagram showing an example configuration of a system 1000 in one embodiment. As shown in FIG. 1, the system 1000 includes, for example, a plurality of terminals 10 and one or more server devices 20 connected to the communication line. The terminal 10 includes a first terminal 11. The terminal 10 may further include a second terminal 12. The server devices 20 also include, for example, a first server system 21 and a second server system 22 including the first server system 21 and the second server system 2.

The communication line is a mobile phone network, a wireless network (e.g., Bluetooth), Wi-Fi (e.g., IEEE 802.11a/b/n), WiMax, cellular, satellite, laser, infrared, etc.), fixed telephone network, Internet, Intranet, local region network (LAN), wide region network (WAN), and/or Ethernet network can be included without being limited thereto.

1-1. Terminal 10

The terminal 10 is, for example, connected to one or more server devices 20 via a communication line. The terminal 10 is, for example, a smartphone, a tablet device, and/or a personal computer. For example, the terminal 10 is configured to install a predetermined application and execute the predetermined application. In addition, the terminal 10 can receive a Web page (for example, an HTML document or an HTML document obtained by encoding an executable code such as JavaScript or PHP code in some examples) from the server device 20 (the second server system 22).

Hereinafter, a user who operates the terminal 10 will be referred to simply as a user, and a user who operates the first terminal 11 may be referred to as a first user. Further, in FIG. 1, for example, an example in which the first terminal 11 is provided is illustrated as the plurality of terminals 10, but the present invention is not limited thereto. The plurality of terminals 10 may include, for example, two or more terminals. In the following description, it is assumed that the first terminal 11 is referred to as the terminal 10.

1-2. Server System 20

The first server system 21 includes a distribution server device 21A1 and a server storage device 21A2. For example, the distribution server device 21A1 receives from the terminal 10, data required for an application executed in the terminal 10. In addition, for example, the distribution server device 21A1 transmits, to the terminal 10, data to be used for an application executed in the terminal 10 in response to the request. The server storage device 21A2 stores, for example, data to be transmitted from the distribution server device 21A1 to the terminal 10. The server storage device 21A2 stores, for example, the data received from the terminal 10 by the distribution server device 21A1. The first server system 21 transmits, for example, data used in an application executed by the terminal 10 to the terminal 10. The first server system 21 transmits, for example, the data received from the terminal 10 to the device 70.

Although an example in which the terminal 10 executes the application has been described, the present invention is not limited thereto. For example, processing equivalent to execution of the application may be executed by using a web browser installed in the terminal 10. In this way, when a web browser installed in the terminal 10 is used, for example, the server device 20 may include a web server (not shown) When the server device 20 includes a web server (not shown), the web server transmits data related to the HTML document such as the HTML 5, and the terminal 10 displays data related to the HTML document by using the web browser, and transmits the user instruction data to the terminal 10 (the web browser), and the server device 20 performs display control. The server device 20 generates display data by performing the display control, and transmits the display data to the terminal 10 (the web browser) The display control may be performed using a script such as JavaScript (registered trademark) in the web browser.

Although the first server system 21 includes the distribution server device 21A1 and the server storage device 21 A2 in FIG. 1, the first server system 21 is not limited thereto. For example, the first server system 21 may include other configurations in addition to the distribution server device 21A1 and the server storage device 21A2. In this case, the other configuration may have at least one of the distribution server device 21A1 and the server storage device 21A2. For example, the first server system 21 may be configured by a single configuration including functions of the distribution server device 21A1 and the server storage device 21 A2.

The second server system 22 is a server that transmits data related to contents to the terminal 10. Assume, for example, that a user operates terminal 10 to execute an application. In this case, if the second server system 22 receives a request for content-related data from the terminal 10 while the application is being executed, the second server system 22 sends the data to the terminal 10. The second server system 22 sends data related to the content to the terminal 10. The content-related data transmitted from the second server system 22 to the terminal 10 is, for example, video-related data.

1-3. Equipment 70

The device 70 (third terminal) is, for example, a terminal operated by an operator or an operation organization that operates the virtual venue. The device 70 transmits predetermined data to the first server system 21, and receives predetermined data transmitted from the first server system 21. A specific configuration of the device 70 will be described later.

2. Hardware Configuration of Each Device

Next, an example of the hardware configuration of each of the terminal 10 and the server device 20 is described.

2-1. Hardware Configuration of Terminal 10

An example of the hardware configuration of each terminal 10 is described with reference to FIG. 2. FIG. 2 is a block diagram showing an example of the hardware configuration of terminal 10 (server device 20) shown in FIG. 1. In FIG. 2, the reference codes in parentheses are described in relation to the server device 20, as described below.

As shown in FIG. 2, each terminal 10 has, for example, a central processing unit 14, a main memory device 15, an input/output interface device 16, input device 17, auxiliary storage device 18, output device 19, for example. The configurations shown in FIG. 2 are connected to each other by data and/or control buses.

The central processing unit 14 is called a "CPU" and performs operations on instructions and data stored in the main memory device 15. Furthermore, the central processing unit 14 controls the input device 17, the auxiliary storage device 18, and the output device 19 and the like via the input/output interface device 16. The terminal 10 can include one or more such central processing units 14.

The main memory device 15 is referred to as a "memory", and stores instructions and data received from the input device 17, the auxiliary storage device 18, and the communication line 30 (server device 20 or the like) via the input/output interface device 16, and the calculation result of the central processing unit 14. The main memory device 15 includes a volatile memory (for example, a register, a cache, a random access memory (RAM), a nonvolatile memory (for example, read-only memory (ROM), an EEPROM, a flash memory), and a storage (e.g., a hard disk drive (HDD), a computer readable medium such as a solid state drive (SSD), a magnetic tape, and an optical medium can be included without being limited thereto. As will be readily understood, the term "computer-readable recording medium" may include media for data storage, such as a memory and a storage, rather than a transmission signal such as a modulated data signal, i.e., a temporary signal.

The input device 17 is a device that takes in data from the outside and can include, without limitation, a touch panel, buttons, keyboard, mouse and/or sensors. Sensors can include, without limitation, one or more cameras, etc. and/or one or more microphones, etc., as described below.

The auxiliary storage device 18 is a storage device with a larger capacity than the main memory device 15. It can store instructions and data (computer programs) that constitute specific applications (video distribution applications, video viewing applications, etc.) and web browser applications described above. Furthermore, the auxiliary storage device 18, controlled by the central processing unit 14, can store these instructions and data (computer programs) in the input/output interface device 16 to the main memory device 15. The auxiliary storage device 18 can include, without limitation, a magnetic disk device and/or an optical disk device.

Output device 19 can include, without limitation, display devices, touch panels and/or printer devices.

In such a hardware configuration, the central processing unit 14 sequentially loads instructions and data (computer programs) constituting the specific application stored in the auxiliary storage device 18 into the main memory device 15. The central processing unit 14 controls the output device 19 via the input/output interface device 16 by calculating the loaded instruction and data, or can transmit and receive various data between another device (for example, the server device 20 and the other terminal 10) via the input/output interface device 16 and the communication line 2.

2-2 Hardware Configuration of Server Device 20

A hardware configuration example of each server device 20 will be described with reference to FIG. 2. The hardware configuration of each server device 20 (each of the distribution server device 21A1) and the server storage device 21A2 may be the same as the hardware configuration of each of the terminals 10 described above. Therefore, the reference sign for the component included in each server device 20 is shown in parentheses in FIG. 2.

As shown in FIG. 2, each server device 20 mainly consists of a central processing unit 24, a main memory unit 25 an input/output interface device 26, an input device 27, an auxiliary storage device 28, and an output device 29, and output devices. These devices are connected to each other by data and/or control buses.

The central processing unit 24, the main storage device 25, the input/output interface device 26, the input device 27, the auxiliary storage device 28, and the output device 29 can be substantially the same as the central processing unit 14, the main memory device 15, the input/output interface device 16, the input device 17, the auxiliary storage device 18, and the output device 19 included in the respective terminals 10.

In such a hardware configuration, the central processing unit 24 sequentially loads instructions and data (computer programs) constituting the specific application stored in the auxiliary storage device 28 to the main storage device 25. The central processing unit 24 controls the output device 29 via the input/output interface device 26 by calculating the loaded instruction and data, or can transmit and receive various data between the input/output interface device 26 and the communication line 2. via the input/output interface device 26 and the communication line 2.

The server unit 20 may include one or more microprocessors and/or a graphics processing unit (GPU) instead of or together with the central processing unit 24.

3. Functions of Each Device

Next, an example of the functions of each of the terminal 10 and server device 20 is described using FIGS. 3 and 4, respectively.

3-1. Functions of Terminal 10

FIG. 3 is a block diagram showing an example of the functions of the terminal 10 shown in FIG. 1. As shown in FIG. 3, the terminal 10 includes, for example, a communication unit 110, an acquisition unit 120, a control unit 130, a display unit 140, a user interface unit 150, and a memory unit 160.

(1) Communication Unit 110

The communication section 110 is used, for example, to transmit various data to the server device 20. The communication section 210 is used, for example, to receive various data from the server device 20. The data received in communication section 210 is sent to control section 130, for example.

(2) Acquisition Unit 120

The acquisition unit 120 acquires, for example, operation data related to an operation from a user. The acquisition unit 120 acquires, for example, data detected by various sensors. The data acquired by the acquisition unit 120 is sent to, for example, the control unit 130. For example, the acquisition unit 120 performs the processes of S121 in FIGS. 20 and S121 in FIG. 21, which will be described later. For example, the operation data may include one or more of the following data.

Data indicating how the distributor swiping the touch pad display

Data indicating which location of the touch pad display has been touched by the distributor Data indicating which object is tapped or clicked Data indicating how the distributor dragged the touch pad display Other such operation data The data acquired by the acquisition unit 120 may be data related to non-operation (data indicating that no operation was performed). For example, data indicating that the terminal 10 was not operated for a specific time (specific period of time) and/or data indicating that the user did not enter a specific location within the virtual space 300.

(3) Display Unit 130

For example, the control unit 130 performs various types of control on the basis of the data received by the communication unit 110. Further, the control unit 130 performs various types of control on the basis of the data acquired by the acquisition unit 120. For example, the control unit 130 performs the processes of steps S125 and S141 of FIG. 20, which will be described later, and S125 and S141 in FIG. 21.

(4) Display Unit 140

For example, the display unit 140 displays a display content based on the control data output from the control unit 130. The display unit 140 displays, for example, a screen for selecting a predetermined application. In addition, for example, when a predetermined application is selected and a predetermined application is executed, the display unit 140 displays a screen related to the virtual space.

(5) User Interface Unit 150

The user interface unit 150 is used for inputting various data used to execute applications via user operations.

(6) Memory Unit 160

The memory unit 160 can store various data used to execute applications. The memory unit 160 stores data used to control the display unit 140. For example, the memory unit 160 stores module data used to generate the first user's avatar. The memory unit 160 is not limited to storing module data used to generate the first user's avatar, but may also store module data used to generate other avatars.

Note that the module data is, for example, data relating to parts for generating an avatar. Here, the part for generating the avatar includes, for example, data of each part of the avatar (eyes, nose, mouth, eyebrow, skin color, hairstyle, hair color, clothing, body, and the like). Further, the module data includes data related to an ID assigned corresponding to each part for generating an avatar. In the case where the parts of the avatar are bodies, the data related to the parts for generating the avatar may include data subdivided into the body shape such as slimming type, slightly slimming type, standard, slightly obesity, obesity, and the like.

In the case where the display unit 140 displays avatars other than the avatar 80A (avatars of others), the server device 20 may be configured to transmit ID data used to generate avatars other than the avatar 80A to the first terminal 11, and the first terminal 11 may construct the avatar 80 other than the avatar 80A based on the ID data.

In the case where the display unit 140 displays avatars other than the avatar 80A (avatars of others), the display unit 140 may display avatars other than the avatar 80A colored black, or may display avatars other than the avatar 80A with parts and/or colors determined based on the gender of the user corresponding to the avatar 80A (e.g., male or female) with two choices, male or female.

3-2. Functions of Server Device 20

FIG. 4 is a block diagram showing an example of the functions of the server device 20 shown in FIG. 1. As shown in FIG. 4, server device 20 includes, for example, communication unit 210, memory unit 220, and a control unit 230.

(1) Communication Unit 210

The communication unit 210 is used, for example, to transmit various data to terminal 10. The communication unit 210 is also used, for example, to receive various data from terminal 10. The data received in communication unit 210 is sent to control unit 230.

(2) Memory Unit 220

The memory unit 220 stores various data used for execution of an application. For example, the memory unit 220 stores first data transmitted from the first terminal 11. The first data transmitted from the first terminal 11 includes, for example, data related to the avatar 80A. The first data may include data related to the "action history". The details of the first data transmitted from the first terminal 11 and the data related to the "action history" will be described later.

(3) Control Unit 230

For example, the control unit 230 performs various types of control on the basis of the data received by the communication unit 210. For example, the control unit 230 performs the processing of S183, S193 of FIG. 20, S183 of FIG. 21, and S193 in FIG. 21, which will be described later.

FIG. 5 is a diagram illustrating a display example displayed on the display unit 140 of the first terminal 11 by activating the application by operating the first terminal 11. As shown in FIG. 5, the virtual space 300 is displayed on the display unit 140. The virtual space 300 is, for example, a three-dimensional space. The avatar 80 and the virtual venue 310 are shown in the virtual space 300.

The avatar 80 is configured to perform at least one of, for example, walking, traveling, and jumping (jump) by a user's operation. The avatar 80 is configured so that, for example, by a user's operation, the virtual object is checked by a user's operation, a virtual object is pushed, a virtual object is pulled, and the virtual object is lifted, and sitting on the virtual object, purchasing a virtual object, an item is delivered to the virtual object. Here, the virtual object is, for example, an avatar, a door, a food, an admission ticket, a chair, an exhibit, and the like. When the user operates the avatar 80 using the terminal 10, the data relating to the operation is transmitted to the server device 20.

The description related to the virtual object is displayed on the display unit 140 by the operation of "checking the virtual object" described above. The sentence explaining the virtual object is, for example, at least one of the name of the virtual object, the application of the virtual object, and the price of the virtual object. The description related to the virtual object is, for example, at least one of a sentence, an image, and a moving image.

The position of the virtual object in the virtual space 300 can be changed by the operation of "pressing the virtual object", the operation of "pulling the virtual object", and the "lifting the virtual object".

By the operation of "sitting on the virtual object" described above, the avatar 80 is seated on the virtual object. The avatar 80 may be configured to be seated in a specific place other than the virtual object. Further, it is assumed that the avatar 80 is seated on the virtual object or when the avatar 80 is seated in a specific place other than the virtual object In this case, the display unit 140 may display a display screen (for example, a display screen having no UI operation unit or chat screen) different from the display screen before the avatar 80 is seated, or may not display the user interface present before the avatar 80 is seated. In a case where the display unit 140 displays a display screen different from the display screen before the avatar 80 is seated, the display unit 140 may perform such a display that the screen of the display target or the like becomes full-screen display.

The "purchase virtual object" operation described above allows, for example, the purchase of the virtual object. If the virtual object is wearable, the avatar 80 can wear the purchased virtual object to change the appearance of the avatar 80.

The avatar 80 other than the avatar 80 to be operated among the avatars displayed on the display unit 140 may be an avatar operated by the user or may be determined in advance for an operation in the virtual space 300. Here, when the avatar 80 is determined in advance for the operation in the virtual space 300, the avatar 80 means that the avatar 80 operates as an NPC (Non Player Character).

The appearance of the avatar 80 shown in FIG. 5 is all the same, but is not limited thereto. The appearance of the avatar 80 may be determined based on data related to a user operating the avatar 80 or data related to an ID associated with a part of the avatar 80 selected by the user. For example, when the user who operates the avatar 80 is a male, the appearance of the avatar 80 may be a male. For example, when the user who operates the avatar 80 is a woman, the appearance of the avatar 80 may be a woman.

In addition, the motion of the avatar in the virtual space may be changed in conjunction with the operation of the user. For example, if the user makes a nodding motion, the avatar in the virtual space may do the same. Here, the operation data may be acquired using, for example, a motion capture system. As will be readily understood by those skilled in the art having benefits according to the present disclosure, an appropriate motion capture system of some examples that may be used together with the device and method disclosed in the present application includes an optical motion capture system using a passive marker or an active marker or using no marker, and an inertial and magnetic non-optical system Motion data may be acquired using an image capture device such as a CCD (charge coupled device) or CMOS (complementary metal oxide semiconductor) image sensor coupled to a computer that converts motion data into a moving image or other image data.

Figure 16:
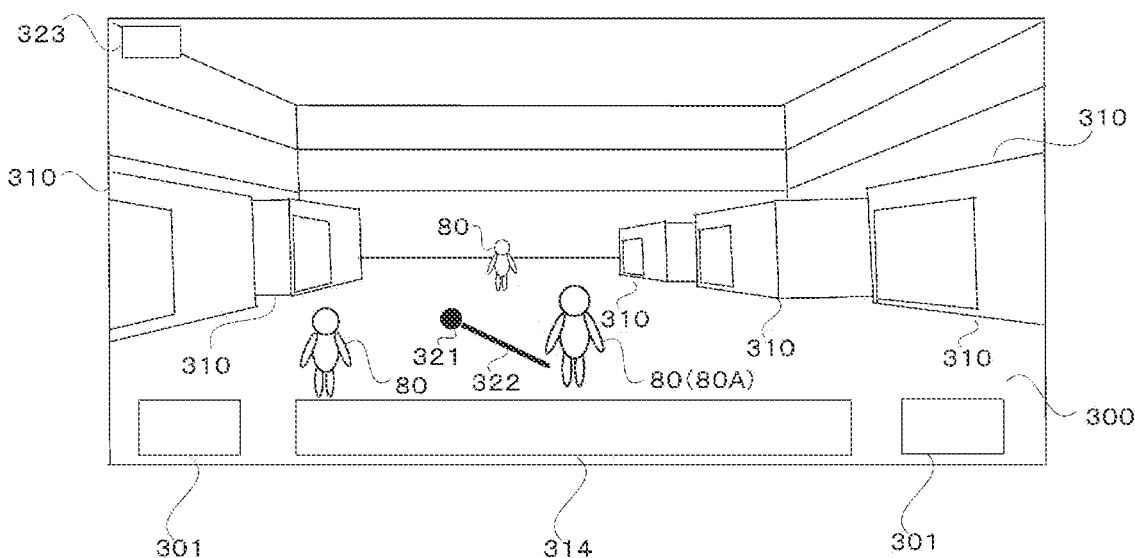
FIG. 16 shows an example of a display shown on the display 140 of the terminal 10.

When operating the avatar 80A shown in FIG. 5, for example, the display unit 140 displays a screen like FIG. 16.

Figure 17:
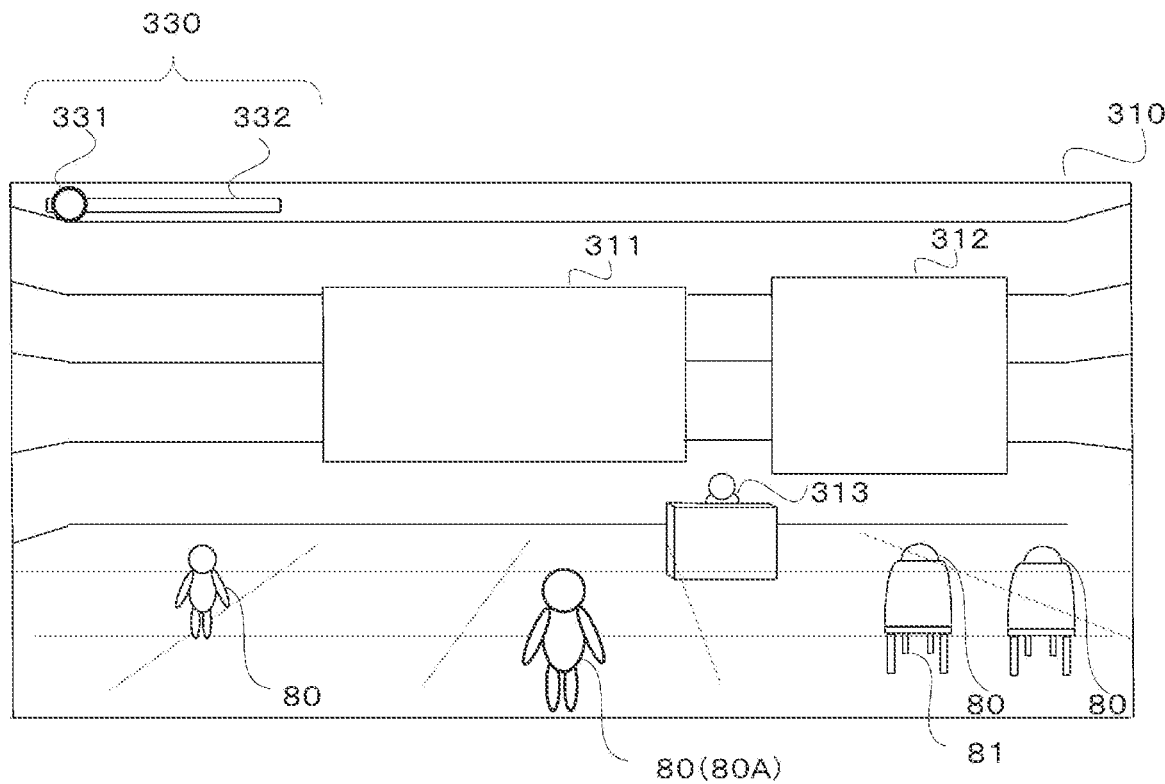
FIG. 17 shows an example of a display shown on the display 140 of the terminal 10.

FIG. 16 is a diagram illustrating a display example displayed on the display unit 140 of the terminal 10. Specifically, FIG. 16 is a diagram illustrating an example displayed on the display unit 140 of the first terminal 11 when the first user operates the avatar 80A using the first terminal 11. As illustrated in FIG. 16, for example, the display unit 140 displays the avatar 80, the avatar 80A, and the virtual venue 310. Here, the display unit 140 displays the back surface of the avatar 80A, and the line of sight of the first user operating the first terminal 11 and the line of sight of the avatar 80A corresponding to the first user are the same direction. For example, the display unit 140 displays a region in the virtual space including the avatar 80A on the basis of a virtual viewpoint located in the front direction in FIG. 16 than the avatar 80A. The display unit 140 displays a region including the advancing direction of the avatar 80A in the virtual space. By operating the avatar 80A using the terminal 10, the region in the virtual space displayed by the display unit 140 can be changed. For example, by changing the advancing direction of the avatar 80A by 180 degrees using the terminal 10, the rear region of the avatar 80A in FIG. 16 can be displayed. As described above, by operating the avatar 80A using the terminal 10, the display unit 140 can display a region that is not displayed in FIG. 16. When the user operating the first terminal 11 operates the avatar 80A and the avatar 80A shown in FIG. 16 is located inside the virtual venue 310, for example, a display screen as shown in FIG. 17 is displayed.

In FIG. 16, when the avatar 80A is operated by the first user, the first terminal 11 acquires, for example, data relating to the position in the virtual space 300 of the avatar 80A. For example, the data relating to the position in the virtual space 300 of the avatar 80A acquired by the first terminal 11 is transmitted to the server device 20. Note that the timing at which the first terminal 11 acquires data relating to the position in the virtual space 300 of the avatar 80A may be any timing. For example, the timing at which the data on the position in the virtual space 300 of the avatar 80A acquired by the first terminal 11 is transmitted to the server device 20 may be any timing.

In addition, any region of the display unit 140 of the first terminal 11 may be touch-operated. Also, when the first terminal 11 is equipped with an acceleration sensor (not shown) and the first terminal 11 is operated, based on the acceleration sensor. The display region and/or direction displayed by the display unit 140 may be configured to change based on the acceleration sensor.

Here, the "arbitrary region" described above includes, for example, the icon 301 (region 301) and/or the display region 314 in FIG. 16. The icon 301 and/or the display region 314 is an operation user interface for performing a predetermined display control by performing a touch operation. The "touch operation" refers to at least one of a tap, a double tap, a swipe, a flick, a pinch-in, and a pinch-out. In addition, the icon 301 and/or the display region 314 may be displayed at the same position or different position even when the display of FIG. 16 is performed, and other drawings (for example, at least one of FIGS. 17 to 19) to be described later are displayed.

In addition, two icons 301 may be provided, as described in FIG. 16, and one or three or more may be provided. In the case where two or more icons 301 are provided, one icon 301 may, for example corresponds to the region used for walking the avatar 80A, and the other icon 301 corresponds to the region used for jumping the avatar 80A. In this way, the avatar 80A can be made to walk or jump by touching the icon 301.

Here, the touch operation for walking or jumping the avatar 80A is, for example, an operation of tapping or double-tapping the icon 301 of the avatar 80A. In addition, a region for performing a touch operation for walking or jumping the avatar 80A may be a region other than the icon 301.

The display region 314 is a region for displaying a message to be input by a user corresponding to the avatar 80. When the display unit 140 displays the display region 314, at least one of a message transmitted from the first terminal 11 and a message transmitted from a terminal other than the first terminal is displayed in the display region 314. Here, the message displayed in the display region 314 may display a message addressed to the first terminal, or the message displayed in the display region 314 may display a message exchanged between the terminals other than the first terminal. Therefore, the display region 314 functions as a region where the user corresponding to at least one avatar 80 existing in the virtual space 300 can browse and/or chat, or a region where the user corresponding to at least one avatar 80 existing in a specific place in the virtual space 300 can browse and/or chat.

In this way, the first terminal 11 can chat with the user corresponding to at least one avatar 80 of all the avatars 80 via the display region 314 of the display unit 140 by the first user. For example, the first terminal 11 can chat with a user corresponding to all the avatars 80 existing in a predetermined region (in the same region) via the display region 314 of the display unit 140 by the first user. Here, a user who chat with the first user is a personal user or an extended company. When a plurality of messages is displayed in the display region 314, a message that is not displayed in the display region 314 can be displayed by performing a touch operation when all messages cannot be displayed in the display region 314. Here, the touch operation in a case where all messages cannot be displayed in the display region 314 is, for example, a swipe The condition that the display region 314 is displayed on the display unit 140 is not limited to a case where the avatar 80 is located in the virtual venue 310. For example, when the avatar 80 is located within the predetermined region in the virtual space 300, the display region corresponding to the predetermined region may be displayed on the display unit 140. That is, the display region to be displayed on the display unit 140 may be determined in accordance with the position where the avatar 80 is present. Thus, the user can exchange messages with the user corresponding to another avatar 80 existing in the same region as the region where the avatar 80 of the user is present. Further, the user can chat with a user having a specific attribute. Therefore, the user can easily communicate with other users having common interest, interest and/or attributes.

The terminal of the transmission source of the message displayed in the display region 314 is, for example, a terminal used by a user who operates the avatar existing in the virtual venue 310. However, the avatar corresponding to the terminal of the transmission source of the message displayed by the display region 314 may be displayed in the virtual venue 310 or may not be displayed in the virtual venue 310.

The display region 314 may also show products available for purchase. The products are, for example, products related to the operator or operating entity operating the virtual venue 310. Along with the products, the display region 314 may also display content related to the products and content encouraging the purchase of the products. Here, the content encouraging the purchase of the relevant product is a display such as "Add to shopping cart" and is configured to be selectable.

In addition, when the user operates the terminal 10 to proceed with the purchase of at least one product displayed in the display region 314, for example, a browser installed in the terminal 10 is activated and a page requesting input of the contents used to purchase the product is displayed in the display unit 140.

Also, for example, as shown in FIG. 16, when the tap or double-tap operation is performed on point 321, the display unit 140 displays a line segment 322 connecting avatar 80A and points 321 and 322, and the avatar 80A walks along the line 323 to the point 321. The point 321 and line segment 322 may be any color. The touch operation to make avatar 80A walk can be performed by flicking any region of avatar 80A to change the direction of progress after changing the direction, tap or double-tap any point on the virtual straight line in the changed direction.

Also, as shown in FIG. 16, for example, the display unit 140 may show the icon 323. The icon 323 is used to switch between display and non-display of the display region 314 by being manipulated. In the case the display unit 140 is used to display the display region 314 by manipulating the icon 323, the icon 323 may not be displayed, or the icon 323 may be displayed continuously.

FIG. 17 is a diagram illustrating an example of a display screen in the virtual venue 310 displayed on the display unit 140 of the terminal 10. In FIG. 17, the user operating the first terminal 11 operates the avatar 80A, and the avatar 80A shown in FIG. 16 is located inside the virtual venue 310, so that the scene is switched, thereby switching the display screen. The URL when the avatar 80A is displayed outside the virtual venue 310 (for example, the display screen in the case where the avatar 80A exists in FIG. 16) is different from the URL in the case where the avatar 80A is displayed inside the virtual venue 310 (for example, the display screen in the case where the avatar 80A exists in FIG. 17) using the web browser of the first terminal 11. Therefore, when the web browser of the first terminal 11 is used, when the avatar 80A shown in FIG. 16 is located inside the virtual venue 310, the URL is changed. As shown in FIG. 17, the avatar 80, the avatar 80A, the chair 81, the display region 311, the display region 312, the avatar 313, and the slider 330 are shown. Note that the slider 330 is not an essential configuration. Here, the virtual venue 310 is, for example, a booth such as an exhibition or an event site. At least one chair 81 is provided. The avatar 80 and the avatar 80A are located in the first region in the virtual venue 310.

The chair 81 is, for example, a virtual object on which the avatar 80 can be seated. For example, when the user operates the avatar 80A and approaches the specific chair out of the plurality of chairs 81 to perform a predetermined operation, the avatar 80 is seated on the chair 81. For example, when the user operates the avatar 80A to perform a predetermined operation by approaching the specific chair of the plurality of chairs 81, a message for asking whether or not to sit on a specific chair is displayed on the display screen of the first terminal 11. When a message for asking whether to sit on a specific chair is displayed on the display screen of the first terminal 11, the avatar 80 is seated on the chair 81 when the user operates the terminal 10 and performs a predetermined operation indicating an intention to sit on the specific chair with respect to the message. Note that a configuration may be adopted in which the avatar 80 is seated in a case where a specific place in the virtual space 300 is designated, together with a virtual object that can be seated, or in place of a virtual object that can be seated. In this case, a message for asking whether or not to sit in the specific place may be displayed on the display screen of the first terminal 11 by approaching the specific place in the virtual space 300 and performing a predetermined operation. When a message for asking whether or not to sit on the specific place is displayed on the display screen of the first terminal 11, when the user operates the terminal 10 and performs a predetermined operation indicating an intention to sit on the specific place with respect to the message, the avatar 80 may be configured to sit on the specific place.

In the display region 311, for example, a material for performing various descriptions is displayed and/or a moving image is displayed. A name of a group operating the virtual venue 310, a theme of an explanation meeting, and the like are displayed in the display region 312. The avatar 313 is, for example, an avatar imitating a staff who advances the virtual venue 310. The avatar 313 may be an avatar operated by a user or an avatar determined in advance for an operation in the virtual space 300. When the avatar 80 is determined in advance for the operation in the virtual space 300, the avatar means that the avatar 80 operates as the NPC described above.

At a predetermined time in the virtual venue 310, for example, a predetermined explanation is started. Here, the time used in the virtual space may be a time that is synchronized to be the same as the real time, or it may be a time used in the virtual space 300 separately from the real time. The condition for the start of a predetermined explanation in virtual venue 310 need not be related to time. For example, the condition for a predetermined explanation to begin in virtual venue 310 may be, for example, when the number of avatars present in virtual venue 310 exceeds a predetermined number, or when a specific avatar is located within the virtual venue 310.

It should be noted that the plurality of avatars may be configured to be able to be seated in an overlapping manner on one seat at the same time. For example, in a state where the avatar 80 is seated on the left chair 81 of FIG. 17, the user may operate the avatar 80A using the terminal 10 to allow the avatar 80A to be seated on the left chair 81 of FIG. 17. In this way, for example, even when the total number of avatars located in the virtual venue 310 exceeds the total number of chairs 81, all the avatars viewing the content displayed in the display region 311 can be seated in the virtual venue 310.

The predetermined description to be started at a predetermined time is performed by displaying a predetermined content in the display region 311 and/or outputting a voice. The description is, for example, a moving image. The moving image is, for example, any of a predetermined explanation moving image, an event moving image such as a concert, a moving image such as a movie, and a moving image reflecting the motion and/or performance of the real-time Vtuber. When the description is a moving image, the terminal 10 requests the second server system 22 to request data relating to the moving image. Then, the second server system 22 transmits the data relating to the moving image to the terminal 10 in response to the request. Thus, the terminal 10 can receive the data relating to the moving image from the second server system 22 and view the moving image.

Figure 18:
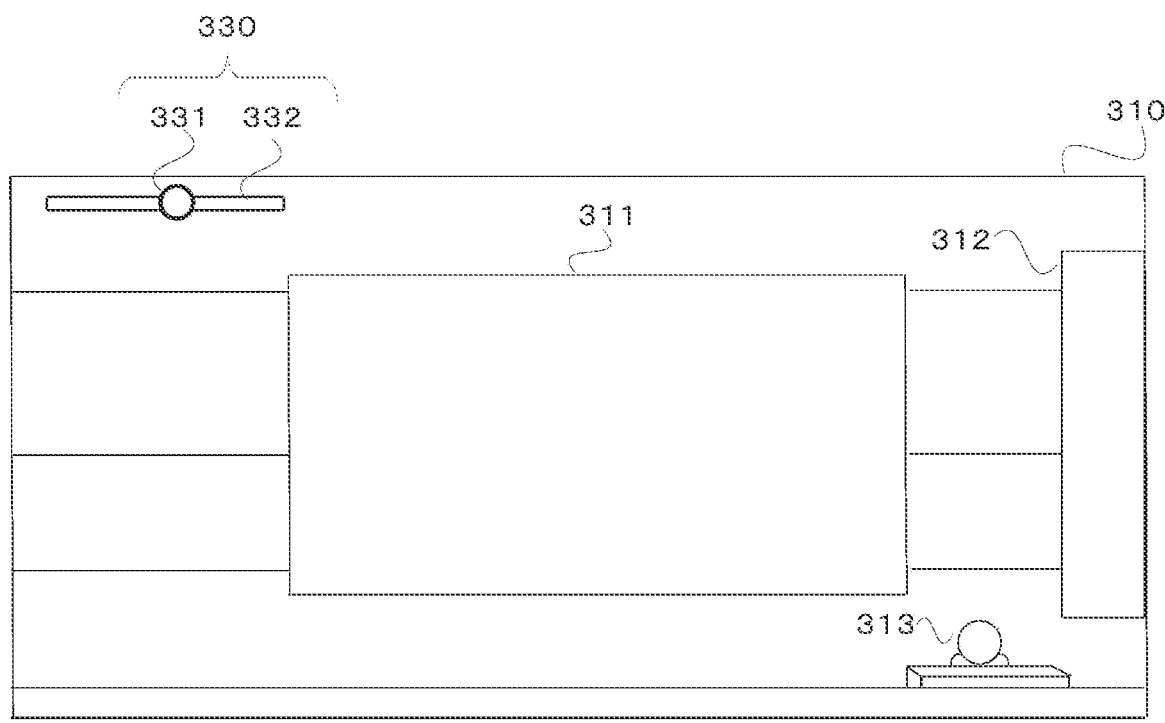
FIG. 18 shows an example of a display shown on the display 140 of the terminal 10.
Figure 19:
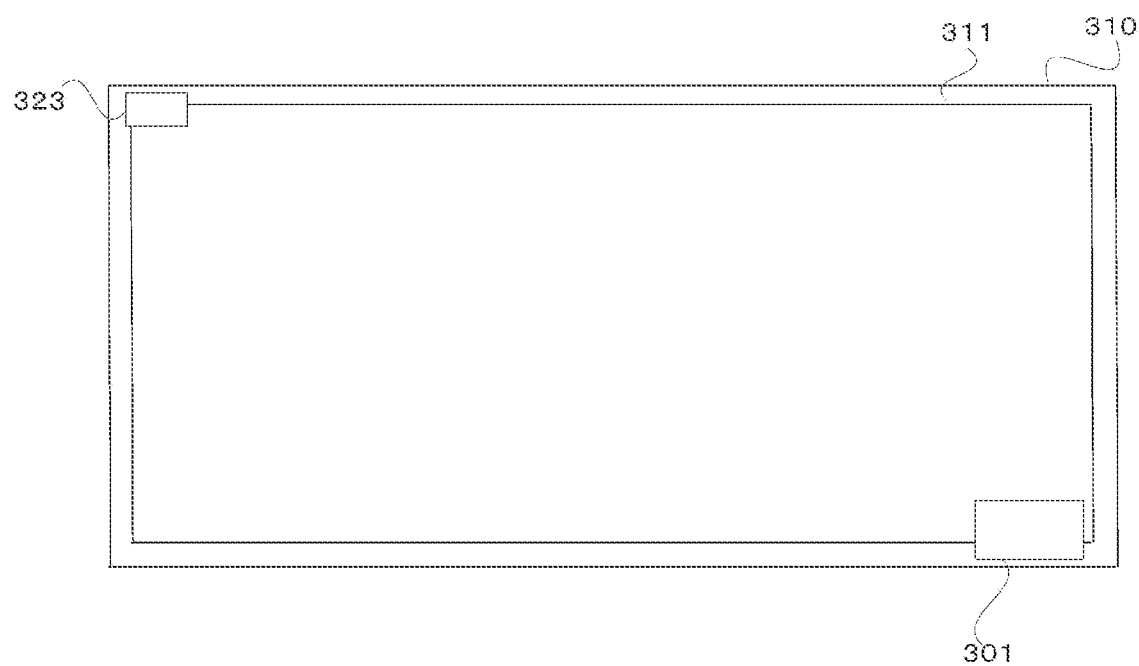
FIG. 19 shows an example of a display shown on the display 140 of the terminal 10.

In FIG. 17, when the avatar 80A satisfies a predetermined condition (first condition), the display unit 140 displays FIG. 18 or FIG. 19 instead of FIG. 17. As a result, the display unit 140 performs display relating to the first person viewpoint (FPS: First Person Shooter) instead of the display relating to the third person viewpoint (TPS: Third Person Shooter). That is, the display unit 140 performs display not including the avatar 80A instead of the display including the avatar 80A.

Here, the "first condition" described above is, for example, including operation data for selecting a portion of a region including the first position, and the first data includes operation data for selecting one target displayed on the display unit 140, or includes data indicating that the avatar 80A is present in the first region. For example, when the first region is a predetermined region in the virtual venue 310, the "data indicating that the avatar 80A is present in the first region" is data indicating that the position in the virtual venue 310 of the avatar 80A is present in the predetermined region.

Specifically, the "first condition" is, for example, a predetermined position in the virtual venue 310 or a predetermined region in the virtual venue 310. Here, the "predetermined region" refers to, for example, a region within a predetermined distance within the virtual venue 310 based on the display region 311. The "first condition" here may be, for example, specifying the display region 311. The "first condition" may be, for example, that the user operates the terminal 10 and the avatar 80A is seated on the chair 81. The "first condition" may be, for example, a predetermined position in the virtual venue 310 or a predetermined region in the virtual venue 310 and designating the display region 311. The "first condition" may be, for example, that the user operates the terminal 10 to seat the avatar 80A on the chair 81 and specify the display region 311.

As shown in FIG. 18, the display unit 140 enlarges and displays a portion of the virtual venue 310 shown in FIG. 17. Note that the display unit 140 may enlarge and display the display region 311 shown in FIG. 17, or may enlarge and display objects other than the display region 311 shown in FIG. 17. In FIG. 18, for example, the display unit 140 does not display the avatar 80A. In FIG. 18, the icon 301 may be displayed or the icon 301 may not be displayed. In FIG. 18, the display region 314 may be displayed or the display region 314 may not be displayed. In FIG. 18, the icon 323 may be displayed or the icon 323 may not be displayed. In FIG. 18, the slider 330 may be displayed or the slider 330 may not be displayed.

As shown in FIG. 19, the display unit 140 enlarges and displays a portion of the virtual venue 310 shown in FIG. 17. Specifically, the display unit 140 displays, for example, the display region 311 over substantially the entire region of the display screen.

The display unit 140 displays, for example, the icon 301 (region 301). The icon 301 is an icon for switching from the screen of FIG. 19 to another screen. Here, the "another screen" is, for example, any one of the screens shown in FIGS. 16 to 18. The icon 301 is, for example, the same as the icon 301 described in FIG. 16. The functions assigned to the icons 301 of FIG. 16 and the icons 301 in FIG. 19 are configured to be different depending on the screen displayed by the display unit 140, for example.

For example, when the display unit 140 displays the icon 301 on the screen of the third person viewpoint (TPS) shown in FIG. 16 or FIG. 17, when the icon 301 is operated, for example, as described above, the avatar 80A is walking or jumped. For example, when the display unit 140 displays the icon 301 on the screen of the first person viewpoint (FPS) illustrated in FIG. 19, for example, when the icon 324 is operated, for example, the avatar 80A is released. Here, by leaving the avatar 80A, the display unit 140 displays the third person viewpoint (TPS) shown in FIG. 16 or FIG. 17 instead of the first-person viewpoint (FPS) shown in FIG. 19. When the display unit 140 displays the icon 301 on the screen as shown in FIG. 19, when the icon 324 is operated, for example, the display unit 140 may be switched to the display screen as shown in FIG. 18.

Note that the display unit 140 may enlarge and display the display region 311 shown in FIG. 17, or may enlarge and display objects other than the display region 311 shown in FIG. 17. Therefore, the enlargement ratio of the display region 311 in FIG. 19 is larger than the enlargement ratio of the display region 311 in FIG. 18. In FIG. 19, for example, the display unit 140 does not display the avatar 80A. In FIG. 19, the region 301 may be displayed or the region 301 may not be displayed. In FIG. 19, the display region 314 may be displayed or the display region 314 may not be displayed. In FIG. 19, the icon 323 may be displayed or the icon 323 may not be displayed. In FIG. 19, the slider 330 may be displayed or the slider 330 may not be displayed.

Here, by displaying the display region 314 in FIG. 18 and/or FIG. 19, it is possible to communicate with another user through the display region 314 while viewing the content displayed in the display region 311. In a case where the content of the message of the other user displayed in the display region 314 is the content related to the content displayed in the display region 311, the first user exchanges messages with the other user, thereby allowing the first user to physically separate the distance from the other user. It is possible to provide such a feeling that the first user is viewed together with the content displayed in the display region 314 together with the other user.

On the other hand, by non-displaying the display region 314 in FIG. 18 and/or FIG. 19, the first user can further concentrate on viewing of the content displayed in the display region 311. In addition, in a case where the message displayed in the display region 314 can include the content related to the content of the display region 311 by making the display region 314 non-display in FIG. 18, the first user can reduce the possibility that the first user does not intend to grasp the content relating to the content through the display region 314 before viewing the content.

In addition, by displaying the icon 323 in FIG. 18 and/or FIG. 19, while the content displayed in the display region 311 is being viewed, the display and the non-display of the display region 314 can be switched without requiring a complicated operation. In addition, by displaying the icon 323 in FIG. 18 and/or FIG. 19, after the content displayed in the display region 311 is displayed before or after viewing the viewing, the icon 323 is operated to display the display region 314, and the first user can communicate with another user. While viewing the content displayed in the display region 311, the first user can view the content displayed in the display region 311 by operating the icon 323 and non-displaying the display region 314. When the first user views the content displayed in the display region 311 by operating the icon 323 and non-displaying the display region 314, the first user can further concentrate on the viewing of the content displayed in the display region 311 as described above. When viewing the content displayed in the display region 311 by operating the icon 323 and displaying the content displayed in the display region 311 by the first user, the first user can reduce the possibility that the message displayed in the display region 314 may include the content related to the content of the display region 311 before viewing the content.

On the other hand, when the icon 323 is not displayed in FIG. 18, the possibility that a part of the display region 311 and the icon 323 overlap can be reduced when the display region 311 is enlarged by performing, for example, a pinch-in operation on the display unit 140 after displaying the icon 323 in FIG. 18. Therefore, for example, in a case where the display region 311 is enlarged while viewing the content displayed in the display region 311 by the first user and characters are displayed in a portion in the display region 311, it is possible to reduce the possibility that the character cannot be visually recognized by superimposing the character on the display position of the icon 323. In addition, by non-displaying the icon 323 in FIG. 19, it is possible to reduce the possibility that a part of the display region 311 overlaps the icon 323. Therefore, for example, in a case where a character is displayed in a portion in the display region 311 while viewing the content displayed in the display region 311 by the first user, it is possible to reduce the possibility that the character cannot be visually recognized by superimposing the character on the display position of the icon 323.

Further, by displaying the slider 330 in FIG. 18 and/or FIG. 19, fine adjustment of the enlargement ratio of the display region 311 can be intuitively performed. Therefore, for example, in a case where the enlargement ratio of the display region 311 in the case of the transition to FIG. 18 or FIG. 19 is determined in advance in place of FIG. 17, the first user can intuitively perform fine adjustment to the desired enlargement ratio.

On the other hand, when the slider 330 is not displayed in FIG. 18, the possibility that a part of the display region 311 and the slider 330 are superimposed can be reduced when the display region 311 is enlarged by performing, for example, a pinch-in operation on the display unit 140 after displaying the slider 330 Therefore, for example, in a case where the display region 311 is enlarged while viewing the content displayed in the display region 311 by the first user and characters are displayed in a portion in the display region 311, the possibility that the character cannot be visually recognized by superimposing the character on the display position of the slider 330 can be reduced. In addition, by non-displaying the slider 330 in FIG. 19, it is possible to reduce the possibility that a part of the display region 311 overlaps the slider 330. Therefore, for example, in a case where a character is displayed in a portion in the display region 311 while viewing the content displayed in the display region 311 by the first user, it is possible to reduce the possibility that the character cannot be visually recognized by superimposing the character on the display position of the slider 330.

As described above, when the first condition described above is satisfied, the display unit 140 can display FIG. 18 or FIG. 19 instead of FIG. 17. Therefore, for example, the user performs the fine adjustment of the enlargement ratio by repeatedly performing the pinch-in to the display region 311 of the display unit 140, or optimizes the display (content) of the display region 311 without performing a complicated operation such as performing pinch-out when the pinch-in is repeatedly performed to perform fine adjustment of the enlargement ratio. By making the avatar 80 operated by the user non-display, the user can listen to the viewing of the content displayed in the display region 311, and even when the application of the present disclosure is executed by using the terminal 10 of a relatively small display screen such as a smartphone, the display can be easily and appropriately switched.

In the case of changing from the display in FIG. 17 to the display in FIG. 18, the display in FIG. 17 may correspond to the "first display" in this disclosure, and the display in FIG. 18 may correspond to the "second display" in this disclosure. In the case of changing from the display in FIG. 17 to the display in FIG. 18, the display in FIG. 17 may correspond to the "first display" and the display in FIG. 18 may correspond to the "second display" in this disclosure.

Note that, in the state shown in FIG. 18 or FIG. 19, an operation for moving the avatar 80A may be received, or an operation for moving the avatar 80A may not be received. In the state shown in FIG. 18 or FIG. 19, when the movement of the avatar 80A is not accepted, for example, when the moving image is displayed in the display region 311 and the user views the moving image, it is possible to suppress the movement of the avatar 80A by erroneously moving the avatar 80A by the user. In this way, even in an operation in which the user erroneously moves the avatar 80A, the avatar 80A moves and the display unit 140 does not display a part of the display region 311.

Also, at least one of the operations to change from the display in FIG. 19 to the display in FIG. 17, from the display in FIG. 19 to the display in FIG. 18, and from the display in FIG. 18 to the display in FIG. 17 may be, for example, an operation to move the seated avatar 80A away from the chair 81.

In addition, at least one of the operation for changing from the display of FIG. 19 to the display of FIG. 17, the operation for changing from the display of FIG. 19 to the display of FIG. 18, and the operation for changing the display of FIG. 18 to the display of FIG. 17 may be an operation of performing one of a tap, a double tap, a swipe, a flick, a pinch-in, and a pinch-out in the region 301, or may be an operation of designating (touching) a specific icon such as the icon 323.

In addition, at least one of the operation for changing from the display of FIG. 19 to the display of FIG. 17, the operation for changing from the display of FIG. 19 to the display of FIG. 18, and the operation for changing the display of FIG. 18 to the display of FIG. 17 may be an operation of performing one of a tap, a double tap, a swipe, a flick, a pinch-in, and a pinch-out in the region 311, or may be an operation of designating (touching) a specific icon such as the icon 323.

Also, at least one of the operations to change from the display in FIG. 19 to the display in FIG. 17, from the display in FIG. 19 to the display in FIG. 18, and from the display in FIG. 18 to the display in FIG. 17 may be performed, for example, by the user operating slider 330.

In addition, when at least one of the operation for changing from the display of FIG. 19 to the display of FIG. 17, the operation for changing from the display of FIG. 19 to the display of FIG. 18, and the operation for changing from the display of FIG. 18 to the display of FIG. 17, the display unit 140 may not display the icon 323 instead of displaying the display region 314.

The case where the display unit 140 displays the slider 330 superimposed on the virtual venue 310 will be described below. The slider 330 is, for example, an operation user interface including a first element 331 and a second element 332. The first element 331 is configured to be slidable on the second element 332. For example, the display unit 140 displays the slider 330 in at least one of FIGS. 17 to 19.

As the first element 331 is displaced from the left side to the right side on the second element 332, the display unit 140 enlarges and displays a partial region of the virtual venue 310. Further, as the first element 331 is displaced from the right side to the left side on the second element 332, the display unit 140 reduces and displays a partial region of the virtual venue 310. In this way, when the display unit 140 displays the display screen described in FIGS. 17 to 19, the user can adjust the enlargement ratio of the partial region of the virtual venue 310.

When the display unit 140 displays FIG. 18 instead of FIG. 17 by satisfying the above-described "first condition", the display unit 140 may display, for example, FIG. 18 such that the first element 331 is positioned substantially at the center of the second element 332. When the display unit 140 displays FIG. 19 instead of FIG. 17 by satisfying the above-described "first condition", the display unit 140 may display, for example, FIG. 19 such that the first element 331 is located at the right end of the second element 332.

4. Operation of System 1000

Figure 20:
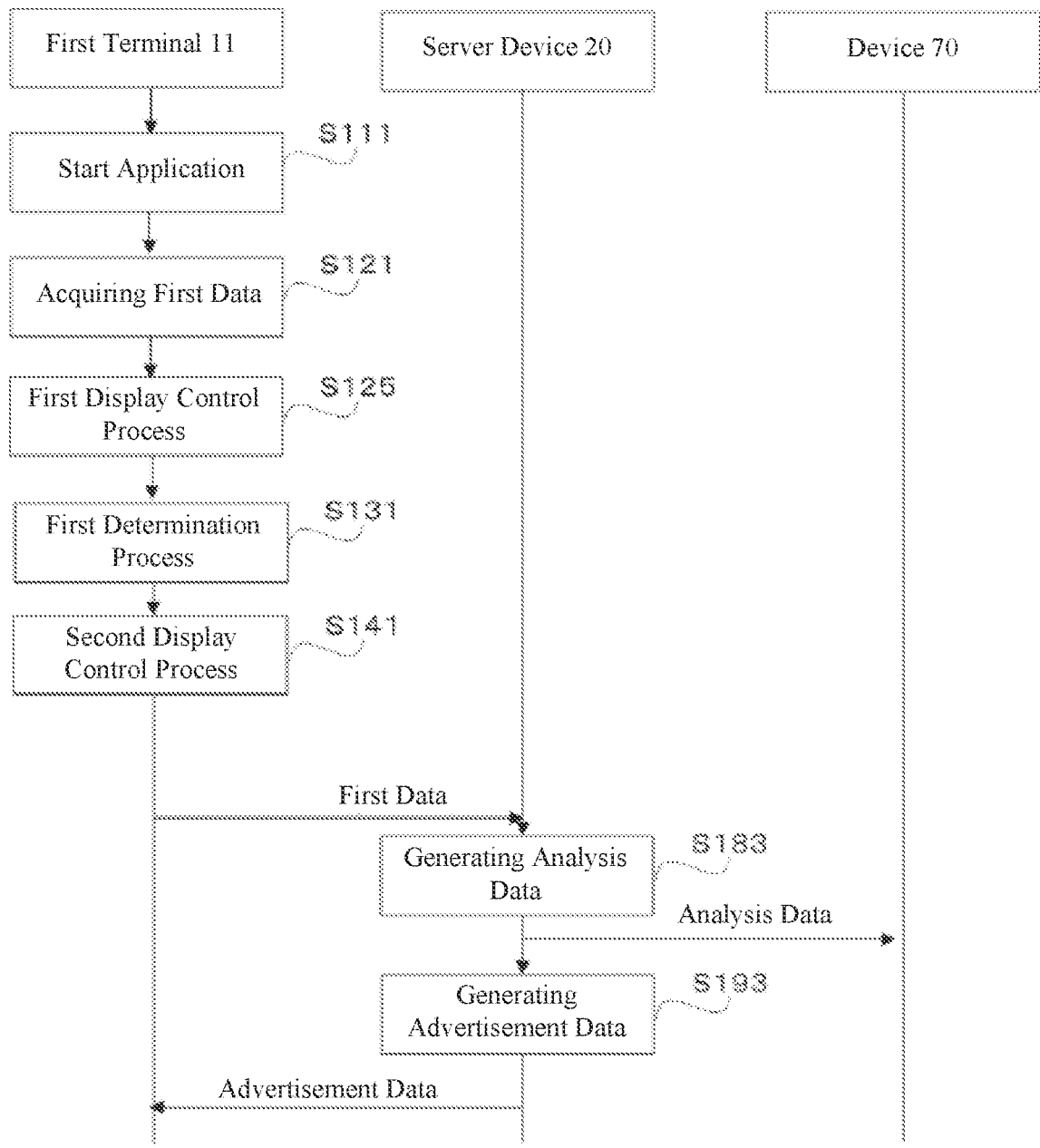
FIG. 20 is an example of a flowchart showing a process executed in the present embodiment.
Figure 21:
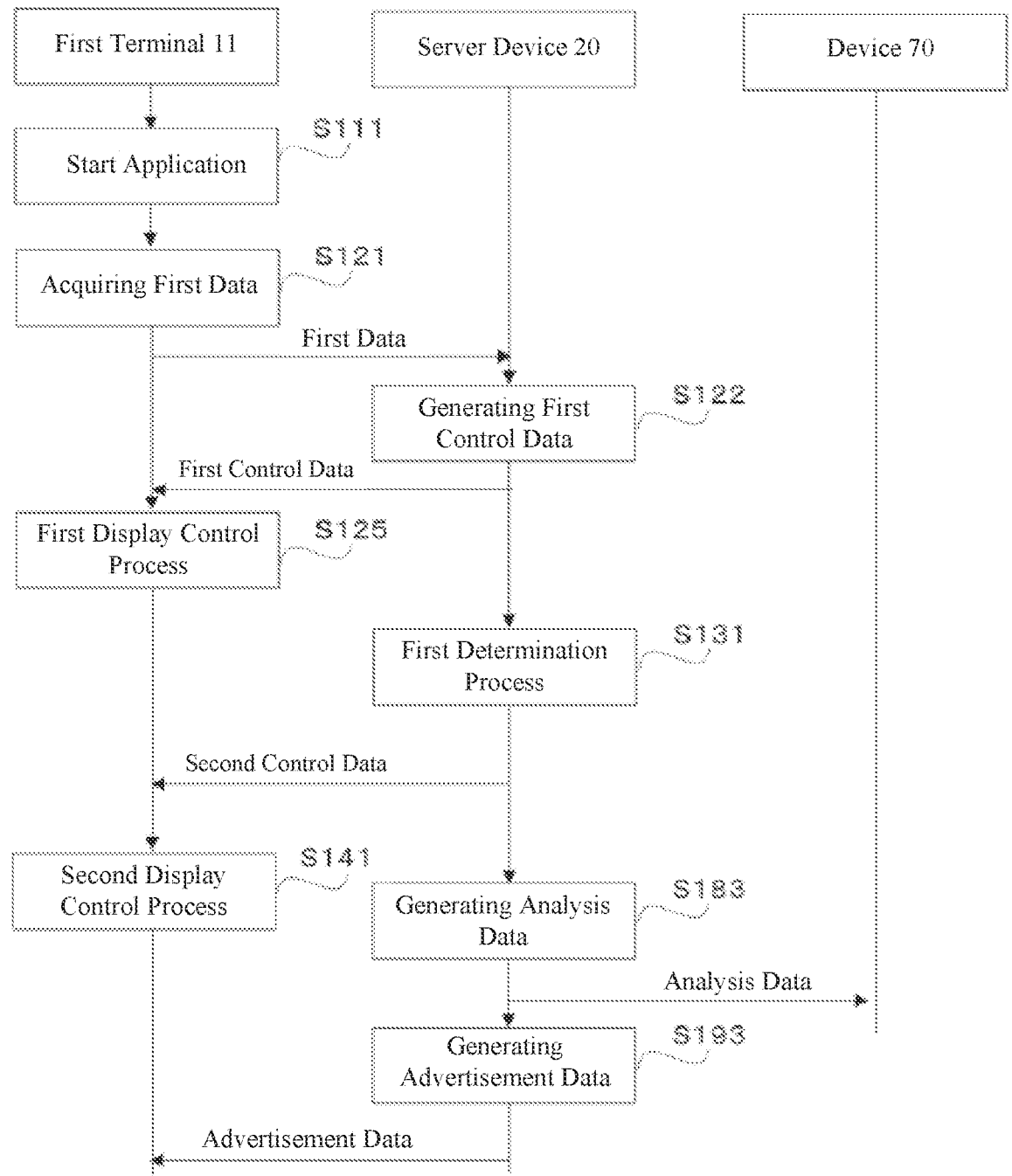
FIG. 21 is an example of a flowchart showing a process executed in the present embodiment.

The operation of the system 1000 is described with reference to FIGS. 20 and 21. FIGS. 20 and 21 show a flowchart that illustrates an example of the system 1000. The flowchart shows an example of the operation performed using the system 1000 shown in FIG. 1.

First, S111-S193 are explained in turn with reference to FIG. 20.

At S111, the first user operates the first terminal 11 and application by operating the first terminal 11. Then, at S121, the first terminal 11 acquires the first data.

Here, the first data includes, for example, data related to an avatar in a virtual space operated using a terminal of the first user. Further, the first data may include user's operation data and operation history data, and may include, for example, data related to the position of the avatar of the first user. The first data may include, for example, data related to an action history in a virtual space of an avatar in a virtual space operated using a terminal of the first user.

In S125, the first terminal 11 performs the first display control process. Here, the first display control process refers to, for example, a process of operating the avatar 80A by a user operating the first terminal 11 and displaying a display screen as shown in FIG. 17 when the avatar 80A shown in FIG. 16 is located inside the virtual venue 310

In S131, the first terminal 11 performs the first determination process. Here, the first determination process determines whether the first data satisfies the predetermined condition (condition 1). In S131, if the first terminal 11 determines that the first condition is met, the first terminal 11 determines the control data to control the display unit 140 of the first terminal 11, and the process of S141 is performed. On the other hand, in S131, if it is determined that the first terminal 11 does not satisfy the first condition, the processing of S131 is repeated.

The first condition in S131 is, for example, a predetermined position in the virtual venue 310 or a predetermined region in the virtual venue 310. Here, the "predetermined region" refers to, for example, a predetermined distance with the display region 311 as a reference. The "first condition" here may be, for example, specifying the display region 311. The "first condition" may be, for example, that the user operates the terminal 10 and the avatar 80A is seated on the chair 81. The "first condition" may be, for example, a predetermined position in the virtual venue 310 or a predetermined region in the virtual venue 310, and the designation of the display region 311. The "first condition" may be, for example, that the user operates the terminal 10 to seat the avatar 80A on the chair 81 and specify the display region 311.

At S141, the first terminal 11, based on the control data A process (second display control process) is performed to control the display unit 140 of the first terminal 11. As a result, the display unit 140 of the first terminal 11 displays FIG. 18 or FIG. 19 instead of FIG. 17. After S141, the first terminal 11 transmits the first data to the server device 20. Before S141, the first terminal 11 may send the first data to the server device 20.

In S183, the server device 20 determines the analysis data based on the first data. The server device 20 then transmits the determined analysis data to the device 70. For example, the server device 20 determines the analysis data each time it receives the first data and transmits the determined analysis data to the device 70.

In S193, the server device 20 determines advertising data based on the first data. The advertising data includes data determined based on the first data and directed to the first user operating the first terminal 11. At S193, the server device 20 transmits the determined advertisement data for the first user to the first terminal 11.

Next, S111-S193 are explained in turn with reference to FIG. 21.

In S111, the first user activates the application by operating the first terminal 11. Thereafter, in S121, the first terminal 11 acquires the first data.

Here, the first data includes, for example, data about the avatar in the virtual space that is operated using the first user's terminal. The first data may also include user operation data or operation history data, for example, data related to the location of the first user's avatar. The first data may also include, for example, data regarding the action history in the virtual space of the avatar in the virtual space operated using the first user's terminal.

After S121, the first terminal 11 transmits the first data to the server device 20. In S122, the server device 20 receives the first data and generates first control data on the basis of the first data. In addition, the server device 20 transmits the first control data to the first terminal 11.

In S125, the first terminal 11 performs the first display control process. Here, the first display control process refers to, for example, a process of operating the avatar 80A by a user operating the first terminal 11 and displaying a display screen as shown in FIG. 17 when the avatar 80A shown in FIG. 16 is located inside the virtual venue 310.

In S131, the server device 20 performs the first determination process. Here, the first determination process determines whether or not the first data satisfies a predetermined condition (first condition). In S131, when the server device 20 determines that the first condition is satisfied, the server device 20 determines second control data for controlling the display unit 140 of the first terminal 11, transmits the second control data to the first terminal 11, and executes the processing in step S141. On the other hand, when it is determined in S131 that the first terminal 11 does not satisfy the first condition, the process of S131 is repeated.

The first condition in S131 is, for example, a predetermined position in the virtual venue 310 or a predetermined region in the virtual venue 310. Here, the "predetermined region" refers to, for example, a predetermined distance with the display region 311 as a reference. The "first condition" here may be, for example, specifying the display region 311. The "first condition" may be, for example, that the user operates the terminal 10 and the avatar 80A is seated on the chair 81. The "first condition" may be, for example, a predetermined position in the virtual venue 310 or a predetermined region in the virtual venue 310, and the designation of the display region 311. The "first condition" may be, for example, that the user operates the terminal 10 to seat the avatar 80A on the chair 81 and specify the display region 311.

At S141, the first terminal 11 performs the process of controlling the display unit 140 of the first terminal 11 based on the second control data to control the display unit 140 of the first terminal 11 (second display control process). As a result, the display unit 140 of the first terminal 11 is displayed in place of FIG. 17, FIG. 18 or FIG. 19 is displayed.

In S183, the server device 20 determines the analysis data based on the first data. The server device 20 then transmits the determined analysis data to the device 70. For example, the server device 20 determines the analysis data each time it receives the first data and transmits the determined analysis data to the device 70.

In S193, the server device 20 determines advertising data based on the first data. The advertising data includes data determined based on the first data and directed to the first user operating the first terminal 11. At S193, the server device 20 transmits the determined advertisement data for the first user to the first terminal 11.

Also, in S193 of FIGS. 20 and S193 of FIG. 21, when the avatar 80 enters a virtual venue 310 for performing an event held by a predetermined operation organization and there is a history of viewing a moving image reproduced in the virtual venue 310, the advertisement data transmitted to the first terminal 11 may include, for example, data related to an event in which a predetermined operation organization holds in the future. The data includes at least one of text data, image data, and moving image data.

In S193 of FIGS. 20 and S193 of FIG. 21, the above-described advertisement data may be, for example, data including a URL for accessing a database that stores second data relating to an advertisement determined on the basis of the first data. The above-described advertisement data may be already downloaded into an application (application) by batch processing or the like, for example. In this case, the server device 20 may transmit data related to the ID corresponding to the data to be transmitted to the first terminal 11, and the first terminal 11 may display the advertisement data based on the ID.

FIG. 11 shows an example of data transmitted from the terminal 10. In FIG. 11, when each of the first user, the second user, and the third user performs an avatar operation using the own terminal 10, the server device 20 is described with respect to various data received from each terminal 10. The various types of data include, for example, "age", "sex", "current position", "virtual object", "chat history", "content viewing history", "part ID", and "simple avatar". Here, the "part ID" is, for example, data for specifying an avatar. The "simple avatar" is, for example, data related to an ID of a pattern corresponding to sex including men and women.

The first data described above may include, for example, at least any of the contents regarding the first user in FIG. 11.

Here, with respect to the "age" mentioned above, FIG. 11 shows an example where the age of the first user is 21, the age of the second user is 31, and the age of the third user is 41.

Also, regarding the "gender" mentioned above, FIG. 11 shows an example where the gender of the first user's avatar is male, the gender of the second user's avatar is female, and the gender of the third is male.

Also, with respect to the "current position" described above, FIG. 11 shows that the avatar operated by the first user is at position A01 and the avatar operated by the second user exists at position B01, and the avatar operated by the third user exists at position C01.

Also, regarding the "virtual object" described above, FIG. 11 shows that the avatar operated by the first user purchases a virtual object A12 at time A11 at a price of A13, the avatar operated by the second user opens virtual object B12 at time B11, and the avatar operated by the third user acquires virtual object C12 at time C11. Virtual object B22 is, for example, a door.

Regarding the "chat history" described above, FIG. 11 shows an example where the first user's terminal sends the message "Hello" to the third user's terminal at position A22 at time A21, the second user has no chat history with any other user, and the third user's terminal receives the message "Hello" from the first user's terminal at position C22 at time C21.

With respect to the "content viewing history" described above, FIG. 11 shows an example where the first user's avatar stands up at time A31 at position A32 and starts viewing content, the second user's avatar watches content at time B31 for two hours at seat B33 at position B32, and the third user's avatar leaves seat C33 at time C31 after finishing watching content at position C32.

Although the above example of "age" indicating the user's age is described above, it is not limited to this. For example, the above "age" may indicate the age group to which the user belongs. For example, if age 21 to 30 is defined as Category 1, it may indicate that the age of the first user belongs to Category 1. Also, for example, when 31 to 40 is defined as Category 2, it may indicate that the age of the second user belongs to Category 2. Also, for example, when 41 to 50 years old is defined as Category 3, the age of the third user may be indicated as belonging to Category 3. In this way, in the case where the analysis data is determined in S183 and the analysis data is sent to the device 70, the specific personal information of the user may be sent to the device 70 without sending the user's specific personal information to the device so that the data is used for marketing and the like.

With respect to the "current position" described above, the example of indicating the avatar's position at a specific time is described but is not limited to this. For example, it may include data indicating the trajectory of the avatar's movement within the virtual space 300 within a specified period of time.

Also, with respect to the "chat history" described above, the example of the first user sending the message "Hello" to the third user's terminal at position A22 at time A21 is explained. Although the example of sending the message "Hello" to the third user's terminal is described, the content of the message is not limited to this. The data transmitted from one user's terminal to another user's terminal may include at least one of the following: text, pictograms, voice messages, images, and video.

Also, the first data shown in FIG. 11 is not limited to the example described above, and may include data related to the "action history". The data related to the "action history" includes, for example, a time at which the avatar 80 enters the virtual venue 310, a time when the avatar 80 leaves the virtual venue 310, a time when the avatar 80 stays in the virtual venue 310, a time when the avatar 80 starts viewing an object displayed in the display region 311 in the virtual venue 310, and a time (period) in which the avatar 80 has viewed an object displayed in the display region 311 in the virtual venue 310, a time when the avatar 80 finished viewing an object displayed in the display region 311 in the virtual venue 310, when the avatar 80 is seated on the chair 81, the time when the avatar 80 leaves chair 81, and the time between when the avatar 80 is seated in chair 81 and when the avatar 80 leaves chair 81. In the case where the avatar 80 is seated in chair 81, it may include at least one of the following: position data of chair 81, history concerning received data including messages received by a user operating one terminal 10 from a terminal 10 operated by a user operating another terminal 10, and history concerning transmitted data including messages sent by a user operating one terminal 10 to a terminal 10 operated by a user operating another terminal 10.

In addition, the server device 20 may select whether to transmit data related to any of the contents described in FIG. 11 to the device 70. For example, in a case where the data transmitted to the device 70 includes the content related to the chat history described in FIG. 11, the server device 20 may transmit data excluding the content related to the chat history among the contents described in FIG. 11 to the device 70.

Further, the server device 20 may transmit data obtained by changing at least a part of the content described in FIG. 11 to the device 70. For example, instead of transmitting data indicating that the avatar of the first user is located at the position A 01 to the device 70, the server device 20 may transmit data indicating that the avatar of the first user is located in the vicinity of the position A01 to the device 70.

When receiving data including a message from one of the device 70 and the second terminal 12 to the other of the device 70 and the second terminal 12, the data including the message may not be transmitted to the other terminal 10. In this way, the data exchanged between the second terminal 12 and the device 70 is not transmitted other than the terminal 10 other than the second terminal 12. Therefore, when the data transmitted and received between the second terminal 12 and the device 70 include data related to the personal information of the user operating the second terminal 12, it is possible to reduce the possibility that the personal information is known to the user who operates the terminal 10 other than the second terminal 12.

In the case where the display unit 140 displays the display region 314 and users chat with each other, the user ID and avatar 80 in the chat may or may not be connected to each other. The user ID and avatar 80 may be linked to each other, or may not be linked to each other.

As described above, according to the present disclosure, the present disclosure acquires first data relating to an avatar in a virtual space operated by using a first terminal of a first user, displays a first display including the avatar on a display unit of the first terminal on the basis of the first data, determines whether or not the first condition is satisfied on the basis of the first data, and controls the display unit so as to switch the display from the first display to the second display on the basis of a first position where the avatar is present in the virtual space when it is determined that the first condition is satisfied. In this way, when the avatar 80A is moved in the virtual space 300, the display unit 140 displays the avatar 80A, so that the first user can easily grasp the operation and/or position of the operated avatar 80A. On the other hand, in the case of viewing the content in the virtual space 300, the user can optimize the display (content) of the display region 311 without performing a complicated operation, and by making the avatar 80 operated by the user non-display, the user can enjoy the viewing of the content displayed in the display region 311, even when the application of the present disclosure is executed using the terminal 10 of a relatively small display screen such as a smartphone, display switching can be easily and appropriately performed 5. Modified Example In FIG. 20, an example in which the server device 20 performs the processes of S183 and S193 has been described after S141, but the present invention is not limited thereto. For example, the server device 20 may receive the first data from the first terminal 11 before step S131. Thus, the server device 20 may perform the processing of S183 before step S131 and transmit the analysis data to the device 70. For example, the server device 20 may perform the processing of S193 before step S131 and transmit the advertisement data to the first terminal 11. In this way, the server device 20 can reduce the time between the timing at which the first data is received and the timing at which the analysis data determined on the basis of the received first data is transmitted to the device 70. The processes of the first terminal 11, the server device 20, and the device 70 are not limited to those performed as a series of flows in the same flowchart as shown in FIGS. 20 and 21, and the processes of the first terminal 11, the server device 20, and the device 70 may be performed simultaneously in parallel. The processes in S183 and S193 in FIG. 20 may be performed in parallel with the processes other than S183 and S193 described in FIG. 20. The processes in S183 and S193 in FIG. 21 may be performed in parallel with the processes other than S183 and S193 described in FIG. 21. For example, every time the first user moves the avatar 80A to display the target, the processes of S183 and S193 in FIG. 20 or FIG. 21 may not be performed as a series of operations, and each time the first user performs an operation of moving the avatar 80A, processing of S183 and S193 in FIG. 20 or FIG. 21 may not be performed as a series of operations.

As shown in FIG. 14, other than the terminal 10 shown in FIG. 3, the first sensor 102a, the second sensor 102b, the camera 102c, and the microphone 102d may be provided. FIG. 14 is a block diagram illustrating an example of a configuration connected to the terminal 10 and the terminal 10 shown in FIG. 3. Here, the terminal 10, the first sensor 102a, the second sensor 102b, the camera 102c, and the microphone 102d are connected by wire or wireless, for example.

The first sensor 102a is, for example, wired or wirelessly connected to the camera 102c. The camera 102c may include, for example, an RGB camera that captures an image of a visible light beam, and a near-infrared camera that captures an image of a near-infrared ray. For example, the camera 102c can use, for example, a camera included in a True Depth (True Depth) camera of, for example, an iPhone X (registered trademark). The second sensor 102b is, for example, connected to the microphone 102d in a wired or wireless manner Note that the first sensor 102a and the camera 102c may be provided as one configuration. Further, the second sensor 102b and the microphone 102d may be provided as one configuration.

In this way, the terminal 10 may transmit the image captured by the camera 102c to the server device 20. The first terminal 11 may transmit the voice data input to the microphone 102d to the server device 20. Further, the first terminal 11 may transmit moving image data using the camera 102c and the microphone 102d to the server device 20.

FIG. 15 illustrates a generalized example of embodiments, techniques, and suitable calculation environments 1400 on which techniques are implemented, including rendering video in a calculation environment by transmitting and using tokens. For example, as described herein, the calculation environment 1400 may be implemented by any of a terminal device (or a distributor, a viewer), or a distribution server system.

Since techniques can be implemented in various general-purpose or dedicated calculation environments, the calculation environment 1400 is not intended to suggest any limitation with respect to the range of the use or function of the technology. For example, the techniques disclosed herein may be implemented in various other computer system configurations including various portable devices, various multiprocessor systems, various microprocessor-based or programmable household electrical appliances, various network PCs, various mini-computers, various main frame computers, and the like. The technique disclosed herein may be implemented in a distributed calculation environment in which a task is executed by a remote processing device linked through a communication network. In the distributed calculation environment, the program module may be disposed in both local and remote memory storage devices.

Referring to FIG. 15, the calculation environment 1400 includes at least one central processing unit 1410 and a memory 1420. In FIG. 15, the most basic configuration 1430 is included in the broken line. The central processing unit 1410 may execute an instruction executable by a computer, and the central processing unit 1410 may be a real processor or a virtual processor. In the multi-processing system, since the plurality of processing units execute instructions executable by the computer to improve the processing force, the plurality of processors can operate at the same time. The memory 1420 may be a volatile memory (for example, a register, a cache, a RAM), a nonvolatile memory (e.g., a ROM, an EEPROM, a flash memory, or the like), or any combination of these two. The memory 1420 stores, for example, software instructions 1480, various images, and videos that can implement the techniques described herein. The calculation environment may have additional various functions. For example, the calculation environment 1400 includes a storage 1440, one or more input devices 1450, one or more output devices 1460, and one or more communication connections 1470. A mutual connection mechanism (not shown) such as a bus, a controller, or a network mutually connects various components of the calculation environment 1400. Normally, operating system software (not shown) provides an operating environment for other software executed in the calculation environment 1400, and adjusts various activities of various components of the calculation environment 1400.

The storage 1440 may be detachable, or may not be detachable, or may include any other medium that may be used to store a magnetic disk, a magnetic tape or cassette, a CD-ROM, a CD-RW, a DVD, or data, and may be accessed within the calculation environment 1400. The storage 1440 stores instructions for software 1480, plug-in data, and messages that may be used to implement the techniques described herein.

The one or more input devices 1450 may be a keyboard, a key pad, a mouse, a touch screen display, a pen, or a touch input device such as a trackball, a voice input device, a scanning device, or another device that provides an input to the calculation environment 1400. In the case of audio, one or more input devices 1450 may be a sound card or a similar device for receiving analog or digital audio input, or a CD-ROM reader for providing various audio samples to the calculation environment 1400. The one or more output devices 1460 may be another device that provides an output from a display, a printer, a speaker, a CD writer, or a calculation environment 1400.

One or more communication connections 1470 allow communication with another computing entity via a communication medium (e.g., a connection network). The communication medium transmits data such as instructions executable by a computer, compressed graphics data, video, or other data included in the modulated data signal The one or more communication connections 1470 are not limited to wired connections (e.g., megabits or gigabits Ethernet, India bands, or fiber channels via electrical or optical fiber connections), and wireless techniques (e.g., Bluetooth, Wi-Fi (IEEE 802.11a/b/n), WiMax, cellular, satellite, laser, infrared, via RF connection), and various agents, various bridges, and destination agents disclosed herein Other appropriate communication connections for providing a network connection are included. In a virtual host environment, one or more communication connections may be virtualized network connections provided by a virtual host.

Various embodiments of the various methods disclosed herein may be executed in the calculation cloud 1490 using a plurality of instructions executable by a computer that mounts all or some of the techniques disclosed herein. For example, various agents can execute various vulnerability scan functions in a calculation environment, while a consumer service of the agent platform (e.g., a bridge) and the destination agent data can be executed by various servers located inside the calculation cloud 1490.

A computer readable medium is any available medium that may be accessed within the calculation environment 1400. By way of example, but not limitation, with respect to the calculation environment 1400, the computer readable medium include memory 1420 and/or storage 1440. As will be readily understood, the term computer readable medium includes memory 1420 and storage 1440 and other media for data storage and does not include transmission media such as various modulated data signals.

The computer program according to the thirty-fifth aspect is characterized in that a computer program executed by at least one processor, the computer program comprising acquiring first data relating to an avatar in the virtual space to be operated using the first terminal of the first user, displaying a first display including the avatar on the display of the first terminal based on the first data, and determining, based on the first data, whether the first condition is satisfied, and if the first condition is determined to be satisfied, switching from the first display to the second display based on a first position in the virtual space at which the avatar is present, at least one processor is configured to control the display unit to switch the display from the first display to the second display based on the first position in the virtual space where the avatar resides.

The computer program according to the thirty-sixth aspect is characterized in that a computer program executed by at least one processor and relating to an avatar in a virtual space operated by a first user's first terminal via a communication line. Upon receiving the first data, based on the first data, the first control data for controlling the display unit so as to display the first display including the avatar on the display unit of the first terminal is determined, and the first control data is determined. Whether or not the first condition is satisfied based on the first data after transmitting the first control data to the first terminal via a communication line and transmitting the first control data to the first terminal. Is determined, and when it is determined that the first condition is satisfied, the display unit is switched from the first display to the second display based on the first position in the virtual space where the avatar exists. The at least one processor is made to function so as to determine the second control data to control and transmit the second control data to the first terminal via the communication line.

The computer program according to the thirty-seventh aspect is characterized in the above-described thirty-fifth or thirty-sixth aspect in that the first condition is that the first data includes operation data to select a part of the region including the first position, the first data includes operation data to select one object displayed on the display, or the first data includes data indicating that the avatar is in the first region.

The computer program according to the thirty-eighth aspect is characterized in the above-described thirty-fifth to thirty-seventh aspects in that the second display does not include the avatar.

The computer program according to the thirty-ninth aspect is characterized in the above-described thirty-seventh or thirty-eighth aspect in that the first condition is that the first data includes operation data to select one object to be displayed on the display, the object being a virtual object on which the avatar can be seated.

The computer program according to the fortieth aspect is characterized in the above-described thirty-seventh or thirty-eighth aspect in that the first condition is that the first data includes operation data to select one object to be displayed on the display, the object being a display that is displayed on the display separately from the first display.

The computer program according to the forty-first aspect is characterized in any of the thirty-fifth to fortieth aspects bin that in the virtual space at least one virtual venue, which is the space where the video is distributed, is provided.

The computer program according to the forty-second aspect is characterized in the above-described forty-first aspect depending from the thirty-seventh aspect or the forty-first aspect depending on the thirty-eighth aspect in that the first condition is that the first data includes operation data for selecting one object to be displayed on the display unit, and that the first condition is that the first data includes operation data for selecting one object to be displayed on the display unit. The first condition is that the first data includes operation data to select one object to be displayed on the display unit, and the object is a moving image.

The computer program according to the forty-third aspect is characterized in the above-described forty-first aspect depending on the thirty-seventh aspect or the forty-first aspect depending on the thirty-eighth aspect in that the first condition is that the first data includes data indicating that the avatar is within the includes data indicating that the avatar is within the first region, and the first region is a region within one of the at least one virtual venues.

The computer program according to the forty-fourth aspect is characterized in any of the above-described thirty-fifth to forty-third aspects in that the second display is a display in which a portion of the first display is enlarged so that a portion of the first display occupies a larger proportion of the display region.

The computer program according to the forty-fifth aspect is characterized in the thirty-fifth to forty-third aspects in that in the case the first condition is satisfied, the display corresponding to the virtual object existing in the virtual space is displayed in the entire region of the display unit.

The computer program according to the forty-sixth aspect is characterized in any of the above-described thirty-fifth to forty-fifth aspects in that in the case where the first display displays a manipulable virtual object used to instruct the avatar to move, if it is determined that the first condition is met, the second display does not display the manipulable the virtual object.

The computer program according to the forth-seventh aspect is characterized in the above-described thirty-fifth to forty-fifth aspects in that in the case the first display displays a display region that displays a message sent from at least one of the terminals including the first terminal, and when it is determined that the first condition is satisfied, the second display does not display the display region.

The computer program according to the forty-eighth aspect is characterized in any of the above-described thirty-fifth to forty-fifth aspects in that in the case the first display displays a display region in which a message transmitted from at least one of the terminals including the first terminal is displayed, when it is determined that the first condition is met, the second display does not display the display region and displays an icon used for displaying the display region, and the icon is operated to display the display region.

The computer program according to the forty-ninth aspect is characterized in any of the above-described thirty-fifth to forty-eighth aspects in that in the case the second display is displayed on the display unit, operation input concerning movement of the avatar is not accepted.

The computer program according to the fiftieth aspect is characterized in the above-described thirty-fifth aspect or any of the thirty-seventh to forty-eighth aspects depending on the thirty-fifth aspect in that in the case the second display is displayed on the display unit, if an input concerning the avatar's movement is obtained, the display is controlled to switch the display from the second display to the first display.

The computer program according to the fifty-first aspect is characterized in the above-described thirty-sixth aspect or any of the thirty-seventh to forty-eighth aspects depending on the thirty-sixth aspect in that after transmitting the second control data to the first terminal via the communication line, if the program obtains input from the first terminal regarding the movement of the avatar, it determines third control data to control the display unit to switch the display from the second display to the first display, and transmits the third control data to the first terminal via the communication line. at least one processor to function to transmit the third control data to the first terminal.

The computer program according to the fifty-second aspect is characterized in the above-described fiftieth aspect depending on the above-described the forty-sixth aspect or the fifty-first aspect depending on the above-described the forty-sixth aspect in that in the case the second display is displayed on the display unit and an input relating to the movement of the avatar is obtained, the first display, which is switched from the second display displays the virtual object that can be manipulated.

The computer program according to the fifty-third aspect is characterized in the fiftieth aspect depending on the above-described forty-seventh aspect or the fifty-first aspect depending on the above-described any of the forty-seventh to fifty-first aspects in that the second display is displayed on the display unit, when the input concerning the movement of the avatar is obtained, the first display which is switched from the second display and displayed on the display unit displays the display region.

The computer program according to the fifty-fourth aspect is characterized in the fiftieth aspect depending on the above-described forty-eighth aspect or the fifty-first aspect depending on the above-described forty-eighth aspect in that the second display is displayed on the display unit and input concerning the avatar's movement is obtained, the first display, which is switched from the second display and displayed on the display, displays the display region and does not display the icon.

The computer program according to the fifty-fifth aspect is characterized in any of the above-mentioned thirty-fifth to fifty-fourth aspects in that the first data includes at least one of the following: data concerning the avatar's action history in the virtual space, and data of the user operating the avatar.

The computer program according to the fifty-sixth aspect is characterized in the fifty-fifth aspect depending on the above-described forty-first aspect in that the data related to the action history includes data related to the viewing history of the avatar watching the video, data relating to the viewing time of the video of the avatar, data relating to the admission history of the avatar to the virtual venue, and the virtual venue of the avatar. Data on staying time in, data on exit history of the avatar from the virtual venue, data on the action history of the avatar on a virtual object existing in the virtual space, different from the first terminal and the first terminal. Data regarding the position of the first terminal to which the message is transmitted when a message is transmitted from one of the second terminals to the first terminal and the other of the second terminals, data regarding the purchase history of the virtual object. And, at least one of data regarding the position of the virtual object when the virtual object is seatable and the avatar is seated on the virtual object.

The computer program according to the fifty-seventh aspect is characterized in any of the above-described thirty-fifth to fifty-sixth aspects in that the first data is transmitted to a third terminal other than the first terminal and the second terminal different from the first terminal.

The computer program according to the fifty-eighth aspect is characterized in the above-described fifty-seventh aspect in that determining whether or not the first data is received, and if the first data is received, the first data is sent to the third terminal.

The computer program according to the fifty-ninth aspect is characterized in the above-described fifty-seventh or fifty-eighth aspect in that the first data is shorter than the cycle in which the control data is determined.

The computer program according to the sixtieth aspect is characterized in any of the above-described fifty-seventh or fifty-eighth aspects in that the third terminal is a first terminal operated by an operator or an operating organization operating the virtual venue.

The computer program according to the sixty-first aspect is characterized in any of the above-described thirty-fifth to sixtieth aspects in that the second data relating to the advertisement determined based on the first data is transmitted to the first terminal.

The computer program according to the sixty-second aspect is characterized in any of the thirty-fifth to sixtieth aspects in that the data including a URL to access a database storing second data relating to an advertisement determined based on the first data is transmitted to the first terminal.

<0381> The computer program according to the sixty-third aspect is characterized in any of the thirty-fifth to sixty-second aspects in that the virtual space is a 3-dimensional space.

The computer program according to the sixty-fourth aspect is characterized in any of the thirty-fifth to sixty-third aspects in that the communication line includes Internet.

The computer program according to the sixty-fifth aspect is characterized in any of the above-described the thirty-fifth to sixty-fourth aspects in that the at least one processor includes a central processing unit (CPU), a microprocessor, and/or a graphics processing unit (GPU).

The computer program according to the sixty-sixth aspect is characterized in any of the thirty-fifth to sixty-sixth aspects in that the at least one processor includes a server device, a microprocessor, and/or a graphics processing unit (GPU). The one processor is mounted in a server device, a smart phone, a tablet, a cellular phone, or a personal computer.

The method according to the sixty-seventh aspect is characterized by including the steps of acquiring first data related to an avatar in a virtual space operated by using the first terminal of a first user; displaying a first display including the avatar on a display unit of the first terminal on the basis of the first data; determining whether or not the first condition is satisfied on the basis of the first data; and determining, on the basis of the first position where the avatar exists in the virtual space, first control data for controlling the display unit so as to switch the display from the first display to the second display, and a step of controlling the display unit based on the first control data.

The method according to the sixty-eighth aspect is characterized by including the steps of receiving first data on an avatar in a virtual space operated by using a first terminal of a first user via a "communication line"; transmitting the first control data to the first terminal via the communication line; transmitting the first control data to the first terminal via the communication line; and determining whether or not the first condition is satisfied based on the first data after the first control data is transmitted to the first terminal, in the case it is determined that the first condition is satisfied, determining first control data for controlling the display unit so as to switch the display from the first display to the second display on the basis of a first position where the avatar exists in the virtual space; and transmitting the second control data to the first terminal via the communication line.

The method according to the sixty-ninth aspect is characterized in the sixty-seventh or sixty-eighth aspect by including the communication line includes the Internet.

The method according to the seventieth aspect in any of the sixty-seventh to sixty-ninth aspects are characterized by including the at least one processor is a central processing unit (CPU), a microprocessor, and/or a graphics processing unit (GPU).

The server device according to the seventy-first aspect is characterized in that acquiring first data relating to an avatar in a virtual space operated by using a first terminal of a first user, displaying a first display including the avatar on a display unit of the first terminal on the basis of the first data, determining on the basis of the first data, first control data for controlling the display unit so as to switch the display from the first display to the second display on the basis of a first position where the avatar is present in the virtual space, and controlling the display unit on the basis of the first control data.

The server device according to the seventy-second aspect is characterized in the seventy-first aspect in that the communication line includes the Internet.

The server device according to the seventy-third aspect is characterized in the seventy-first or seventy-second aspect in that the at least one processor includes a central processing unit (CPU), a microprocessor, and/or a graphics processing unit (GPU).

As described above, the technology of the present disclosure can provide a computer program, a method, and a server device that do not impair comfort more than before.

Third Embodiment

Conventionally, a virtual world system configured to allow an avatar to move between a plurality of virtual world has been known (Japanese Patent Application Laid-Open No. 2014-529792). However, in Japanese Unexamined Patent Application Publication No. 2014-529792, it is disclosed that each of a plurality of users in the virtual world can communicate with each other through a message using its own avatar. Japanese Patent Laid-Open No. 2014-529792 is incorporated herein by reference. The present disclosure provides a computer program, a method, and a server device that promote communication between specific users as compared with the prior art.

1. Configuration of System 1000

FIG. 1 is a block diagram showing an example configuration of a system 1000 in one embodiment. As shown in FIG. 1, the system 1000 includes, for example, a plurality of terminals 10 connected to a communication line (communication network) not shown in the FIG. 0 and one or more server devices 20 connected to the communication line. The terminal 10 includes a first terminal 11. The terminal 10 may further include a second terminal 12. The server devices 20 also include for example, a first server system 21 and a second server system 22.

The communication line is a mobile phone network, a wireless network (e.g., Bluetooth), Wi-Fi (e.g., IEEE 802.11a/b/n), WiMax, cellular, satellite, laser, infrared, etc.), fixed telephone network, Internet, Intranet, local region network (LAN), wide region network (WAN), and/or Ethernet network can be included without being limited thereto.

1-1. Terminal 10

The terminal 10 is, for example, connected to one or more server devices 20 via a communication line. The terminal 10 is, for example, a smartphone, a tablet device, and/or a personal computer. For example, the terminal 10 is configured to install a predetermined application and execute the predetermined application. In addition, the terminal 10 can receive a Web page (for example, an HTML document or an HTML document obtained by encoding an executable code such as JavaScript or PHP code in some examples) from the server device 20 (the second server system 22).

Hereinafter, a user who operates the terminal 10 will be referred to simply as a user, and a user who operates the first terminal 11 may be referred to as a first user. Further, in FIG. 1, for example, an example in which the first terminal 11 is provided is illustrated as the plurality of terminals 10, but the present invention is not limited thereto. The plurality of terminals 10 may include, for example, two or more terminals. In the following description, it is assumed that the first terminal 11 is referred to as the terminal 10.

1-2. Server System 20

The first server system 21 includes a distribution server device 21A1 and a server storage device 21A2. For example, the distribution server device 21A1 receives from the terminal 10, data required for an application executed in the terminal 10. In addition, for example, the distribution server device 21A1 transmits to the terminal 10, data to be used for an application executed in the terminal 10 in response to the request. The server storage device 21A2 stores, for example, data to be transmitted from the distribution server device 21A1 to the terminal 10. The server storage device 21A2 stores, for example, the data received from the terminal 10 by the distribution server device 21A1. The first server system 21 transmits, for example, data used in an application executed by the terminal 10 to the terminal 10. The first server system 21 transmits, for example, the data received from the terminal 10 to the device 70.

Although an example in which the terminal 10 executes the application has been described, the present invention is not limited thereto. For example, processing equivalent to execution of the application may be executed by using a web browser installed in the terminal 10. In this way, when a web browser installed in the terminal 10 is used, for example, the server device 20 may include a web server (not shown). When the server device 20 includes a web server (not shown), the web server transmits data related to the HTML document such as the HTML 5, and the terminal 10 displays data related to the HTML document by using the web browser, and transmits the user instruction data to the terminal 10 (the web browser), and the server device 20 performs display control. The server device 20 generates display data by performing the display control, and transmits the display data to the terminal 10 (the web browser) The display control may be performed using a script such as JavaScript (registered trademark) in the web browser.

Although the first server system 21 includes the distribution server device 21A1 and the server storage device 21A2 in FIG. 1, the first server system 21 is not limited thereto. For example, the first server system 21 may include other configurations in addition to the distribution server device 21A1 and the server storage device 21A2. In this case, the other configuration may have at least one of the distribution server device 21A1 and the server storage device 21A2. For example, the first server system 21 may be configured by a single configuration including functions of the distribution server device 21A1 and the server storage device 21 A2.

The second server system 22 is a server that transmits data related to the content to the terminal 10. Here, for example, it is assumed that the user operates the terminal 10 to execute the application. In this case, when the second server system 22 receives a request for data relating to the content from the terminal 10 while the application is being executed, the second server system 22 transmits data related to the content to the terminal 10. The data related to the content transmitted from the second server system 22 to the terminal 10 is, for example, data relating to a moving image.

1-3. Equipment 70

The device 70 (third terminal) is, for example, a terminal operated by an operator or an operation organization that operates the virtual venue. The device 70 transmits predetermined data to the first server system 21, and receives predetermined data transmitted from the first server system 21. A specific configuration of the device 70 will be described later.

2. Hardware Configuration of Each Device

Next, an example of the hardware configuration of each of the terminal 10 and the server device 20 is described.

2-1. Hardware Configuration of Terminal 10

An example of the hardware configuration of each terminal 10 is described with reference to FIG. 2. FIG. 2 is a block diagram showing an example of the hardware configuration of terminal 10 (server device 20) shown in FIG. 1. In FIG. 2, the reference codes in parentheses are described in relation to the server device 20, as described below.

As shown in FIG. 2, each terminal 10 has, for example, a central processing unit 14, a main memory device 15, an input/output interface device 16, input device 17, auxiliary storage device 18, output device 19. The configurations shown in FIG. 2 are connected to each other by data and/or control buses.

The central processing unit 14 is referred to as a "CPU", performs calculation on the instruction and data stored in the main memory device 15, and stores the result of the calculation in the main memory device 15. Further, the central processing unit 14 can control the input device 17, the auxiliary storage device 18, and the output device 19 or the like via the input/output interface device 16. The terminal 10 may include one or more such central processing devices 14.

The main memory device 15 is referred to as a "memory", and stores instructions and data received from the input device 17, the auxiliary storage device 18, and the communication line 30 (server device 20 or the like) via the input/output interface device 16, and the calculation result of the central processing unit 14. The main memory device 15 includes a volatile memory (for example, a register, a cache, a random access memory (RAM)), a nonvolatile memory (for example, a read-only memory (ROM), an EEPROM, a flash memory), and a storage (e.g., a hard disk drive (HDD), a computer readable medium such as a solid state drive (SSD), a magnetic tape, and an optical medium can be included without being limited thereto. As will be readily understood, the term "computer-readable recording medium" may include media for data storage, such as a memory and a storage, rather than a transmission medium such as a modulated data signal, i.e., a temporary signal.

The input device 17 is a device that captures data from the outside, and includes a touch panel, a button, a keyboard, a mouse, and/or a sensor, without being limited thereto. The sensor may include, as will be described later, a sensor including one or more cameras, such as one or more cameras, or one or more microphones.

The auxiliary storage device 18 is a storage device having a capacity larger than that of the main memory device 15. Instructions and data (computer programs) constituting the above-described specific application (moving image distribution application, moving image viewing application, and the like), a web browser application, and the like can be stored. Further, since the auxiliary storage device 18 is controlled by the central processing unit 14, these instructions and data (computer program) can be transmitted to the main memory device 15 via the input/output interface device 16. The auxiliary storage device 18 can include a magnetic disk device and/or an optical disk device without limiting them.

The output device 19 can include, without limitation, display devices, touch panels and/or printer devices.

In such a hardware configuration, the central processing unit 14 sequentially loads instructions and data (computer programs) constituting the specific application stored in the auxiliary storage device 18 to the main memory device 15. The central processing unit 14 controls the output device 19 via the input/output interface device 16 by calculating the loaded instruction and data, or can transmit and receive various data between another device (for example, the server device 20 and the other terminal 10) via the input/output interface device 16 and the communication line 2.

2-2. Hardware Configuration of Server Equipment 20

A hardware configuration example of each server device 20 will be described with reference to FIG. 2. The hardware configuration of each server device 20 (each of the distribution server device 21A1) and the server storage device 21A2 may be the same as the hardware configuration of each of the terminals 10 described above. Therefore, the reference sign for the component included in each server device 20 is shown in parentheses in FIG. 2.

As shown in FIG. 2, each server device 20 mainly includes a central processing unit 24, a main memory unit 25, an input/output interface device 26, an input device 27, an auxiliary storage device 28, and an output device 29. These devices are connected to each other by a data bus and/or a control bus.

The central processing unit 24, the main memory unit 25, the input/output interface device 26, the input device 27, the auxiliary storage device 28, and the output device 29 can be substantially the same as the central processing unit 14, the main memory device 15, the input/output interface device 16, the input device 17, the auxiliary storage device 18, and the output device 19 included in the respective terminals 10.

In such a hardware configuration, the central processing unit 24 sequentially loads instructions and data (computer programs) constituting the specific application stored in the auxiliary storage device 28 to the main memory unit 25. The central processing unit 24 controls the output device 29 via the input/output interface device 26 by calculating the loaded instruction and data, or can transmit and receive various data between the input/output interface device 26 and the communication line 2 via the input/output interface device 26 and the communication line 2.

The server unit 20 may include one or more microprocessors and/or a graphics processing unit (GPU) instead of or together with the central processing unit 24.

3. Functions of Each Device

Next, an example of the functions of each of the terminal 10 and server device 20 is described using FIGS. 3 and 4, respectively.

3-1. Functions of Terminal 10

FIG. 3 is a block diagram showing an example of the functions of terminal 10 shown in FIG. 1. As shown in FIG. 3, the terminal 10 includes, for example, a communication unit 110, an acquisition unit 120, a control unit 130, a display unit 140, a user interface unit 150, and a memory unit 160.

(1) Communication Unit 110

The communication unit 110 is used, for example, to transmit various data to server device 20. The communication unit 210 is used, for example, to receive various data from the server device 20. The data received in communication unit 210 is sent to control unit 130, for example.

(2) Acquisition Unit 120

The acquisition unit 120 acquires operation data concerning operations from the user, for example. The acquisition section 120 also acquires data detected by various sensors, for example. The data acquired in the acquisition section 120 is sent, for example, to the control unit 130. The acquisition section 120 acquires data, for example, in S121 of FIGS. 26 and S121 of FIG. 27, which will be described later. For example, the operation data may include one or more of the following data.

Data indicating how the user swiped the touchpad display

Data indicating which part of the touchpad display was touched by the distributor Data indicating which object the user tapped or clicked Data indicating how the user dragged the touchpad display Data indicating how the user dragged the touchpad display Other such operational data Note that the above-described "other operation data" is, for example, data indicating whether the user has touched any position on the display screen of the terminal 10. When the user corresponds to any location in the virtual space 300 at a location designated on the display screen of the terminal 10, the avatar of the user moves to the location in the virtual space 300, for example. The data acquired by the acquisition unit 120 may be data related to non-operation (data indicating that operation is not performed), for example, data indicating that the terminal 10 has not been operated for a specific time (specific period) and/or data indicating that the terminal 10 has not entered a specific place in the virtual space 300.

(3) Control Unit 130

For example, the control unit 130 performs various types of control on the basis of the data received by the communication unit 110. Further, the control unit 130 performs various types of control on the basis of the data acquired by the acquisition unit 120. For example, the control unit 130 performs S131 of FIG. 26, S141 of FIG. 26, and S141 in FIG. 27, which will be described later.

(4) Display Unit 140

The display unit 140 displays, for example, display contents based on control data output from control unit 130. The display unit 140, for example, displays a screen for selecting a predetermined application. The display 140, for example, also displays a screen related to the virtual space in the case of selecting a predetermined application and executing the predetermined application.

(5) User Interface Unit 150

The user interface unit 150 is used for inputting various data used to execute applications via user operations.

(6) Memory Unit 160

The memory unit 160 can store various data used for execution of the application. The memory unit 160 stores data used to control the display unit 140. The memory unit 160 stores, for example, module data used to generate an avatar of the first user. Note that the memory unit 160 is not limited to a case in which the module data used for generating the avatar of the first user is stored, and may store the module data used for generating another avatar.

Note that the module data is, for example, data relating to parts for generating an avatar. Here, the part for generating the avatar includes, for example, data of each part of the avatar (eyes, nose, mouth, eyebrow, skin color, hairstyle, hair color, clothing, body, and the like). Further, the module data includes data related to an ID assigned corresponding to each part for generating an avatar. In the case where the parts of the avatar are bodies, the data related to the parts for generating the avatar may include data subdivided into the body shape such as slimming type, slightly slimming type, standard, slightly obesity, obesity, and the like.

When the display unit 140 displays the avatar 80 other than the first avatar 80A (the avatar of another person), the server device 20 may transmit the ID data used to generate the avatar 80 other than the first avatar 80A to the first terminal 11, and the first terminal 11 may construct the avatar 80 other than the first avatar 80A based on the ID data.

When the display unit 140 displays the avatar 80 other than the first avatar 80A (the avatar of another person), the display unit 140 may display the avatar 80 other than the first avatar 80A in black, or may display the avatar 80 other than the first avatar 80A for male or female using the parts and/or colors determined based on the gender (for example, male or female) of the user corresponding to the avatar 80 other than the first avatar 80A.

3-2. Functions Of Server Device 20

FIG. 4 is a block diagram showing an example of the functions of the server device 20 shown in FIG. 1. As shown in FIG. 4, server device 20 includes, for example, communication unit 210, memory unit 220, and a control unit 230.

(1) Communication Unit 210

The communication unit 210 is used, for example, for transmitting various data to the terminal 10. The communication unit 210 is used, for example, for receiving various data from the terminal 10. The data received by the communication unit 210 is sent to the control unit 230.

(2) Memory Unit 220

The memory or storage unit 220 stores various data used for execution of an application. For example, the storage unit 220 stores first data transmitted from the first terminal 11. The first data transmitted from the first terminal 11 includes, for example, data related to the first avatar 80A. The first data may include data related to the "action history". The details of the first data transmitted from the first terminal 11 and the data related to the "action history" will be described later.

(3) Control Unit 230

For example, the control unit 230 performs various types of control on the basis of the data received by the communication unit 210. For example, the control unit 230 performs S183 of FIG. 26, S193 in FIG. 26, S133 in FIG. 27, S183 of FIG. 27, and S193 in FIG. 27, which will be described later.

FIG. 5 is a diagram illustrating a display example displayed on the display unit 140 of the first terminal 11 by activating the application by operating the first terminal 11. As shown in FIG. 5, the virtual space 300 is displayed on the display unit 140. The virtual space 300 is, for example, a three-dimensional space. The avatar 80 and the virtual venue 310 are shown in the virtual space 300.

The avatar 80 is configured to perform at least one of, for example, walking, traveling, and jumping (jump) by a user's operation. The avatar 80 is configured so that, for example, by a user's operation, the virtual object is checked by a user's operation, a virtual object is pushed, a virtual object is pulled, and the virtual object is lifted, sitting on the virtual object, purchasing a virtual object and an item is delivered to the virtual object. Here, the virtual object is, for example, an avatar, a door, a food, an admission ticket, a chair, an exhibit, and the like. When the user operates the avatar 80 using the terminal 10, the data relating to the operation is transmitted to the server device 20.

The description related to the virtual object is displayed on the display unit 140 by the operation of "checking the virtual object" described above. The sentence explaining the virtual object is, for example, at least one of the name of the virtual object, the application of the virtual object, and the price of the virtual object. The description related to the virtual object is, for example, at least one of a sentence, an image, and a moving image.

The "push" operation, "pull" operation, and "lift" operation described above can be used to change the position of the relevant virtual object in the virtual space 300.

By the operation of "sitting on the virtual object" described above, the avatar 80 is seated on the virtual object. The avatar 80 may be configured to be seated in a specific place other than the virtual object. Further, it is assumed that the avatar 80 is seated on the virtual object or when the avatar 80 is seated in a specific place other than the virtual object In this case, the display unit 140 may display a display screen (for example, a display screen having no UI operation unit or chat screen) different from the display screen before the avatar 80 is seated, or may not display the user interface present before the avatar 80 is seated. In a case where the display unit 140 displays a display screen different from the display screen before the avatar 80 is seated, the display unit 140 may perform such a display that the screen of the display target or the like becomes full-screen display.

The "purchase virtual object" operation described above allows, for example, the purchase of the virtual object. If the virtual object is wearable, the avatar 80 can wear the purchased virtual object to change the appearance of the avatar 80.

The avatar 80 other than the avatar 80 to be operated among the avatars displayed on the display unit 140 may be an avatar operated by the user or may be determined in advance for an operation in the virtual space 300. Here, when the avatar 80 is determined in advance for the operation in the virtual space 300, the avatar 80 means that the avatar 80 operates as an NPC (Non-Layer Character).

The appearance of the avatar 80 shown in FIG. 5 is all the same, but is not limited thereto. The appearance of the avatar 80 may be determined based on data related to a user operating the avatar 80. For example, when the user who operates the avatar 80 is a male, the appearance of the avatar 80 may be a male. For example, when the user who operates the avatar 80 is a woman, the appearance of the avatar 80 may be a woman. The appearance of the avatar 80 may be determined based on the ID of the parts of the avatar selected by the user, or may be different from each other Here, the above-described "different" may be, for example, an appearance similar to an objective or similar appearance, or may be a completely different external appearance.

In addition, the motion of the avatar in the virtual space may be changed in conjunction with the operation of the user. For example, the avatar in the virtual space may also be similar to the avatar in the virtual space when the user makes a nodding motion. Here, the operation data may be acquired using, for example, a motion capture system. As will be readily understood by those skilled in the art having benefits according to the present disclosure, an appropriate motion capture system of some examples that may be used together with the device and method disclosed in the present application includes an optical motion capture system using a passive marker or an active marker or using no marker, and an inertial and magnetic non-optical system Motion data may be acquired using an image capture device such as a CCD (charge coupled device) or CMOS (complementary metal oxide semiconductor) image sensor coupled to a computer that converts motion data into a moving image or other image data.

When operating the first avatar 80A shown in FIG. 5, for example, the display 140 shows a screen like FIG. 16.

FIG. 16 is a diagram illustrating a display example displayed on the display unit 140 of the terminal 10. Specifically, FIG. 16 is a diagram illustrating an example displayed on the display unit 140 of the first terminal 11 when the first user operates the first avatar 80A using the first terminal 11. As illustrated in FIG. 16, for example, the display unit 140 displays the avatar 80, the first avatar 80A, and the virtual venue 310. Here, the display unit 140 displays the back surface of the first avatar 80A, and the line of sight of the first user operating the first terminal 11 and the line of sight of the first avatar 80A corresponding to the first user are the same direction. For example, the display unit 140 displays a region in the virtual space including the first avatar 80A on the basis of a virtual viewpoint located in the front direction in FIG. 16 than the first avatar 80A. The display unit 140 displays a region including the traveling direction of the first avatar 80A in the virtual space. The region in the virtual space displayed by the display unit 140 can be changed by operating the first avatar 80A using the terminal 10. For example, by changing the advancing direction of the first avatar 80A by 180 degrees using the terminal 10, the rear region of the first avatar 80A in FIG. 16 can be displayed. As described above, by operating the first avatar 80A using the terminal 10, the display unit 140 can display a region that is not displayed in FIG. 16. When the first user operating the first terminal 11 operates the first avatar 80A and the first avatar 80A shown in FIG. 16 is located inside the virtual venue 310, for example, a display screen as shown in FIG. 17 is displayed.

In FIG. 16, when the first avatar 80A is operated by the first user, the first terminal 11 acquires, for example, data relating to the position in the virtual space 300 of the first avatar 80A. For example, the data relating to the position in the virtual space 300 of the first avatar 80A acquired by the first terminal 11 is transmitted to the server device 20. Note that the timing at which the first terminal 11 acquires data relating to the position in the virtual space 300 of the first avatar 80A may be any timing. For example, the timing at which the data related to the position in the virtual space 300 of the first avatar 80A acquired by the first terminal 11 may be transmitted to the server device 20 may be any timing.

Further, an arbitrary region of the display unit 140 of the first terminal 11 may be touched. In addition, when the first terminal 11 includes an acceleration sensor (not shown) and the first terminal 11 is operated, the display region and/or the direction displayed by the display unit 140 may be changed based on the acceleration sensor.

Here, the above-described "arbitrary region" includes, for example, the region 301 and/or the display region 314 of FIG. 16. The region 301 and/or the display region 314 is an operation user interface for performing a predetermined display control by performing a touch operation. The "touch operation" refers to at least one of a tap, a double tap, a swipe, a flick, a pinch-in, and a pinch-out The region 301 and/or the display region 314 may be displayed at the same position or at a different position even when the display of FIG. 16 is performed, and other drawings (for example, at least one of FIG. 22 and FIG. 8) to be described later are displayed.

Further, two or more regions 301 may be provided as described in FIG. 16, or may be provided as one or three or more. In a case where two or more regions 301 are provided, the one region 301 corresponds to, for example, a region used to walk the first avatar 80A, and the other region 301 corresponds to, for example, a region used to jump the first avatar 80A. In this manner, the first avatar 80A can be walking or jumped by touching the region 301.

Here, the touch operation for walking or jumping the first avatar 80A is, for example, an operation of tapping or double-tapping the region 301 of the first avatar 80A. In addition, a region for performing a touch operation for walking or jumping the first avatar 80A may be a region other than the region 301.

The display region 314 is a region for displaying a message to be input by a user corresponding to the avatar 80. When the display unit 140 displays the display region 314, at least one of a message transmitted from the first terminal 11 and a message transmitted from a terminal other than the first terminal is displayed in the display region 314. Here, the message displayed in the display region 314 may display a message addressed to the first terminal, or the message displayed in the display region 314 may display a message exchanged between the terminals other than the first terminal. Therefore, the display region 314 functions as a region where the user corresponding to at least one avatar 80 existing in the virtual space 300 can browse and/or chat, or a region where the user corresponding to at least one avatar 80 existing in a specific place in the virtual space 300 can browse and/or chat.

In this way, the first terminal 11 can chat with the user corresponding to at least one avatar 80 of all the avatars 80 via the display region 314 of the display unit 140 by the first user. For example, the first terminal 11 can chat with a user corresponding to all the avatars 80 existing in a predetermined region (in the same region) via the display region 314 of the display unit 140 by the first user. Here, a user who chat with the first user is a personal user or an extended company. When a plurality of messages is displayed in the display region 314, a message that is not displayed in the display region 314 can be displayed by performing a touch operation when all messages cannot be displayed in the display region 314. Here, the touch operation in a case where all messages cannot be displayed in the display region 314 is, for example, a swipe.

The condition that the display region 314 is displayed on the display unit 140 is not limited to a case where the avatar 80 is located in the virtual venue 310. For example, when the avatar 80 is located within the predetermined region in the virtual space 300, the display region corresponding to the predetermined region may be displayed on the display unit 140. That is, the display region to be displayed on the display unit 140 may be determined in accordance with the position where the avatar 80 is present. Thus, the user can exchange messages with the user corresponding to another avatar 80 existing in the same region as the region where the avatar 80 of the user is present. Further, the user can chat with a user having a specific attribute. Therefore, the user can easily communicate with other users having common interest, interest and/or attributes.

The terminal of the transmission source of the message displayed in the display region 314 is, for example, a terminal used by a user who operates the avatar existing in the virtual venue 310. However, the avatar corresponding to the terminal of the transmission source of the message displayed by the display region 314 may be displayed in the virtual venue 310 or may not be displayed in the virtual venue.

In addition, a commodity that can be purchased may be displayed in the display region 314. The product is, for example, a product related to an operator or an operation organization that operates the virtual venue 310. The display region 314 may display a content related to the commodity and a content prompting purchase of the commodity together with the commodity. Here, the content urging the purchase of the commodity is a display such as "put in a shopping basket" or the like, and is configured to be selectable Further, by performing an operation of advancing a purchase procedure of at least one commodity displayed in the display region 314 by using the terminal 10 by the user, for example, a browser installed in the terminal 10 is started, and a page for requesting input of contents used for purchasing the commodity is displayed on the display unit 140.

Further, as shown in FIG. 16, the display unit 140 may display the display region 314 at a predetermined position regardless of the operation of the first avatar 80A, or may display the display region 314 at a different position in accordance with the operation of the first avatar 80A. In addition, the display unit 140 may display the display region 314 with the same size regardless of the operation of the first avatar 80A, or may display the display region 314 with a different size in accordance with the operation of the first avatar 80A. When a message is transmitted from the first terminal 11 corresponding to the first avatar 80A, the display unit 140 may display the message around the first avatar 80A. When the message is transmitted from the terminal 10 corresponding to the avatar 80 other than the first avatar 80A, when the display unit 140 displays the avatar 80, the display unit 140 may display the message around the avatar 80. When the display unit 140 displays the message around the first avatar 80A, for example, a balloon may be displayed, and the message may be displayed in the balloon.

For example, as shown in FIG. 16, when the point 321 is tapped or double-tapped, the display unit 140 displays a line segment 322 connecting the first avatar 80A and the point 321, and the first avatar 80A walks to the point 321 along the line segment 322. Note that the point 321 and the line segment 322 may be any color. The touch operation for walking the first avatar 80A is an operation of tapping or double-tapping an arbitrary point on the virtual straight line in the traveling direction after changing the traveling direction by performing an operation of flicking any region of the first avatar 80A.

For example, as shown in FIG. 16, the display unit 140 may display the icon 323. The icon 323 is used for switching display and non-display of the display region 314 by being operated. When the display unit 140 displays the display region 314 by operating the icon 323, the display unit 140 may not display the icon 323 or may continue to display the icon 323.

Figure 22:
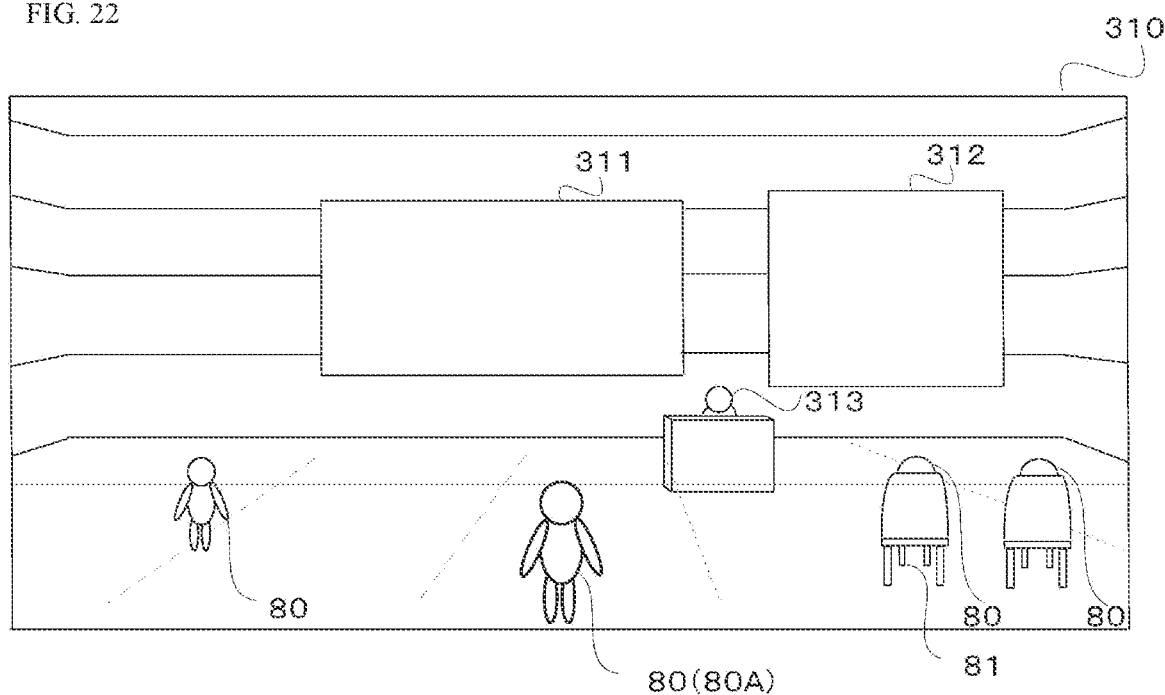
FIG. 22 shows an example of a display shown on the display 140 of the terminal 10.

FIG. 22 is a diagram illustrating an example of a display screen in the virtual venue 310 displayed on the display unit 140 of the terminal 10. In FIG. 22, the first user operating the first terminal 11 operates the first avatar 80A, and the first avatar 80A shown in FIG. 16 is located inside the virtual venue 310, so that the scene is switched, thereby switching the display screen. The URL when the first avatar 80A is displayed outside the virtual venue 310 (for example, the display screen in the case where the first avatar 80A exists in FIG. 16) is different from the URL when the first avatar 80A is displayed inside the virtual venue 310 (for example, the display screen in the case where the first avatar 80A exists in FIG. 22) using the web browser of the first terminal 11. Therefore, when the web browser of the first terminal 11 is used, when the first avatar 80A shown in FIG. 16 is located inside the virtual venue 310, the URL is changed As shown in FIG. 22, the avatar 80, the first avatar 80A, the chair 81, the display region 311, the display region 312, the avatar 313, and the slider 330 are shown. Note that the slider 330 is not an essential configuration. Here, the virtual venue 310 is, for example, a booth such as an exhibition or an event site. At least one chair 81 is provided. The avatar 80 and the first avatar 80A are located in the first region in the virtual venue 310.

The chair 81 is, for example, a virtual object on which the avatar 80 can be seated. For example, when the first user operates the first avatar 80A and approaches the specific chair out of the plurality of chairs 81 to perform a predetermined operation, the avatar 80 is seated on the chair 81. For example, when the first user operates the first avatar 80A and approaches the specific chair out of the plurality of chairs 81 to perform a predetermined operation, a message asking whether to sit on a specific chair is displayed on the display screen of the first terminal 11. When a message for asking whether to sit on a specific chair is displayed on the display screen of the first terminal 11, the avatar 80 is seated on the chair 81 when the user operates the terminal 10 and performs a predetermined operation indicating an intention to sit on the specific chair with respect to the message. Note that a configuration may be adopted in which the avatar 80 is seated in a case where a specific place in the virtual space 300 is designated, together with a virtual object that can be seated, or in place of a virtual object that can be seated. In this case, a message for asking whether or not to sit in the specific place may be displayed on the display screen of the first terminal 11 by approaching the specific place in the virtual space 300 and performing a predetermined operation. When a message for asking whether or not to sit on the specific place is displayed on the display screen of the first terminal 11, when the user operates the terminal 10 and performs a predetermined operation indicating an intention to sit on the specific place with respect to the message, the avatar 80 may be configured to sit on the specific place.

In the display region 311, for example, a material for performing various descriptions is displayed and/or a moving image is displayed. A name of a group operating the virtual venue 310, a theme of an explanation meeting, and the like are displayed in the display venue 312. The avatar 313 is, for example, an avatar imitating a staff who advances the virtual venue 310. The avatar 313 may be an avatar operated by a user or an avatar determined in advance for an operation in the virtual space 300. When the avatar 80 is determined in advance for the operation in the virtual space 300, the avatar means that the avatar 80 operates as the NPC described above.

When a predetermined time is reached in the virtual venue 310, for example, a predetermined description is started. Here, the time used in the virtual space may be the time to be synchronized so as to be the same as the actual time or may be the time used in the virtual space 300 separately from the actual time. The condition for starting the predetermined description in the virtual venue 310 may not be the condition related to the time. For example, the condition in which the predetermined description is started in the virtual venue 310 may be, for example, a case where the avatar existing in the virtual venue 310 reaches a predetermined number or more, or a case where the specific avatar is located in the virtual venue 310.

It should be noted that the plurality of avatars may be configured to be able to be seated in an overlapping manner on one seat at the same time. For example, in a state in which the avatar 80 is seated on the left chair 81 of FIG. 22, the user may operate the first avatar 80A using the terminal 10 to allow the first avatar 80A to be seated on the left chair 81 of FIG. 22. In this way, for example, even when the total number of avatars located in the virtual venue 310 exceeds the total number of chairs 81, all the avatars viewing the content displayed in the display region 311 can be seated in the virtual venue 310.

FIG. 8 is a diagram illustrating a display example displayed on the display unit 140 of the terminal 10. FIG. 8 shows a live venue 410. The live venue 410 is an example of a venue provided in the virtual space 300. As shown in FIG. 8, a plurality of chairs 81 are provided inside the live venue 410. The chair 81 is, for example, a virtual object on which the avatar 80 can be seated. For example, when the first user operates the first avatar 80A and approaches the specific chair out of the plurality of chairs 81 to perform a predetermined operation, the avatar 80 is seated on the chair 81. For example, when the first user operates the first avatar 80A and approaches the specific chair out of the plurality of chairs 81 to perform a predetermined operation, a message asking whether to sit on a specific chair is displayed on the display screen of the first terminal 11. When a message for asking whether to sit on a specific chair is displayed on the display screen of the first terminal 11, the avatar 80 is seated on the chair 81 when the user uses the terminal 10 to perform a predetermined operation indicating an intention to sit on the specific chair with respect to the message.

When the predetermined time is reached, the moving image is reproduced in the display region 411. Here, the time used in the virtual space may be the time to be synchronized so as to be the same as the actual time or may be the time used in the virtual space 300 separately from the actual time. Note that the condition that the moving image is reproduced in the display region 411 may not be the condition related to the time. For example, the condition in which the moving image is reproduced in the display region 411 may be, for example, a case where the avatar existing in the live venue 410 reaches a predetermined number or more, or a case where the specific avatar is located in the live venue 410.

It should be noted that the plurality of avatars may be configured to be able to be seated in an overlapping manner on one seat at the same time. For example, in a state in which the avatar 80 is seated on the left end chair 81 of FIG. 8, the user may operate the first avatar 80A using the terminal 10 to allow the first avatar 80A to be seated on the left end chair 81 of FIG. 8. In this way, for example, even when the total number of avatars located in the live venue 410 exceeds the total number of chairs 81, all the avatars viewing the content displayed in the display region 411 can be seated in the live venue 410.

In FIG. 8, the first avatar 80A is not shown in the live venue 410, but the present invention is not limited thereto. The first avatar 80A may be displayed on the display unit 140 in the live venue 410, and the first avatar 80A may be operated in the display unit 140 in accordance with the operation of the first terminal 11 used by the first user.

The predetermined description to be started at a predetermined time is performed by displaying a predetermined content in the display region 311 of FIG. 22 or the display region 411 of FIG. 8, and/or outputting a voice. The description is, for example, a moving image. The moving image is, for example, any of a predetermined explanation moving image, an event moving image such as a concert, a moving image such as a movie, and a moving image reflecting the motion and/or performance of the real-time Vtuber. When the description is a moving image, the terminal 10 requests the second server system 22 to request data relating to the moving image Then, the second server system 22 transmits the data relating to the moving image to the terminal 10 in response to the request. Thus, the terminal 10 can receive the data relating to the moving image from the second server system 22 and view the moving image.

Figure 23:
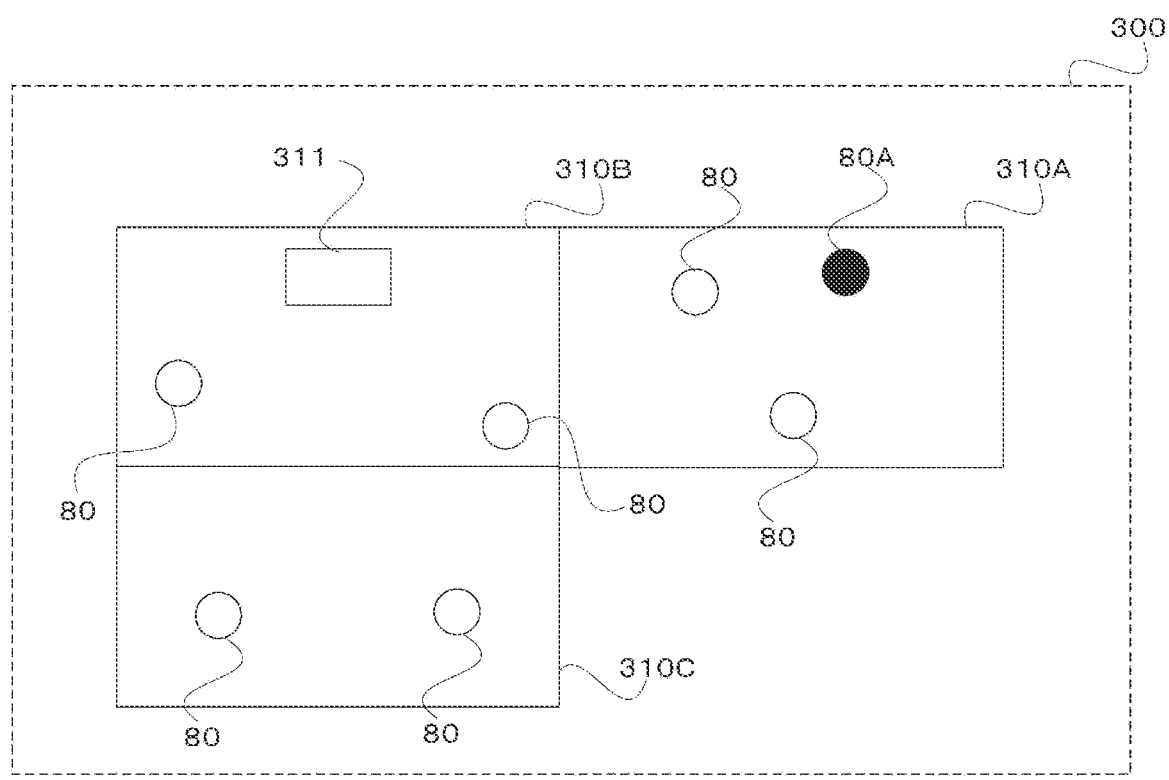
FIG. 23 is a plan view showing an example of a layout in a virtual space 300.
Figure 24:
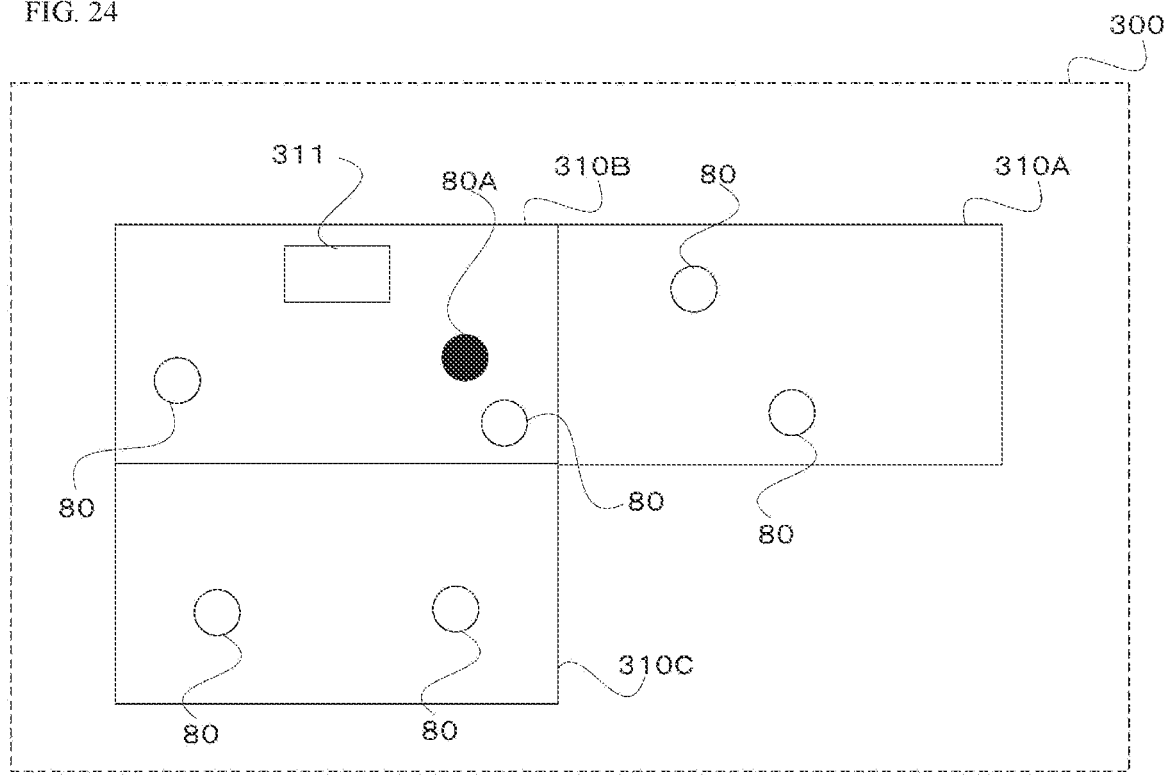
FIG. 24 is a plan view showing an example of a layout in the virtual space 300.
Figure 25:
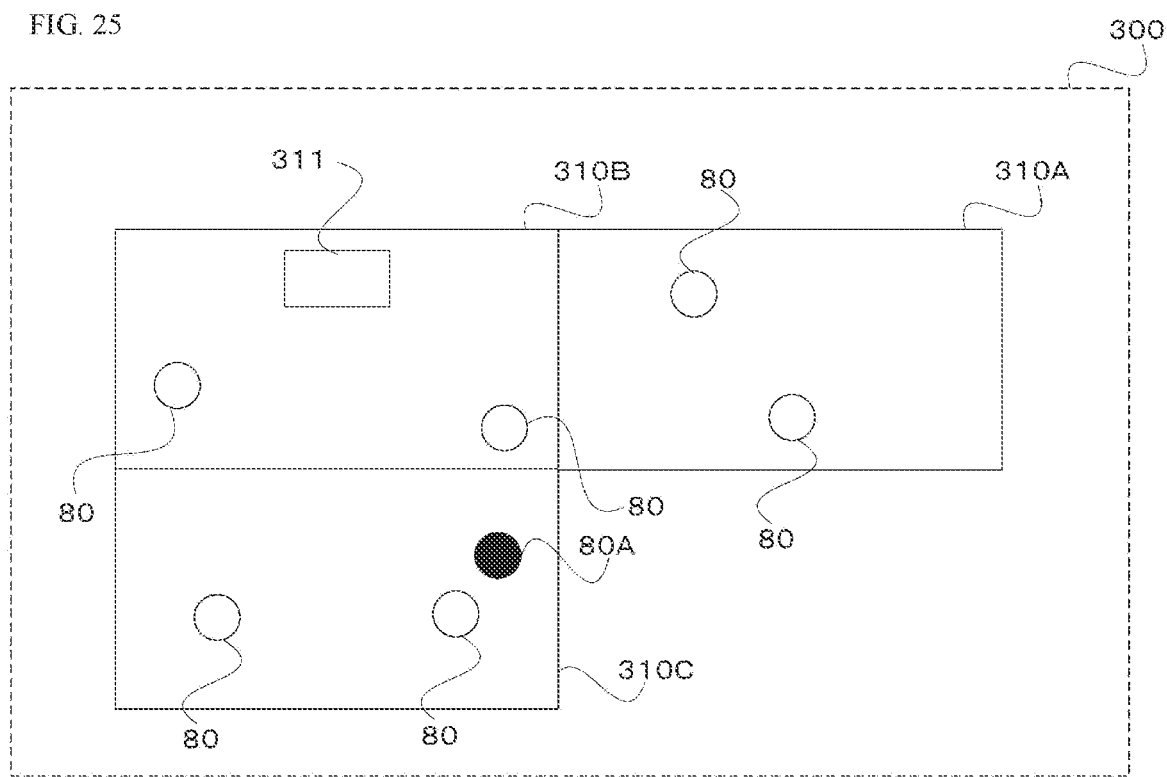
FIG. 25 is a plan view showing an example of a layout in the virtual space 300.

As shown in FIGS. 23 to 25, for example, the first waiting room 310A, the virtual venue 310B, and the second waiting room 310C are provided in the virtual space 300. Here, the first waiting room 310A is, for example, located on the entrance side of the virtual venue 3108. The second waiting room 310C is, for example, located on the outlet side of the virtual venue 310C. The first waiting room 310A, the virtual venue 3106, and the second waiting room 310C are not limited to a space as will be described later, and may be any space in the virtual space 300.

The first user can move the first avatar 80A from the first waiting room 310A to the virtual venue 3108 by operating the first avatar 80A. The first user can move the first avatar 80A from the virtual venue 3108 to the second waiting room 310C by operating the first avatar 80A.

FIG. 23 is a plan view showing an example of a layout in the virtual space 300. As shown in FIG. 23, the first avatar 80A and the avatar 80 corresponding to each of the two different users are located in the first waiting room 310A. When the first avatar 80A exists in the first waiting room 310A, the display unit 140 of the first terminal 11 displays a display region 314 that allows a first user operating the first avatar 80A to chat with a user operating another avatar 80 present in the first waiting room 310A. In this way, the first user who operates the first avatar 80A can chat with another user who enters the virtual venue 3108 and is scheduled to view the content displayed in the display region 311. The first user who operates the first avatar 80A does not receive a message transmitted from the terminal 10 of the user who operates the avatar 80 existing in the virtual venue 310B. Therefore, the first user who operates the first avatar 80A does not receive the message from the first terminal 11 of the first user who operates the first avatar 80A even if the terminal 10 of the user operating the avatar 80 existing in the virtual venue 310B transmits a message related to the content displayed in the display region 311. As described above, the first user who operates the first avatar 80A can reduce the possibility that the first user who operates the first avatar 80A enters the virtual venue 310B and does not intend to grasp the content of the content before viewing the content displayed in the display region 311.

As shown in FIG. 23, when the first avatar 80A is present in the first waiting room 310A, the condition (first condition) in which the first terminal 11 displays the display region 314 may be only that the first avatar 80A is present in the first waiting room 310A, or other conditions may be included in addition to the first avatar 80A being present in the first waiting room 310A. For example, the first condition may be that the first avatar 80A is present in the first waiting room 310A and a predetermined operation is performed to the virtual object in the first waiting room 310A at present or in the past. The predetermined operation of the virtual object in the first waiting room 310A includes, for example, an operation of purchasing food and drink that can be purchased in the first waiting room 310A.

As shown in FIG. 23, when the first avatar 80A is present in the first waiting room 310A, when the first avatar 80A moves toward the virtual venue 310B, as shown in FIG. 24, the first avatar 80A is located in the virtual venue 310B. A condition (second condition) for allowing the first avatar 80A to enter the virtual venue 310B from the first waiting room 310A may be provided. The second condition is, for example, a virtual object that can be purchased in the virtual space 300 by the first avatar 80A. The virtual object that can be purchased in the virtual space 300 is, for example, an admission ticket for entering the virtual venue 310B.

FIG. 24 is a plan view showing an example of a layout in the virtual space 300. As shown in FIG. 24, in the virtual venue 310B, the first avatar 80A and the avatar 80 corresponding to each of the two different users are located, and the display region 311 is provided. When the first avatar 80A exists in the virtual venue 310B, the display unit 140 of the first terminal 11 displays a display region 314 capable of chat with a user operating another avatar 80 present in the virtual venue by a first user operating the first avatar 80A. Therefore, it is possible to chat with another user viewing the content displayed in the display region 311.

As shown in FIG. 24, when the first avatar 80A is present in the virtual venue 310B, the condition for the first terminal 11 to display the display region 314 (first condition) is that the first avatar 80A may only be present in the virtual venue 310B, or may include other conditions in addition to the fact that the first avatar 80A is present in the virtual venue 310B. For example, the first condition may be that the first avatar 80A is present in the virtual venue 310B and a predetermined operation is performed to the virtual object in the virtual venue 310B at present or in the past. Performing a predetermined operation on the virtual object in the virtual venue 310B includes, for example, an operation of selecting the display region 311. Further, performing a predetermined operation on the virtual object in the virtual venue 310B is, for example, at least one of the fact that the first avatar 80A is seated on a virtual object on which the first avatar 80A can be seated, and the selection of the display region 311. Further, by performing a predetermined operation on the virtual object in the virtual venue 310B, for example, the display region 311 may be selected to experience a predetermined item. Here, "experiencing a predetermined item" is, for example, allowing a user such as viewing a content displayed in the display region 311, making a trial of the game, answering to the quiz, and actively or passively experienced by a user such as purchasing or receiving something. The target to be purchased or received is, for example, an admission ticket for entering a predetermined region (for example, a virtual venue 310B).

As shown in FIG. 24, when the first avatar 80A is present in the virtual venue 310B, when the first avatar 80A moves toward the second waiting chamber 310C, as shown in FIG. 25, the first avatar 80A is located in the second waiting chamber 310C. A condition (second condition) for the first avatar 80A to move from the virtual venue 310B to the second waiting chamber 310C may be provided. The second condition is, for example, that a content (for example, a moving image) displayed in the display region 311 in a state in which the first avatar 80A is present in the virtual venue 310B is played back for a predetermined time or longer. The second condition is, for example, when the first avatar 80A is seated on a virtual object on which the first avatar 80A can be seated, and then leaves the virtual object.

FIG. 25 is a plan view showing an example of a layout in the virtual space 300. As shown in FIG. 25, the first avatar 80A and the avatar 80 corresponding to each of the two different users are located in the second waiting room 310C. When the first avatar 80A exists in the second waiting room 310C, the display unit 140 of the first terminal 11 displays a display region 314 capable of chat with a user operating another avatar 80 present in the second waiting room 310C by a first user operating the first avatar 80A. In this way, the first user who operates the first avatar 80A can perform a chat between users who have finished viewing the content displayed in the display region 311 in the virtual venue 310B.

As shown in FIG. 25, when the first avatar 80A is present in the second waiting chamber 310C, the condition for the first terminal 11 to display the display region 314 (first condition) is that the first avatar 80A may only be present in the second waiting room 310C, or may include other conditions in addition to the first avatar 80A being present in the second waiting room 310C. For example, the first condition may be that the first avatar 80A is present in the second waiting room 310C and predetermined operation is performed to the virtual object in the second waiting room 310C at present or in the past.

Here, the virtual venue 310B corresponds to, for example, the virtual venue 310 of FIG. 22. The virtual venue 310B corresponds to, for example, the live venue 410 shown in FIG. 8. When the virtual venue 310B corresponds to the live venue in FIG. 8, the display region 311 in FIGS. 23 to 25 corresponds to the display region 411.

Further, an example in which the first waiting chamber 310A, the virtual venue 310B, and the second waiting chamber 310C are provided in the virtual space 300 has been described, but the present invention is not limited thereto. For example, the number of waiting rooms may be, for example, three or more. The waiting room may be provided only on one of the inlet side and the outlet side of the virtual venue 310B.

As described above, the user who can chat with the first user differs according to the experience state of the first user. Specifically, the user who can chat with the first user before the first user operates the first avatar 80A and the user who can chat with the first user while the first user operates the first avatar 80A and the user who can chat with the first user while the first user experiences the predetermined item by operating the first avatar 80A and the user who can chat with the first user after experiencing the predetermined item by operating the first avatar 80A are different from each other, for example. As described above, since the user who can chat with the first user differs according to the experience state of the first user, the first user can easily share bodily sensation and/or experience through the chat with another user who is in the same or similar situation as the situation of the first user. Further, it is possible for the first user to reduce the possibility of grasping the content related to the predetermined item (for example, the conclusion) before experiencing the predetermined item. When the position of the first avatar 80A before the first user experiences the predetermined item by operating the first avatar 80A and the position of the first avatar 80A while the first user has experienced the predetermined item by operating the first avatar 80A and the position of the first avatar 80A after the first user has experienced the predetermined item by operating the first avatar 80A are different, the experience state of the first user can be determined, for example, based on the position data of the avatar 80A of the first user. In this way, the terminal 10 of the first user displays, for example, a chat screen corresponding to the experience state on the basis of the experience state of the first avatar 80A of the first user. In this regard, assuming that three different experiences (first to third users) and three different users (first users to third users) are assumed, the first user who has experienced the experience 1, the second user who has experience 2, and the third user who has experienced the experience 3 participate in different chat. When the experience state of the first user is determined based on the position data of the first avatar 80A of the first user, the terminal 10 of the first user may display a chat screen corresponding to the position data, for example, based on the position data of the first avatar 80A of the first user. In this regard, assuming the three different sites (first user to third user) and three different users (first users to third users), a first user corresponding to the avatar 80 located in the venue A and a second user corresponding to the avatar 80 located in the venue B and the third user corresponding to the avatar 80 located in the venue C participates in a different chat, respectively.

In the above description, the terminal 10 of the first user has described, for example, an example in which the chat screen corresponding to the experience state is displayed based on the experience state of the first avatar 80A of the first user, but the present invention is not limited thereto. For example, the terminal 10 of the first user may display a chat screen corresponding to the action history on the basis of the action history of the avatar of the first user. The action history of the first avatar 80A of the first user is, for example, a history indicating that the first avatar 80A is located in the specific region in the past. Here, the "specific region" is at least one region in the virtual space 300. The "specific region" may be, for example, at least one of the first waiting room 310A, the virtual venue 310B, and the second waiting room 310C. When the chat screen corresponding to the action history is displayed, the chat screen may be displayed only on the terminal 10 of the user corresponding to the avatar having the same action history.

Here, when the "specific region" is the first waiting room 310A, and the first avatar 80A of the first user and the avatar of the other user exist in the past in the first waiting room 310A, the first user and the other user can communicate via the same chat screen without depending on the current position of the first avatar 80A of the first user and the current position of the avatar of the other user. Note that the chat screen is displayed only on the terminal 10 of the user corresponding to the avatar having a history located in the past in the first waiting room 310A.

In addition, when the "specific region" is the first waiting room 310A and the virtual venue 310B, and the first avatar 80A of the first user and the avatar of the other user exist in the past in the first waiting room 310A and the virtual venue 310B, the first user and the other user can communicate via the same chat screen without depending on the current position of the first avatar 80A of the first user and the current position of the avatar of the other user. Note that the chat screen is displayed only on the terminal 10 of the user corresponding to the avatar having a history located in the past in the first waiting room 310A and the virtual venue 310B.

When the "specific region" is the first waiting room 310A, the virtual venue 310B, and the second waiting room 310C, and the first avatar 80A of the first user and the avatar of the other user exist in the past in the first waiting room 310A, the virtual venue 310B, and the second waiting room 310C, the first user and the other user can communicate via the same chat screen without depending on the current position of the first avatar 80A of the first user and the current position of the avatar of the other user The chat screen is displayed only on the terminal 10 of the user corresponding to the avatar having a history of being located in the past in the first waiting chamber 310A, the virtual venue 310B, and the second waiting chamber 310C.

In this way, the first user can easily share bodily sensation and/or experience through a chat with another user who is in the same or similar situation as the situation of the first user in the past. In addition, for example, it is possible to make a meaning as a privilege such as a chat with a host on an operation side associated with a "specific region". When there is an experience corresponding to each of the first waiting room 310A, the virtual venue 310B, and the second waiting room 310C, for example, the chat screen is displayed only on the terminal 10 of the user having the same experience history. Specifically, for example, when there is an experience corresponding to each of the first waiting room 310A, the virtual venue 310B, and the second waiting room 310C, the chat screen is displayed only on the terminal 10 of the user who has experienced all experience corresponding to each of the first waiting room 310A, the virtual venue 310B, and the second waiting room 310C. Thus, it is possible to cause the chat to function as a special privilege such that chat can be performed with the sponsor side or the operation side (including mascot, idle, or the like) only by the user who has visited the plurality of regions (positions) by the stamp rally, and the movement of the region by the user can be promoted.

Further, a condition for ending the display of the chat screen used to communicate with each other may be provided. For example, when the users perform communication through the chat screen, if at least one of the following (1) to (4) is satisfied, the chat screen may be terminated.
(1) When the avatar is located outside the predetermined region, the avatar is located outside the predetermined region
(2) A case where a predetermined experience is terminated
(3) A case where a predetermined time has elapsed
(4) A predetermined speech behavior is performed Here, "(1)" when the avatar is located outside the predetermined region" is, for example, a case where the first avatar 80A is located in a region other than the first waiting chamber 310A from the first waiting room 310A. For example, when the first user corresponding to the first avatar 80A located in the first waiting room 310A communicates with the user corresponding to the other avatar 80 located in the first waiting room 310A through the chat screen, and the first avatar 80A located in the first waiting room 310A moves from the first waiting room 310A to the virtual venue 3106, the terminal 10 of the first user ends the display of the chat screen. In this case, the user corresponding to the first avatar 80A cannot perform the chat with the user corresponding to the other avatar 80 located in the first waiting room 310A. The regions other than the first waiting room 310A are not limited to the virtual venue 3108. The region other than the first waiting venue 310 a may be, for example, a region (a region on the inlet side of the first waiting room 310A) adjacent to the first waiting room 310A.).

In addition, when "(1) the avatar is located outside the predetermined region", for example, the first avatar 80A is located in a region other than the virtual venue 3108 from the virtual venue 3108. For example, when the user corresponding to the first avatar 80A located in the virtual venue 3108 communicates with the user corresponding to the other avatar 80 located in the virtual venue 3108 through the chat screen, and the first avatar 80A located in the virtual venue 3108 moves from the virtual venue 3108 to the second waiting room 310C, the terminal 10 of the first user ends the display of the chat screen. In this case, the first user corresponding to the first avatar 80A cannot perform the chat with the user corresponding to the other avatar 80 located in the virtual venue 3108. The region other than the first waiting chamber 310A is not limited to the second waiting chamber 310C. The regions other than the virtual venue 3108 may be, for example, the first waiting room 310A.

In addition, when "(1) the avatar is located outside the predetermined region", for example, the first avatar 80A is located in a region other than the second waiting room 310C from the second waiting room 310C. For example, the first user corresponding to the first avatar 80A located in the second waiting room 310C communicates with the user corresponding to the other avatar 80 located in the second waiting room 310C through the chat screen, and the first avatar 80A located in the second waiting room 310C is the second avatar 80A located in the second waiting room 310c When it is moved from the second waiting room 310C to another region (region on the outlet side of the second waiting room 310C) adjacent to the second waiting room 310C, the terminal 10 of the first user ends the display of the chat screen. In this case, the user corresponding to the first avatar 80A cannot perform the chat with the user corresponding to the other avatar 80 located in the second waiting room 310C. The region other than the second waiting room 310C is not limited to the region on the outlet side of the second waiting room 310C. The region other than the second waiting room 310C may be, for example, a virtual venue 3108.

In addition, "(2)" when the predetermined experience ends, includes, for example, finishing the viewing of the content displayed in the display region 311. The content is, for example, a movie. In addition, the predetermined time may be an arbitrary period with respect to the "(3) elapse of a predetermined time" described above. In the above-described "(3) elapse of predetermined time", the timing at which the counting of the predetermined time is started is, for example, the timing at which the terminal 10 used by the first user starts displaying the chat screen. In the case where the sentence input via the terminal 10 by the first user is negative, "(4) the predetermined speech behavior" indicates that the sentence is displayed on the chat screen. Note that the above-described "negative content" is, for example, a character that scratches a predetermined object. (4) The "predetermined speech behavior" may be directed to a specific user who participates in the chat screen or may be directed to other than a specific user who participates in the chat screen or may be directed to the content displayed in the display region 311. In this manner, by terminating the display of the chat screen in the case of "(4) performing the predetermined speech behavior", it is possible to reduce the possibility that a user other than the user who participates in the chat screen gives an unpleasant feeling to the user.

4. Operation of System 1000

The operation of the system 1000 is described with reference to FIGS. 26 and 27. The flowchart shows an example of the operation performed using the system 1000 shown in FIG. 1.

First, referring to FIG. 26, S111 through S193 will be described in turn.

In S111, the first user operates the first terminal 11 to start the application. Thereafter, in S121, the first terminal 11 acquires the first data.

Here, the first data includes, for example, data related to the first avatar 80A in the virtual space operated using the first terminal 11 of the first user. Further, the first data may include data relating to the position of the first avatar 80A of the first user, for example, in the operation data and the operation history data of the user. The first data may include, for example, data related to an action history in a virtual space of an avatar in a virtual space operated by using the first terminal 11 of the first user.

In S131, the first terminal 11 performs the first determination process. Here, the first determination process is a process of determining whether or not the first data satisfies a predetermined condition (first condition). In S131, when the first terminal 11 determines that the first condition is satisfied, the control data for controlling the display unit 140 of the first terminal 11 is determined, and the processing in step S141 is executed. On the other hand, when it is determined in S131 that the first terminal 11 does not satisfy the first condition, the process of S131 is repeated.

The first condition in S131 is, for example, that the first avatar 80A is located within a predetermined position or a predetermined region in the virtual space 300. Here, the "predetermined region" refers to, for example, a predetermined distance with the display region 311 as a reference. Note that the first condition in S131 may be a condition related to the processing state (experience situation) of the user. Specifically, for example, the first condition in S131 may be a condition including at least one of the fact that the first condition in S131 is, for example, before a predetermined process is performed (before a predetermined experience is performed) and that the predetermined process is being performed (the predetermined experience is being performed) and that the predetermined process has been performed (after a predetermined experience has been performed). In a case where the first condition in S131 is a condition related to the processing state (experience situation) of the user, the first determination processing may perform determination according to the processing state (experience situation) of the user.

In S131, when the first condition described above is satisfied, the first terminal 11 transmits, for example, data related to the position data of the first avatar 80A to the server device 20. In response to this, the server device 20 transmits, to the first terminal 11, data relating to a display region 314 for displaying a message transmitted from the terminal 10 of another user on the basis of the data relating to the position data of the first avatar 80A.

In S141, the first terminal 11 performs the first display control process. Here, the first display control process refers to, for example, a process of displaying the display region 314 by the display unit 140 of the first terminal 11.

After S141, the first terminal 11 transmits the first data to the server device 20. Before S141, the first terminal 11 may transmit the first data to the server device 20.

At S183, server device 20 determines the analysis data based on the first data. The server device 20 then transmits the determined analysis data to the device 70. For example, the server device 20 determines the analysis data each time it receives the first data, and transmits the determined analysis data to the device 70.

In S193, the server device 20 determines the advertisement data based on the first data. Note that the advertisement data includes data to be determined on the basis of the first data and for a first user who operates the first terminal 11. In S193, the server device 20 transmits the determined advertisement data for the first user to the first terminal 11.

Next, S111-S193 are explained in turn with reference to FIG. 27.

In S111, the first user starts the application by operating the first terminal 11. Then, in S121, the first terminal 11 acquires the first data.

Here, the first data includes, for example, data related to the first avatar 80A in the virtual space operated using the first terminal 11 of the first user. Further, the first data may include data relating to the position of the first avatar 80A of the first user, for example, in the operation data and the operation history data of the user. The first data may include, for example, data related to an action history in a virtual space of an avatar in a virtual space operated by using the first terminal 11 of the first user.

After S121, the first terminal 11 transmits the first data to the server device 20.

In S133, the server device 20 performs the first determination process. Here, the first determination process is a process of determining whether or not the first data satisfies a predetermined condition (first condition). In S133, when it is determined that the first condition is satisfied, the server device 20 determines control data for controlling the display unit 140 of the first terminal 11, transmits the control data to the first terminal 11, and executes the processing in step S141. On the other hand, when it is determined in S131 that the first data does not satisfy the first condition, the process of S131 is repeated.

The first condition in S133 is, for example, to be located at a predetermined position or within a predetermined region in the virtual space 300. Here, "predetermined region" means, for example, within a predetermined distance based on the display region 311.

In S141, the first terminal 11 performs display control processing. Here, the first display control processing refers, for example, to the process by which the display unit 140 of the first terminal 11 displays the display region 314 is displayed.

In S183, the server device 20 determines the analysis data based on the first data. The server device 20 then transmits the determined analysis data to the device 70. For example, the server device 20 determines the analysis data each time it receives the first data and transmits the determined analysis data to the device 70.

At S193, the server device 20 determines the advertisement data based on the first data. The advertising data includes data determined based on the first data and directed to the first user operating the first terminal 11. In S193, the server device 20 transmits the determined advertisement data for the first user to the first terminal 11.

Also, with respect to S193 of FIGS. 26 and S193 of FIG. 27, when there is a history in which the avatar 80 enters a virtual venue 310 for performing an event held by a predetermined operation organization and a history of viewing a moving image reproduced in the virtual venue 310 is present, the advertisement data transmitted to the first terminal 11 may include, for example, data related to a guide related to an event that a predetermined operation organization holds in the future. The data includes at least one of text data, image data, and moving image data.

In S193 of FIGS. 26 and S193 of FIG. 27, the above-described advertisement data may be, for example, data including a URL for accessing a database that stores data related to an advertisement determined on the basis of the first data. The above-described advertisement data may be already downloaded into an application (application) by batch processing or the like, for example. In this case, the server device 20 may transmit data related to the ID corresponding to the data to be transmitted to the first terminal 11, and the first terminal 11 may display the advertisement data based on the ID.

In the process of FIG. 26 and/or FIG. 27, the first terminal 11 may receive the second data including at least one of the position of at least one of the avatars 80 other than the first avatar 80A and the total number of the avatars 80 other than the first avatar 80A. For example, the first terminal 11 receives the second data from the server device 20. The first terminal 11 may determine whether or not the third condition is satisfied, determine second control data for controlling the display unit 140 of the first terminal 11 based on the second data when it is determined that the third condition is satisfied, and control the display unit 140 based on the second control data. The third condition is a case where the total number of the avatars 80 other than the first avatar 80A is equal to or greater than the first value, or when the total number of the avatars 80 other than the first avatar 80A is equal to or less than the second value. Here, the first value is larger than the second value. Specifically, for example, when the total number of the avatars 80 other than the first avatar 80A is equal to or greater than the first value, the display unit 140 of the first terminal 11 displays a smaller number of avatars 80 than the total number of avatars 80 other than the first avatar 80A currently displayed. Specifically, for example, when the total number of avatars 80 other than the first avatar 80A is equal to or less than the second value, the display unit 140 of the first terminal 11, for example, satisfies the third condition The number of avatars 80 larger than the total number of avatars 80 other than the first avatar 80A currently displayed is displayed.

FIG. 11 shows an example of data transmitted from the terminal 10. In FIG. 11, when each of the first user, the second user, and the third user performs an avatar operation using the own terminal 10, the server device 20 is described with respect to various data received from each terminal 10. The various types of data include, for example, "age", "gender", "current position", "virtual object", "chat history", "content viewing history", "part ID", and "simple avatar". Here, the "part ID" is, for example, data for specifying an avatar. The "simple avatar" is, for example, data related to an ID of a pattern corresponding to sex including men and women.

The first data described above may include, for example, at least any of the contents regarding the first user in FIG. 11.

With respect to the "age" described above, FIG. 11 shows an example where the age of the first user is 21 years, the age of the second user is 31 years old, and the age of the third user is 41 years old.

Also, regarding the "Gender" above, FIG. 11 shows examples where the gender of the first user's avatar is male, the gender of the second user's avatar is female, the gender of the third user's avatar is male, and the gender of the first user's avatar is female. The example where the gender of the avatar of the 3rd user is male is shown in FIG. 11.

Also, with respect to the "current position" described above, FIG. 11 shows that the avatar operated by the first user is at position A01 and the avatar operated by the second user is at position B01 and the avatar operated by the third user is at position C01.

In addition, regarding the "virtual object" described above, an example in which the avatar operated by the first user purchases the virtual object A12 at the price A13 at time A11, the avatar operated by the second user opens the virtual object B12 at time B11, and the avatar operated by the third user acquires the virtual object C12 at time C11. The virtual object B22 is, for example, a door.

In the above-described "chat history", in FIG. 11, the terminal of the first user transmits message "hello" to the terminal of the third user at the position A22 at time A21, the second user does not have a chat history with any other user, and the terminal of the third user receives message "hello" from the terminal of the first user at the time C21 at the position C22.

In the above-described "content viewing history", in FIG. 11, the avatar of the first user stands at the position A32 at time a 31 to start viewing the content, and the avatar of the second user views the content in the seat B33 at time B31 at the position B32 for two hours, and the avatar of the third user views the content at the time C31 at the position C32 and leaves the seat C33.

Although an example of the age of the user has been described with respect to the "age" described above, the present invention is not limited thereto. For example, the "age" described above may indicate an age group to which the user belongs. For example, when the age of 21 years or more and 30 years or less is defined as the category 1, the age of the first user may indicate that the age belongs to the category 1. For example, when 31 years or more and 40 or less are defined as categories 2, the age of the second user may indicate that the second user belongs to the category 2. For example, when the age of 41 years or more and 50 years or less is defined as the category 3, the age of the third user may indicate that the age belongs to the category 3. In this way, for example, when the analysis data is determined in S183 of FIG. 26 or S183 of FIG. 27 and the analysis data is transmitted to the device 70, data related to the age can be used for marketing or the like without transmitting the specific personal information of the user to the device 70.

Further, regarding the "current position" described above, an example indicating the position of the avatar at the specific time has been described, but the present invention is not limited thereto. For example, the avatar may include data indicating a trajectory in which the avatar has moved within the virtual space 300 within a predetermined period.

Although an example in which the first user transmits message "hello" to the terminal of the third user at the position A22 at the time A21 has been described with respect to the "chat history" described above, the content of the message is not limited thereto. The data transmitted from the terminal of one user to the terminal of another user may include at least one of a text, a pictogram, a voice message, an image, and a moving image.

The first data shown in FIG. 11 is not limited to the example described above, and may include data related to the "action history". The data related to the "action history" includes, for example, a time at which the avatar 80 enters the virtual venue 310, a time when the avatar 80 enters the live venue 410, a time when the avatar 80 leaves the virtual venue 310, a time when the avatar 80 leaves the live venue 410, a time when the avatar 80 stays in the virtual venue 310, a time when the avatar 80 stays in the live venue 410, the time when the avatar 80 starts viewing the object displayed in the display region 311 in the virtual venue 310, the time when the avatar 80 starts viewing the moving image in the live venue 410, the time (period) when the avatar 80 views the moving image in the display region 311 in the virtual venue 310, the time (period) when the avatar 80 views the moving image in the live venue 410, the time when the avatar 80 finishes viewing the moving image in the live venue 410, the time when the avatar 80 is seated on the chair 81, and the time when the avatar 80 leaves the chair 81, at least one of the history of the position data of the chair 81, the history of the received data including the message received from the terminal 10 operated by the user operating the one terminal 10, the history of the reception data including the message received from the terminal 10 operated by the user operating the one terminal 10, and the history related to the transmission data including the message transmitted to the terminal 10 operated by the user operating the other terminal 10 by the user operating the one terminal 10 may be included.

In addition, the server device 20 may select whether to transmit data related to any of the contents described in FIG. 11 to the device 70. For example, in a case where the data transmitted to the device 70 includes the content related to the chat history described in FIG. 11, the server device 20 may transmit data excluding the content related to the chat history among the contents described in FIG. 11 to the device 70.

Further, the server device 20 may transmit data obtained by changing at least a part of the content described in FIG. 11 to the device 70. For example, instead of transmitting data indicating that the avatar of the first user is located at the position A01 to the device 70, the server device 20 may transmit data indicating that the avatar of the first user is located in the vicinity of the position A01 to the device 70.

When receiving data including a message from one of the device 70 and the second terminal 12 to the other of the device 70 and the second terminal 12, the data including the message may not be transmitted to the other terminal 10. In this way, the data exchanged between the second terminal 12 and the device 70 is not transmitted other than the terminal 10 other than the second terminal 12. Therefore, when the data transmitted and received between the second terminal 12 and the device 70 include data related to the personal information of the user operating the second terminal 12, it is possible to reduce the possibility that the personal information is known to the user who operates the terminal 10 other than the second terminal 12.

In a case where the display unit 140 displays the display region 314 and the users perform a chat, the user ID and the avatar 80 in the chat may be configured to be associated with each other or may be configured not to be associated with each other.

As described above, according to the present disclosure, first data relating to a first position where a first avatar 80A in a virtual space 300 operated by using a first terminal 11 of a first user is present is acquired, and it is determined whether or not the first position satisfies a first condition that is within the first region. When the first condition is satisfied, data related to a display region 314 for displaying a message transmitted from a terminal of a user operating at least one of the other avatars 80 present in the first region or in the past in the first region is received. The display region 314 is displayed on the display unit 140 of the first terminal 11. Therefore, each of the plurality of users can communicate with the user with high relevance to the user via the display region 314 displayed by the display unit 140 of the terminal 10 owned by the user himself/herself. Therefore, communication between specific users can be promoted as compared with the prior art.

5. Modified Example

Note that, in FIG. 26, an example in which the server device 20 performs the processes of S183 and S193 has been described after S141, but the present invention is not limited thereto. For example, the server device 20 may receive the first data from the first terminal 11 before step S131. Thus, the server device 20 may perform the processing of S183 before step S131 and transmit the analysis data to the device 70. For example, the server device 20 may perform the processing of S193 before step S131 and transmit the advertisement data to the first terminal 11. In this way, the server device 20 can reduce the time between the timing at which the first data is received and the timing at which the analysis data determined on the basis of the received first data is transmitted to the device 70. The processes of the first terminal 11, the server device 20, and the device 70 are not limited to those performed as a series of flows in the same flowchart as shown in FIGS. 26 and 27, and the processes of the first terminal 11, the server device 20, and the device 70 may be performed simultaneously in parallel. The processes in S183 and S193 in FIG. 26 may be performed in parallel with the processes other than S183 and S193 described in FIG. 26. The processes in S183 and S193 in FIG. 27 may be performed in parallel with the processes other than S183 and S193 described in FIG. 27. For example, each time the first user moves the first avatar 80A and displays the target, the processes of S183 and S193 of FIG. 26 or FIG. 27 may not be performed as a series of operations, and each time the first user moves the first avatar 80A, processing of S183 and S193 in FIG. 26 or FIG. 27 may not be performed as a series of operations.

As shown in FIG. 14, other than the terminal 10 shown in FIG. 3, the first sensor 102a, the second sensor 102b, the camera 102c, and the microphone 102d may be provided. FIG. 14 is a block diagram illustrating an example of a configuration connected to the terminal 10 and the terminal 10 shown in FIG. 3. Here, the terminal 10, the first sensor 102a, the second sensor 102b, the camera 102c, and the microphone 102d are connected by wire or wireless, for example.

The first sensor 102a is, for example, wired or wirelessly connected to the camera 102c. The camera 102c may include, for example, an RGB camera that captures an image of a visible light beam, and a near-infrared camera that captures an image of a near-infrared ray. For example, the camera 102c can use, for example, a camera included in a True Depth (True Depth) camera of, for example, an iPhone X (registered trademark). The second sensor 102b is, for example, connected to the microphone 102d in a wired or wireless manner Note that the first sensor 102a and the camera 102c may be provided as one configuration. Further, the second sensor 102b and the microphone 102d may be provided as one configuration.

In this way, the terminal 10 may transmit the image captured by the camera 102c to the server device 20. The first terminal 11 may transmit the voice data input to the microphone 102d to the server device 20. Further, the first terminal 11 may transmit moving image data using the camera 102c and the microphone 102d to the server device 20.

FIG. 15 illustrates a generalized example of embodiments, techniques, and suitable calculation environments 1400 on which techniques are implemented, including rendering video in a calculation environment by transmitting and using tokens. For example, the calculation environment 1400 may be implemented by any of a terminal device, a distribution server system, and the like as described herein.

Since techniques can be implemented in various general-purpose or dedicated calculation environments, the calculation environment 1400 does not intend to suggest any limitation with respect to the range of the use or function of the technology. For example, the techniques disclosed herein may be implemented in various other computer system configurations including various portable devices, various multiprocessor systems, various microprocessor-based or programmable household electrical appliances, various network PCs, various mini-computers, various main frame computers, and the like. The technique disclosed herein may be implemented in a distributed calculation environment in which a task is executed by a remote processing device linked through a communication network. In the distributed calculation environment, the program module may be disposed in both local and remote memory storage devices.

Referring to FIG. 15, the calculation environment 1400 includes at least one central processing device 1410 and a memory 1420. In FIG. 15, the most basic configuration 1430 is included in the broken line. The central processing unit 1410 may execute an instruction executable by a computer, and the central processing unit 1410 may be a real processor or a virtual processor. In the multi-processing system, since the plurality of processing units execute instructions executable by the computer to improve the processing force, the plurality of processors can operate at the same time. The memory 1420 may be a volatile memory (for example, a register, a cache, a RAM), a nonvolatile memory (e.g., a ROM, an EEPROM, a flash memory, or the like), or any combination of these two. The memory 1420 stores, for example, software 1480, various images, and videos that can implement the techniques described herein. The calculation environment may have additional various functions For example, the calculation environment 1400 includes a storage 1440, one or more input devices 1450, one or more output devices 1460, and one or more communication connections 1470. A mutual connection mechanism (not shown) such as a bus, a controller, or a network mutually connects various components of the calculation environment 1400. Normally, operating system software (not shown) provides an operating environment for other software executed in the calculation environment 1400, and adjusts various activities of various components of the calculation environment 1400.

The storage 1440 may be detachable, or may not be detachable, or may include any other medium that may be used to store a magnetic disk, a magnetic tape or cassette, a CD-ROM, a CD-RW, a DVD, or data, and may be accessed within the calculation environment 1400. The storage 1440 stores instructions for software 1480, plug-in data, and messages that may be used to implement the techniques described herein.

The one or more input devices 1450 may be a keyboard, a key pad, a mouse, a touch screen display, a pen, or a touch input device such as a trackball, a voice input device, a scanning device, or another device that provides an input to the calculation environment 1400. In the case of audio, one or more input devices 1450 may be a sound card or a similar device for receiving analog or digital audio input, or a CD-ROM reader for providing various audio samples to the calculation environment 1400. The one or more output devices 1460 may be another device that provides an output from a display, a printer, a speaker, a CD writer, or a calculation environment 1400.

One or more communication connections 1470 allow communication with another computing entity via a communication medium (e.g., a connection network). The communication medium transmits data such as instructions executable by a computer, compressed graphics data, video, or other data included in the modulated data signal. The one or more communication connections 1470 are not limited to wired connections (e.g., megabits or gigabit Ethernet, India bands, or fiber channels via electrical or optical fiber connections), and wireless techniques (e.g., Bluetooth, Wi-Fi (IEEE 802.11a/b/n), WiMax, cellular, satellite, laser, infrared, via RF connection), and various agents, various bridges, and destination agents disclosed herein Other appropriate communication connections for providing a network connection are included. In a virtual host environment, one or more communication connections may be virtualized network connections provided by a virtual host.

Various embodiments of the various methods disclosed herein may be executed in the calculation cloud 1490 using a plurality of instructions executable by a computer that mounts all or some of the techniques disclosed herein. For example, various agents can execute various vulnerability scan functions in a calculation environment, while a consumer service of the agent platform (e.g., a bridge) and the destination agent data can be executed by various servers located inside the calculation cloud 1490.

The computer readable medium is an arbitrary available medium that can be accessed within the calculation environment 1400. Without limitation, as an example, the computer-readable medium with respect to the calculation environment 1400 includes the memory 1420 and/or the storage 1440. As will be easily understood, the term computer-readable medium includes a data storage medium such as a memory 1420 and a storage device 1440, and does not include a transmission medium such as various modulated data signals.

Various embodiments described above can be used in combination with each other as long as no contradiction or inconvenience occurs. Considering many possible embodiments to which the principles of the invention disclosed herein may be applied, it should be understood that the various embodiments illustrated are merely various examples, and the technical scope of the invention according to the scope of the claims should not be considered to be limited to these preferred examples. In practice, the technical scope of the invention according to the claims is defined by the appended claims. Therefore, for all of the technical scope of the invention described in the scope of the claims, the present inventors have claimed the application of the patent.

The computer program according to the seventy-fourth aspect is a computer program executed by at least one processor, and is configured to: acquire first data relating to a first position where a first avatar in a virtual space operated by using a first terminal of a first user is present; determine whether or not the first position satisfies a first condition in the first region; and when the first condition is satisfied, a display region for displaying a message transmitted from a terminal of a user operating at least one of the at least one avatar present in the first region or in the first region and existing in the past in the first region, and displaying the display region on the display part of the first terminal.

The computer program according to the seventy-fifth aspect is a computer program executed by at least one processor, and is configured to: receive first data relating to a first position where the first avatar is present from a first terminal of a first user who operates a first avatar in a virtual space via a communication line; determine whether or not the first position satisfies a first condition that is within the first region; and when the first condition is satisfied, determining a display region for displaying a message transmitted from a terminal of a user operating at least one of at least one avatar existing in the first region or in the first region and existing in the past in the first region, and transmitting control data for controlling the display unit to the first terminal so as to display the display region on the display unit of the terminal via the communication line.

The computer program according to the seventy-sixth aspect of the present invention is characterized in the above-mentioned seventy-fourth or seventy-fifth aspect in that the display unit displays a message transmitted from a terminal of a user operating at least one of the avatars in the display region.

The computer program according to the seventy-seventh aspect is characterized in any of the above-mentioned seventy-fourth to seventy-sixth aspects in that the display unit displays a message transmitted from the first terminal in the display region.

The computer program according to the seventy-eighth aspect is characterized in the above-mentioned seventy-seventh aspect in that the message transmitted from the first terminal is transmitted to the terminal of the user operating at least one of the avatars.

The computer program according to the seventy-ninth aspect is characterized in any of the above-mentioned seventy-fourth to seventy-eighth aspects in that at least one virtual venue, which is a space in which a moving image is distributed, and the first region is a region within the virtual venue of any one of the at least one virtual venue.

The computer program according to the eightieth aspect is characterized in any of the seventy-fourth to seventy-eighth aspects in that at least one virtual venue, which is a space in which a moving image is distributed, is provided in the virtual space, and the first region is located on the entrance side of the first virtual venue among the at least one virtual venue, and is a region in the virtual space different from the first virtual venue, or an region in the virtual space different from the first virtual venue.

The computer program according to the eighty-first aspect is characterized in the above-mentioned eightieth aspect in that determining whether or not the second condition is satisfied and a case where the second condition is satisfied and the first avatar performs a predetermined operation from one of the first virtual venue and the first region to the other of the first virtual venue and the first region, the display unit displays a display screen related to the other.

The computer program according to the eighty-second aspect is characterized in the above-mentioned eighty-first aspect in that the second condition includes at least one of the fact that the first avatar has been played back for a predetermined time or longer in a state in which the first avatar is present in the first virtual venue, the first avatar is seated on a virtual object on which the first avatar can be seated and leaves the virtual object, and that the first avatar has a virtual object that can be purchased in the virtual space.

The computer program according to the eighty-third aspect is characterized in any of the above-mentioned the seventy-fourth to eighty-second in that the display unit displays the message around the avatar operated by the user when the message is transmitted from the terminal of the user.

The computer program according to the eighty-fourth aspect is characterized in any of the above-mentioned the seventy-fourth to eighty-third in that the first data includes data relating to a first position where the first avatar is present, and data related to a predetermined operation performed on one virtual object by using an operation of the first terminal. The first condition includes the fact that the first position is in the first region and the user operating at least one avatar existing in the first region or in the past in the first region performs a predetermined operation on the one virtual object by using the terminal, wherein the display region is a display region for displaying a message transmitted from a terminal of a user who operates at least one of the avatars.

The computer program according to the eighty-fifth aspect is characterized in any of the above-mentioned seventy-fourth to eighty-fourth in that the operation in the virtual space of at least one of the avatars is determined in advance.

The computer program according to the eighty-sixth aspect is characterized in any of the above-mentioned seventy-fourth aspect or the seventy-sixth to eighty-fifth aspects depending on the seventy-fourth aspect in that receiving the second data including at least one of: the location of at least one of the other avatars, and the total number of avatars of at least one of the other avatars, and determining whether the third condition is met, and determining whether the third condition is met. data, determining whether the third condition is met, and controlling the display of the first user's terminal based on the second data when the third condition is determined to be met determining the second control data, and controlling the display unit based on the second control data.

The computer program according to the eighty-seventh aspect is characterized in the any of the above-mentioned seventy-fifth aspect or the seventy-sixth to eighty-fifth aspects depending on the seventy-fifth aspect in that at least one of the location of at least one of the other avatars, and the total number of at least one of the other avatars. receiving the second data, determining whether the third condition is met, and, if the third condition is determined to be met, based on the second data, controlling the first user's terminal determining the second control data to control the display unit, and transmitting the second control data to the first terminal.

The computer program according to the eighty-eighth aspect is characterized in the above-mentioned eighty-sixth or eighty-seventh aspect in that the third condition is when the total number of at least one other avatar is greater than or equal to the first value, or when the total number of at least one other avatar is less than the second value, and the first value is greater than the second value.

The computer program according to the eighty-ninth aspect is characterized in any of the above-mentioned seventy-fourth to eighty-eighth aspects in that the virtual space is a three-dimensional space.

The computer program according to the ninetieth aspect is characterized in any of the above-mentioned seventy-fourth to eighty-ninth aspects in that the communication line includes the Internet.

The computer program according to the ninety-first aspect is characterized in any of the above-mentioned the seventy-fourth to ninetieth aspects in that the at least one processor includes a central processing unit (CPU), a microprocessor, and/or a graphics processing unit (GPU)". GPU), and the communication line includes the Internet.

The computer program according to the ninety-second aspect is characterized in any of the above-mentioned the seventy-fourth to ninety-first aspects in that the at least one processor is mounted in a server device, smartphone, tablet, cell phone, or personal computer.

The method according to the ninety-third aspect is characterized by including the steps of obtaining first data concerning a first avatar in a virtual space operated using a first terminal of a first user The process of acquiring first data regarding the first position, determining whether or not the first position satisfies the first condition of being within the first region, and if the first condition is satisfied, determining whether or not the first position is within the first region, and if the first condition is satisfied, determining whether or not the first position is within the first region, receiving data regarding a display region for displaying a message transmitted from a terminal of a user operating at least one of at least one other avatar that exists in the first region or has existed in the past in the first region, and displaying the display region on the display of the first terminal.

The method according to the ninety-fourth aspect is characterized by including the steps of receiving, via a communication line, from a first terminal of a first user operating a first avatar in a virtual space, a receiving, from a first terminal of a first user operating a first avatar in a virtual space via a communication line, first data relating to a first position at which the first avatar exists, determining whether or not the first position satisfies a first condition of being within a first region determining whether or not the first condition is met, and if the first condition is met, displaying a message sent from the terminal of the user operating at least one of the at least one other avatar that exists within the first region or that has existed within the first region in the past; and The process of determining a display region for displaying a message transmitted from the terminal, and transmitting control data to the first terminal via the communication line to control the display unit to display the display region on the display unit of the terminal.

The method according to the ninety-fifth aspect is characterized in the above-mentioned ninety-third or ninth-fourth aspect in that the communication line includes the Internet.

The method according to the ninety-sixth aspect is characterized in any of the above-mentioned ninety-third to ninety-fifth aspects in that the at least the at least one processor includes a central processing unit (CPU), a microprocessor, and/or a graphics processing unit (GPU).

The server according to the ninety-seventh aspect is characterized by receiving via a communication line, from a first terminal of a first user operating a first avatar in the virtual space, a receiving, from a first terminal of a first user operating a first avatar in a virtual space via a communication line, first data concerning a first position at which the first avatar exists, determining whether or not the first position satisfies a first condition of being within a first region and, if the first condition is met, determining a display region for displaying a message transmitted from the terminal of the user operating at least one of the other at least one avatar that exists within the first region or that has existed within the first region in the past Determining the display region in which the message is to be displayed, and transmitting control data to the first terminal via the communication line to control the display region so that the display region is displayed on the display of the terminal.

The server according to the ninety-eighth aspect is characterized in the above-mentioned ninety-seventh aspect by the communication line includes the Internet.

The server according to the ninety-ninth aspect is characterized in any of the above-mentioned ninety-seventh or ninety-eighth in that the at least one processor includes a central processing unit (CPU), a microprocessor, and/or a graphics processing unit (GPU).

As described above, the technology of the present disclosure can provide a computer program, a method, and a server device that do not impair comfort more than before.

Japanese Published Patent Application 2016-34087 is incorporated herein by reference in its entirety.

DESCRIPTION OF NUMERALS 2 communication network
10 terminals
11 first terminal
12 second terminal
14, 24 central processing unit
15, 25 main memory device
16, 26 input/output interface
17, 27 input device
18, 28 auxiliary storage device
19, 29 output devices
20 server device
21 first server system
21A1 distribution server device
21A2 server storage device
22 second server system
70 devices
80, 80A, 313 avatar
81 chair
102a first sensor
102b second sensor
102c camera
102d microphone
104 processing unit
110 communication unit
120 acquisition unit
130 control unit
140 display unit
150 user interface unit
160 memory unit
210 communication unit
220 memory unit
230 control unit
300 virtual space
301, 314 region
310 virtual venue
311, 312 display region
321 point
322 line segment
410 live venue
411 display region
1000 system
1400 calculation environment
1410 processing unit
1420 memory
1430 configuration
1440 storage
1450 input device
1460 output device
1470 communication connection
1480 software instructions
1490 calculation cloud

What is claimed is:

1. A non-transitory computer readable medium storing a set of instructions that are executable by one or more processors of a system to cause the system to perform a method comprising:
acquiring first data relating to an avatar in a virtual space operated using a terminal of a first user; and
receiving, via a communication line, second data relating to an avatar in the virtual space to be operated using a terminal of at least one user other than the first user, wherein
the first data includes a location of the avatar of the first user, and
the second data includes at least one of a location of the at least one user's avatar, and a total number of avatars of the at least one user's avatar that are located in a first region of the virtual space;
determining whether or not the position of the first user's avatar or the second data satisfies a predetermined condition;
deciding control data to control a display screen of the first user's terminal when the predetermined condition is satisfied;
controlling the display screen based on the control data;
determining analysis data based on at least one of the first data and the second data; and
determining advertisement data based on at least one of the first data and the second data.

2. The medium of claim 1, wherein the control data includes data relating to at least one of the position of at least one user's avatar to be displayed on the display screen based on the position of the avatar contained in the second data, and the total number of avatars of the at least one user to be displayed on the display screen based on the total number of avatars contained in the second data.

3. The medium of claim 1, wherein the predetermined condition is at least one of the followings: when the first user's avatar is located in the first region, when the total number of avatars located in the first region among at least one user's avatars is more or equal to a first value, when the total number of avatars located in the first region among at least one user's avatars is less or equal to a second value, when a number of avatars located within a first distance from at least one user's avatars located in the first region is more than or equal to a third value, and when the total number of avatars located in the first region among at least one user's avatars is less than or equal to a fourth value, and wherein the first value is greater than the second value, and the third value is greater than the fourth value.

4. The medium of claim 3, wherein the second data includes data relating to the total number of avatars of the at least one user's avatars located in the first region, the predetermined condition includes at least one of when the total number of avatars of the at least one user's avatars located in the first region is more than or equal to the first value, and when the total number of avatars of the at least one user's avatars located in the first region is less than or equal to the second value,
wherein store the second data at each time among a plurality of times, and wherein total from a second time to a first time among the plurality of times is determined when the predetermined condition is satisfied at the first time, and the control data is decided based on the determination of the total.

5. The medium of claim 4, wherein if the total number of avatars of the at least one user's avatars located in the first region is greater than or equal to the first value, the second time is determined so that the time period subject to determining the cumulative total is shorter, and if the total number of avatars located in the first region among the avatars of at least one user is less than or equal to the second value, the second time is determined so that the period of time subject to determining cumulative total is longer.

6. The medium of claim 1, wherein the second data includes data regarding the gender of the at least one user's avatar.

7. The medium of claim 1, wherein at least one virtual venue is provided in the virtual space, which is the space where the video is delivered, and the first region is a region within the at least one virtual venue.

8. The medium of claim 7, wherein the second data includes data relating to a position of the at least one user's avatar, the position of the at least one user's avatar indicates a position within the virtual venue, and the position of the at least one user's avatar included in the control data is a position in the virtual venue.

9. The medium of claim 1, wherein at least one of the first data and the second data includes at least one of data concerning action history of the avatar in the virtual space, and data of the user operating the avatar.

10. The medium of claim 9, wherein at least one virtual venue is provided in the virtual space, which is the space where the video is delivered, and the first region is a region within one of the at least one virtual venues, and
wherein the action history includes at least one of data relating to the avatar's viewing history of the video, data relating to the avatar's viewing time of the video, data relating to the avatar's entry history to the virtual venue, data relating to the avatar's time spent at the virtual venue, data relating to the avatar's exit history from the virtual venue, data relating to the avatar's action history on virtual objects existing in the virtual space, data regarding a location of the terminal from which a message is sent when the message is sent from one of the first user's terminal and at least one of the user's terminals to the other, data regarding purchase history of the virtual object, and data as to whether the virtual object is seatable and a location of the virtual object when the avatar is seated on the virtual object.

11. The medium of claim 1, wherein at least one of the first data and the second data is transmitted to a third terminal other than the first user's terminal and at least one user's terminal, and further including determining whether at least one of the first data and the second data is received, and if at least one of the first data and the second data is received, at least one of the received first data and the second data is sent to the third terminal.

12. The medium of claim 11, wherein a cycle for receiving the first data is shorter than a cycle for deciding the control data.

13. The medium of claim 11, wherein the third terminal is a terminal operated by the operator or operating body that operates the virtual venue.

14. The medium of claim 1, wherein the first user's avatar and the at least one user's avatar are present in the virtual space at a predetermined time, and when data including a first message transmitted from the terminal of the user corresponding to one of the at least one user's avatars is received, the virtual space is displayed in a first display region of the display screen of the terminal of the first user and the first message is displayed in the first display region.

15. The medium of claim 1, wherein the virtual space is a three-dimensional space.

16. The medium of claim 1, wherein the behavior of the at least one user's avatar in the virtual space is predetermined.

17. A non-transitory computer readable medium storing a set of instructions that are executable by one or more processors of a system to cause the system to perform a method comprising:
receiving, via a communication line, first data concerning an avatar in a virtual space operated using a terminal of a first user, and second data concerning an avatar in the virtual space operated using a terminal of at least one user other than the first user, the first data including a location of the first user's avatar, the second data including at least one of a location of the at least one user's avatar and a total number of avatars of the at least one user that are located in a first region of the virtual space;
determining whether the position of the first user's avatar or the second data satisfies a predetermined condition;
deciding control data to control the display screen of the first user's terminal when the predetermined conditions are satisfied;
transmitting the control data to the first user's terminal via the communication line;
determining analysis data based on at least one of the first data and the second data; and
determining advertisement data based on at least one of the first data and the second data.

18. The medium of claim 17, wherein the first user's avatar and the at least one user's avatar are present in the virtual space at a predetermined time, and when data including a first message transmitted from the terminal of the user corresponding to one of the at least one user's avatars is received, the virtual space is displayed in a first display region of the display screen of the terminal of the first user and the first message is displayed in the first display region.

19. The medium of claim 18, wherein data including the third message is not sent to the first user's terminal when data including the third message is received from one of the third terminal and the at least one user's terminal, to the other of the third terminal and the at least one user's terminal.

20. A method, comprising:
acquiring first data related to an avatar in a virtual space operated by using a terminal of a first user;
receiving second data relating to an avatar in a virtual space operated using a terminal of each user of at least one user other than the first user via the communication line, the first data including a position of an avatar of the first user, the second data including at least one of a position of the avatar of the at least one user and a total number of avatars located in a first region in the virtual space among the avatars of the at least one user;
determining whether or not a position of the avatar of the first user or the second data satisfies a predetermined condition;
determining control data for controlling a display screen of the terminal of the first user when the predetermined condition is satisfied;
controlling the display screen based on the control data;

determining analysis data based on at least one of the first data and the second data; and determining advertisement data based on at least one of the first data and the second data.

21. A method, comprising:

receiving first data relating to an avatar in a virtual space operated by using a terminal of a first user and second data related to an avatar in a virtual space operated by using a terminal of each user of at least one user other than the first user via a communication line, the first data including a position of an avatar of the first user, the second data including at least one of a position of the avatar of the at least one user and a total number of avatars located in a first region in the virtual space among the avatars of the at least one user;

determining whether or not the position of the avatar of the first user or the second data satisfies a predetermined condition;

determining control data for controlling a display screen of the terminal of the first user when it is determined that the predetermined condition is satisfied;

transmitting the control data to the terminal of the first user via the communication line;

determining analysis data based on at least one of the first data and the second data; and determining advertisement data based on at least one of the first data and the second data.

22. A server device, comprising:

at least one processor, wherein the processor is configured to:

receive, via a communication line, first data relating to an avatar in a virtual space operated using a terminal of the first user, and second data relating to an avatar in the virtual space operated using a terminal of each of at least one user other than the first user, the first data including a location of the first user's avatar, and the second data including at least one of a location of the at least one user's avatar and a total number of avatars of the at least one user's avatar that are located in the first region of the virtual space;

determine whether the position of the first user's avatar or the second data satisfies a predetermined condition;

decide control data to control a display screen of the first user's terminal if the predetermined condition is satisfied met;

transmit the control data to the first user's terminal via the communication line;

determine analysis data based on at least one of the first data and the second data; and determine advertisement data based on at least one of the first data and the second data.

23. A non-transitory computer readable medium storing a set of instructions that are executable by one or more processors of a system to cause the system to perform a method comprising:

obtaining first data relating to an avatar in a virtual space operated using a first terminal of a first user;

displaying a first display including the avatar on a display of the first terminal based on the first data;

determining whether a first condition is satisfied based on the first data; and controlling a display unit to switch the display from the first display to a second display based on a first position in the virtual space at which the avatar exists if the first condition is satisfied;

determining analysis data based on at least one of the first data and the second data; and determining advertisement data based on at least one of the first data and the second data.

* * * * *

UNITED STATES PATENT AND TRADEMARK OFFICE
CERTIFICATE OF CORRECTION

PATENT NO. : 12,299,794 B2
APPLICATION NO. : 17/936762
DATED : May 13, 2025
INVENTOR(S) : Masashi Watanabe Page 1 of 1

It is certified that error appears in the above-identified patent and that said Letters Patent is hereby corrected as shown below:

In the Claims

In Claim 3, Column 90, Line 44, "one of the followings:" should read --one of the following:--.

Signed and Sealed this
Tenth Day of June, 2025

Coke Morgan Stewart
*Acting Director of the United States Patent and Trademark Office*